United States Patent
Murakami et al.

(10) Patent No.: US 10,563,058 B2
(45) Date of Patent: Feb. 18, 2020

(54) METHACRYLIC RESIN, METHACRYLIC RESIN COMPOSITION, FILM, AND PRODUCTION METHOD

(71) Applicant: ASAHI KASEI KABUSHIKI KAISHA, Chiyoda-ku Tokyo (JP)

(72) Inventors: Fumiki Murakami, Tokyo (JP); Yutaka Tada, Tokyo (JP); Yumika Kurihara, Tokyo (JP); Nobuhiro Kobayashi, Tokyo (JP); Masami Yonemura, Tokyo (JP)

(73) Assignee: ASAHI KASEI KABUSHIKI KAISHA, Chiyoda-ku, Tokyo (JP)

( * ) Notice: Subject to any disclaimer, the term of this patent is extended or adjusted under 35 U.S.C. 154(b) by 31 days.

(21) Appl. No.: 15/769,467

(22) PCT Filed: Nov. 14, 2016

(86) PCT No.: PCT/JP2016/083722
§ 371 (c)(1),
(2) Date: Apr. 19, 2018

(87) PCT Pub. No.: WO2017/086275
PCT Pub. Date: May 26, 2017

(65) Prior Publication Data
US 2018/0305538 A1     Oct. 25, 2018

(30) Foreign Application Priority Data
Nov. 20, 2015    (JP) .................................. 2015-228098

(51) Int. Cl.
    *C08L 33/10*       (2006.01)
    *C08F 220/14*      (2006.01)
(Continued)

(52) U.S. Cl.
CPC ................ *C08L 33/10* (2013.01); *C08F 2/38* (2013.01); *C08F 2/48* (2013.01); *C08F 8/32* (2013.01);
(Continued)

(58) Field of Classification Search
CPC .......... C08L 33/10; C08L 33/04; C08L 33/12; C08L 2203/16; C08F 2/38; C08F 2/48;
(Continued)

(56) References Cited

U.S. PATENT DOCUMENTS 8,628,698 B2 *   1/2014   Choi ....................... C08L 33/08
                                                    252/582
2010/0040876 A1     2/2010   Delprat
(Continued)

FOREIGN PATENT DOCUMENTS

EP            1911777 A1     4/2008
JP           H0323404 A     1/1991
(Continued)

OTHER PUBLICATIONS

Sep. 19, 2018, the Supplementary European Search Report issued by the European Patent Office in the corresponding European Patent Application No. 16866277.3.
(Continued)

*Primary Examiner* — William K Cheung
(74) *Attorney, Agent, or Firm* — Kenja IP Law PC

(57) ABSTRACT

Provided are a methacrylic resin composition and a film containing a methacrylic resin that includes: 50 mass % to 97 mass % of a methacrylic acid ester monomer unit (A); 3 mass % to 30 mass % of a structural unit (B) having a cyclic structure-containing main chain; and 0 mass % to 20 mass % of another vinyl monomer unit (C) that is copolymerizable with a methacrylic acid ester monomer. The methacrylic resin satisfies the following conditions (1) and (2):
(Continued)

(1) the methacrylic resin has a weight average molecular weight of 65,000 to 300,000 as measured by GPC; and (2) the total content of specific components is 0.01 mass % to 0.40 mass % as determined by GC/MS.

16 Claims, 3 Drawing Sheets

(51) Int. Cl.
*C08F 8/48* (2006.01)
*C08J 5/18* (2006.01)
*C08F 2/38* (2006.01)
*C08L 33/04* (2006.01)
*C08F 8/32* (2006.01)
*C08L 33/12* (2006.01)
*C08F 2/48* (2006.01)
*C08K 5/13* (2006.01)
*C08K 5/41* (2006.01)
*C08K 5/52* (2006.01)
*C08F 212/08* (2006.01)
*C08F 220/18* (2006.01)
*C08F 220/56* (2006.01)
*G02B 1/04* (2006.01)

(52) U.S. Cl.
CPC .............. *C08F 8/48* (2013.01); *C08F 220/14* (2013.01); *C08J 5/18* (2013.01); *C08L 33/04* (2013.01); *C08L 33/12* (2013.01); *G02B 1/041* (2013.01); *C08F 212/08* (2013.01); *C08F 220/18* (2013.01); *C08F 220/56* (2013.01); *C08K 5/13* (2013.01); *C08K 5/41* (2013.01); *C08K 5/52* (2013.01); *C08L 2203/16* (2013.01)

(58) Field of Classification Search
CPC .. C08F 8/32; C08F 8/48; C08F 220/14; C08F 212/08; C08F 220/18; C08F 220/56; C08J 5/18; G02B 1/041; C08K 5/13; C08K 5/41; C08K 5/52
USPC ......................................................... 524/523
See application file for complete search history.

(56) References Cited

U.S. PATENT DOCUMENTS

| | | | |
|---|---|---|---|
| 2010/0182689 | A1 | 7/2010 | Nakanishi et al. |
| 2013/0072651 | A1 | 3/2013 | Yonemura et al. |
| 2014/0128547 | A1 | 5/2014 | Yonemura et al. |
| 2016/0326287 | A1 | 11/2016 | Ozawa et al. |

FOREIGN PATENT DOCUMENTS

| | | | |
|---|---|---|---|
| JP | H05119217 | A | 5/1993 |
| JP | H09324016 | A | 12/1997 |
| JP | 2000178399 | A | 6/2000 |
| JP | 2001233919 | A | 8/2001 |
| JP | 2006096960 | A | 4/2006 |
| JP | 2006241197 | A | 9/2006 |
| JP | 2009052021 | A | 3/2009 |
| JP | 2009537358 | A | 10/2009 |
| JP | 2010126550 | A | 6/2010 |
| JP | 2011126986 | A | 6/2011 |
| JP | 2012025968 | A | 2/2012 |
| JP | 2014028956 | A | 2/2014 |
| JP | 2014080525 | A | 5/2014 |
| JP | 2014097561 | A | 5/2014 |
| JP | 2014098117 | A | 5/2014 |
| JP | 2014199398 | A | 10/2014 |
| JP | 2015135355 | A | 7/2015 |
| JP | 2015172112 | A | 10/2015 |
| JP | 2017145387 | A | 8/2017 |
| JP | 2018010176 | A | 1/2018 |
| TW | 200911907 | A | 3/2009 |
| TW | 201416390 | A | 5/2014 |
| TW | 201533067 | A | 9/2015 |
| WO | 2013005634 | A1 | 1/2013 |

OTHER PUBLICATIONS

Jan. 10, 2017, International Search Report issued in the International Patent Application No. PCT/JP2016/083722.
May 24, 2018, International Preliminary Report on Patentability issued in the International Patent Application No. PCT/JP2016/083722.
Certificates of Experimental Results, Submission of publications, etc., Jun. 5, 2019, Japan, with a partial English translation.
Toru Haruna, Stabilizers Blending Technique for Recycling, Journal of the Society of Rubber Science and Technology, 1997, 70(1), Japan, with a partial English translation.

* cited by examiner

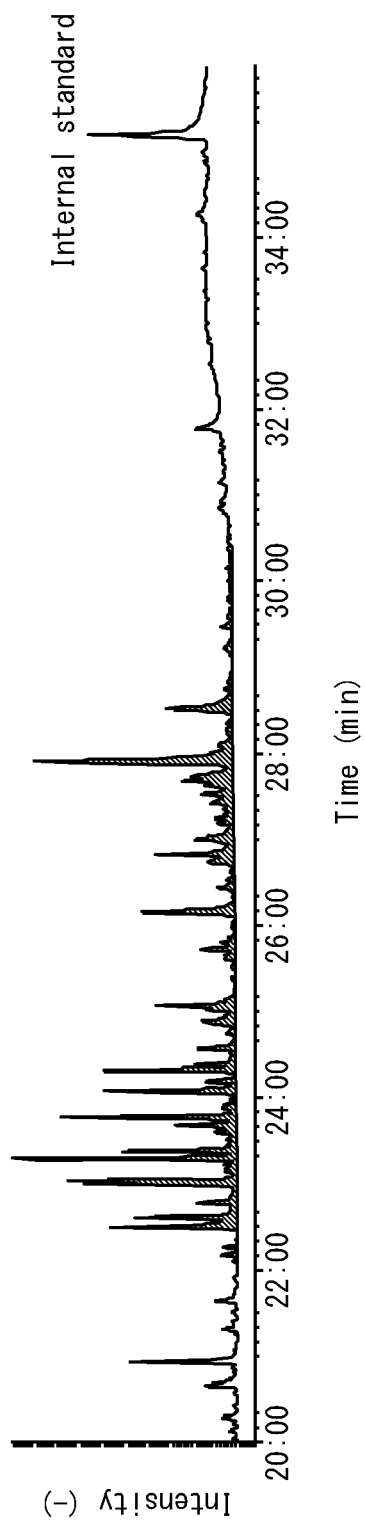
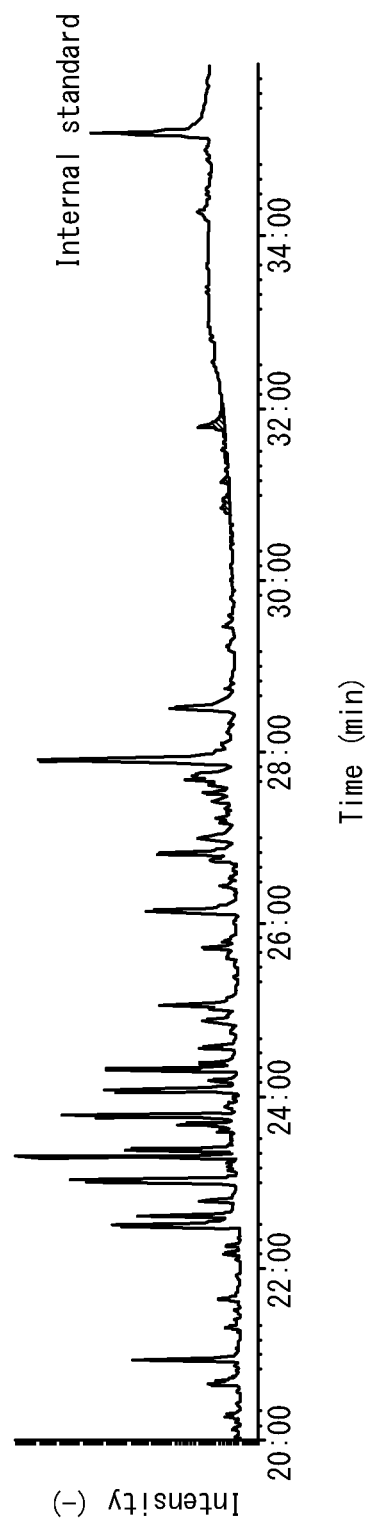
FIG. 2A
FIG. 2B

METHACRYLIC RESIN, METHACRYLIC RESIN COMPOSITION, FILM, AND PRODUCTION METHOD

This application is a U.S. national stage application of International Application No. PCT/JP2016/083722, filed on Nov. 14, 2016. The present application is based on Japan Patent Application No. 2015-228098 filed on Nov. 20, 2015, and the contents disclosed therein are incorporated herein as a whole by reference.

TECHNICAL FIELD

This disclosure relates to an enhanced methacrylic resin, a methacrylic resin composition containing the methacrylic resin, a film containing the methacrylic resin composition, and a production method thereof.

BACKGROUND

Expansion of the market for displays in recent years has been accompanied by increased demand for viewing of vivid images, and thus there is a need for optical materials provided with higher level optical properties in addition to transparency, heat resistance, and strength.

Acrylic resins ((meth)acrylic acid ester polymers) are attracting attention for use as such optical materials from viewpoints of transparency, surface hardness, optical properties, and so forth.

It has previously been reported that among acrylic resins, those having enhanced heat resistance through copolymerization of a (meth)acrylic acid ester monomer with glutaric anhydride (for example, refer to PTL 1), maleic anhydride (for example, refer to PTL 2), or the like are particularly good as optical materials.

However, a disadvantage of acrylic resins that have enhanced heat resistance as described above (heat resistant acrylic resins) is that they are susceptible to thermal decomposition in high-temperature shaping compared to a general-purpose acrylic resin (i.e., a copolymer of methyl methacrylate and an acrylic acid ester).

Moreover, since progress toward larger and thinner (for example, film form) shaped products has been accompanied by shaping at high temperature and longer holding time at high temperature, another disadvantage of heat resistant acrylic resins is that foaming may occur during shaping processing.

Furthermore, heat resistant acrylic resins have weak strength and low toughness, which leads to a problem of poor producibility in terms of film shaping processability and handleability.

In terms of conventional techniques for improving the strength of a heat resistant acrylic resin, a technique of including a crosslinked elastic body having a multilayer structure in an acrylic resin including a glutaric anhydride-based unit has been disclosed (for example, refer to PTL 3).

A technique of adding acrylic rubber to an acrylic resin including a maleic anhydride unit has also been disclosed (for example, refer to PTL 4).

Moreover, a technique of adding a multilayer structure rubber and a thermal stabilizer to an acrylic resin including a maleic anhydride unit (for example, refer to PTL 5), and a technique of including a rubbery polymer and, as necessary, an ultraviolet absorber in an acrylic resin including a structural unit having a cyclic structure-containing main chain (for example, refer to PTL 6) have been disclosed.

Furthermore, a technique for reducing the content of residual monomer in a resin has been disclosed (for example, refer to PTL 7).

CITATION LIST

Patent Literature

PTL 1: JP 2006-241197 A
PTL 2: JP H03-023404 A
PTL 3: JP 2000-178399 A
PTL 4: JP H05-119217 A
PTL 5: JP 2010-126550 A
PTL 6: JP 2014-098117 A
PTL 7: JP 2001-233919 A

SUMMARY

Technical Problem

However, the acrylic resins disclosed in PTL 1 and 2 have inadequate damp heat resistance and thermal stability, and the acrylic resin compositions disclosed in PTL 3 and 4 suffer from problems such as reduction of heat resistance due to addition of a rubbery component, even poorer thermal stability, and increased likelihood of foaming and contaminants.

Particularly in film shaping with the acrylic resins and acrylic resin compositions disclosed in PTL 1 to 4, thermal degradation, resin decomposition, occurrence of contaminants, and so forth are observed, and thus there is a problem that the excellent optical properties of the acrylic resin itself cannot be adequately exhibited.

Moreover, the technique disclosed in PTL 5 imparts excellent mechanical strength and shaping stability while also imparting high heat resistance to a certain extent through addition of a thermal stabilizer. However, addition of a thermal stabilizer is problematic as it tends to negatively affect color tone and may lead to poor shaping due to bleed-out of the thermal stabilizer in shaping processing.

Heat resistant acrylic resins generally have poor fluidity and necessitate a high melting temperature for production of thinner films. Therefore, heat resistant acrylic resins are required to have higher shaping stability.

Furthermore, the technique disclosed in PTL 6 does not necessarily provide adequate shaping processability, specifically in terms of an effect of reducing the tendency of a film to adhere to a roller during film shaping, and further improvement of film shaping processability is, therefore, desirable to meet demands relating to film external appearance and optical properties to higher levels.

The technique disclosed in PTL 7 focuses on reduction of residual monomer content at the end of polymerization to as great an extent as possible with the aim of reducing the amount of residual monomer. However, PTL 7 does not consider suppressing adhesion to a metal roller in film production in a case in which film production is implemented and is inadequate in terms of providing improvement with respect to roller adhesion while maintaining resin thermal stability, which makes further improvement desirable.

In light of the problems experienced by the conventional techniques set forth above, an objective of this disclosure is to provide a methacrylic resin that has adequate optical properties for practical use and excellent heat resistance, thermal stability, and shaping processability, a methacrylic resin composition containing the methacrylic resin, a film containing the methacrylic resin composition, and a production method thereof.

Solution to Problem

As a result of extensive and diligent research conducted with the aim of solving the problems experienced by the conventional techniques set forth above, the inventors discovered that the desired effects can be obtained by maintaining the content of specific components in a resin at a certain amount, and completed the present disclosure.

Specifically, this disclosure provides the following.

[1] A methacrylic resin comprising:
50 mass % to 97 mass % of a methacrylic acid ester monomer unit (A);
3 mass % to 30 mass % of a structural unit (B) having a cyclic structure-containing main chain; and
0 mass % to 20 mass % of another vinyl monomer unit (C) that is copolymerizable with a methacrylic acid ester monomer, wherein
the methacrylic resin satisfies conditions (1) and (2), shown below:
(1) the methacrylic resin has a weight average molecular weight of 65,000 to 300,000 as measured by gel permeation chromatography (GPC); and
(2) total content of components detected at a retention time of 22 minutes to 32 minutes in measurement by GC/MS is 0.01 mass % to 0.40 mass % when the methacrylic resin is taken to be 100 mass %.

[2] The methacrylic resin according to [1], further satisfying condition (3), shown below:
(3) content of components having a weight average molecular weight of 10,000 or less as measured by gel permeation chromatography (GPC) is 0.1 mass % to 5.0 mass % when the methacrylic resin is taken to be 100 mass %.

[3] The methacrylic resin according to [1] or [2], having a glass transition temperature of 120° C. or higher.

[4] The methacrylic resin according to any one of [1] to [3], wherein
the structural unit (B) includes at least one structural unit selected from the group consisting of a maleimide-based structural unit (B-1), a glutaric anhydride-based structural unit (B-2), a glutarimide-based structural unit (B-3), and a lactone ring structural unit (B-4).

[5] The methacrylic resin according to any one of [1] to [4], wherein
the monomer unit (C) includes a structural unit of at least one selected from the group consisting of an acrylic acid ester monomer, an aromatic vinyl monomer, and a vinyl cyanide monomer.

[6] The methacrylic resin according to [5], wherein
the monomer unit (C) includes a structural unit of at least one selected from the group consisting of methyl acrylate, ethyl acrylate, styrene, and acrylonitrile.

[7] A methacrylic resin composition comprising:
the methacrylic resin according to any one of [1] to [6]; and
0.01 parts by mass to 5 parts by mass of a thermal stabilizer relative to 100 parts by mass of the methacrylic resin.

[8] A methacrylic resin composition comprising:
the methacrylic resin according to any one of [1] to [6]; and
0.01 parts by mass to 5 parts by mass of an ultraviolet absorber relative to 100 parts by mass of the methacrylic resin.

[9] A film comprising the methacrylic resin composition according to [7] or [8].

[10] The film according to [9], having a film thickness of 0.01 mm to 1 mm.

[11] The film according to [9] or [10], wherein
the film is an optical film.

[12] A method of producing a methacrylic resin including 50 mass % to 97 mass % of a methacrylic acid ester monomer unit (A), 3 mass % to 30 mass % of a structural unit (B) having a cyclic structure-containing main chain, and 0 mass % to 20 mass % of another vinyl monomer unit (C) that is copolymerizable with a methacrylic acid ester monomer, the method comprising:
(1) a compounding step of adding monomer into a reactor; and
(2) a polymerization step of adding a polymerization initiator into the reactor and carrying out a monomer polymerization reaction, wherein
in (2) the polymerization step, when total time from starting addition of the polymerization initiator to ending addition of the polymerization initiator is taken to be B hours, in a period from starting addition of the polymerization initiator to 0.5×B hours thereafter, there is at least one instance in which an additive amount of the polymerization initiator per unit time is less than an additive amount of the polymerization initiator per unit time when starting addition of the polymerization initiator.

[13] The method of producing a methacrylic resin according to [12], wherein
in (2) the polymerization step, an additive amount of the polymerization initiator per unit time during a period from 0.01×B hours after starting addition of the polymerization initiator to 0.3×B hours after starting addition of the polymerization initiator is 70% or less of the additive amount of the polymerization initiator per unit time when starting addition of the polymerization initiator.

[14] The method of producing a methacrylic resin according to [12] or [13], wherein
in (2) the polymerization step, an additive amount of the polymerization initiator per unit time during a period from 0.7×B hours after starting addition of the polymerization initiator to 1.0×B hours after starting addition of the polymerization initiator is 25% or less of the additive amount of the polymerization initiator per unit time when starting addition of the polymerization initiator.

[15] The method of producing a methacrylic resin according to [12], wherein
in (2) the polymerization step, an additive amount of the polymerization initiator during a period from 0.5×B hours after starting addition of the polymerization initiator to 1.0×B hours after starting addition of the polymerization initiator is 20 mass % to 80 mass % when a total additive amount of the polymerization initiator is taken to be 100 mass %.

[16] The method of producing a methacrylic resin according to [12], wherein
the monomer polymerization reaction is carried out for a polymerization reaction time of 1.0×B hours to 5.0×B hours.

Advantageous Effect

According to this disclosure, it is possible to provide a methacrylic resin that has adequate optical properties for practical use and excellent heat resistance, thermal stability, external appearance, and shaping processability, a methacrylic resin composition containing the methacrylic resin, a film containing the methacrylic resin composition, and a production method thereof.

BRIEF DESCRIPTION OF THE DRAWINGS

In the accompanying drawings:

FIGS. 2A and 2B are GC/MS charts from calculation of the total amount of components including dimers and trimers of monomers, and the like, in a methacrylic resin and resin composition of Example 4, which is in accordance with a present embodiment, wherein the vertical axis represents intensity (–), the horizontal axis represents time (minutes), and a hatched region indicates the area of a calculation section for peaks observed between retention times of 22 minutes and 32 minutes.

DETAILED DESCRIPTION

Figure 1:
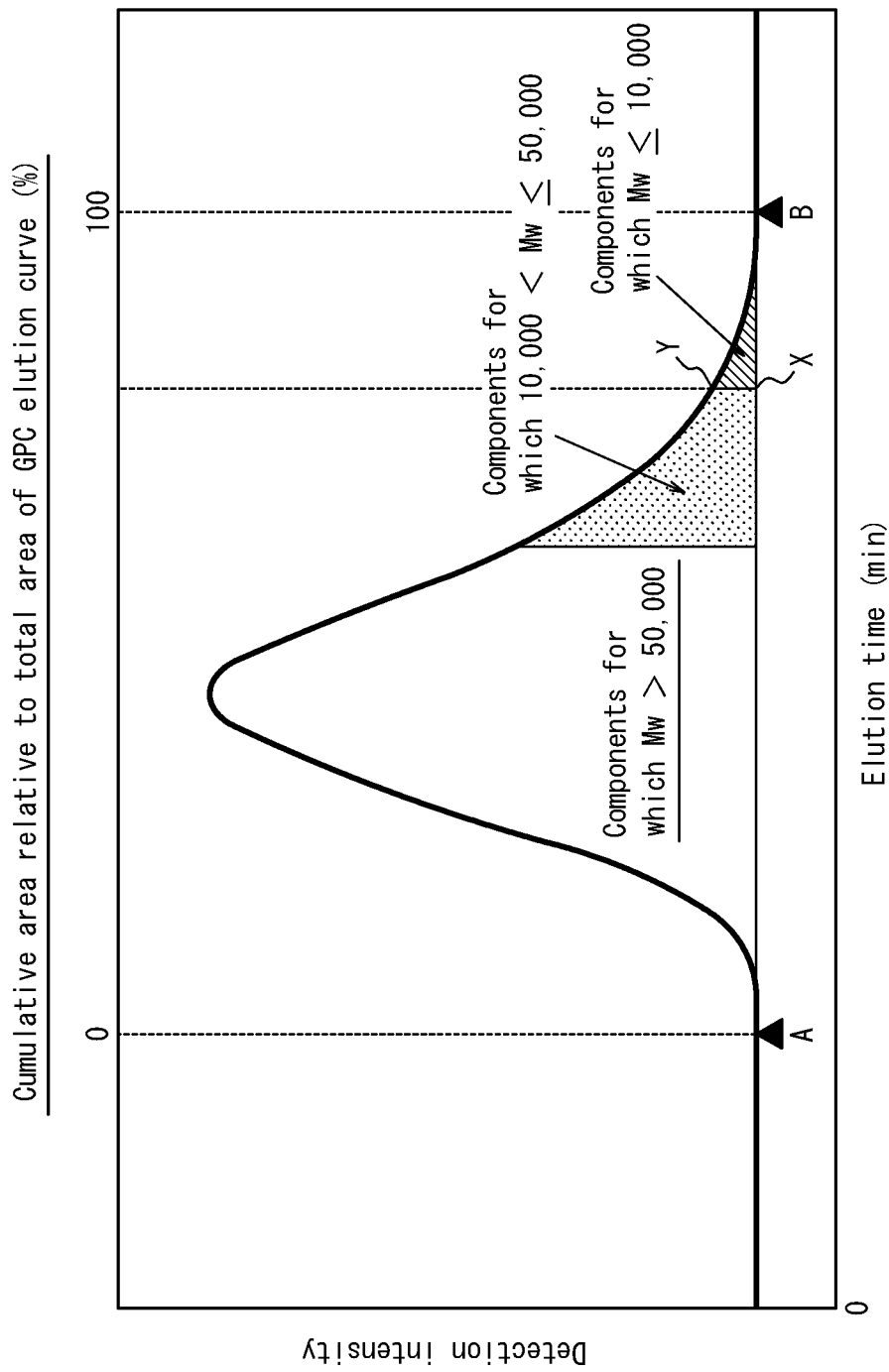
FIG. 1 schematically illustrates an elution curve when a methacrylic resin according to a present embodiment is measured by gel permeation chromatography (GPC)

The following provides a detailed description of an embodiment of the present disclosure (hereinafter, referred to as the "present embodiment"), but this disclosure is not limited by the following description and may be implemented with various alterations within the essential scope thereof.

In the following description, constitutional units of a polymer forming a methacrylic resin according to the present embodiment are referred to as " . . . monomer units" and/or " . . . structural units" including a plurality of such " . . . monomer units".

Moreover, a constituent material of a " . . . monomer unit" may be referred to simply as a " . . . monomer" by omitting the term "unit".

(Methacrylic Resin)

The methacrylic resin according to the present embodiment includes: 50 mass % to 97 mass % of a methacrylic acid ester monomer unit (A); 3 mass % to 30 mass % of a structural unit (B) having a cyclic structure-containing main chain; and 0 mass % to 20 mass % of another vinyl monomer unit (C) that is copolymerizable with a methacrylic acid ester monomer. In addition, the methacrylic resin according to the present embodiment satisfies conditions (1) and (2), shown below.

(1) The methacrylic resin has a weight average molecular weight of 65,000 to 300,000 as measured by gel permeation chromatography (GPC).

(2) The total content of components detected at a retention time of 22 minutes to 32 minutes in measurement by GC/MS with a specific device and specific conditions described further below is 0.01 mass % to 0.40 mass % when the methacrylic resin is taken to be 100 mass %.

The following provides a detailed description of monomer units and structural units that are included in the methacrylic resin according to the present embodiment.

((Methacrylic Acid Ester Monomer Unit (A)))

A monomer unit represented by the following general formula (1) can suitably be used as a methacrylic acid ester monomer unit (A) (hereinafter, also referred to as "monomer unit (A)") included in the methacrylic resin according to the present embodiment.

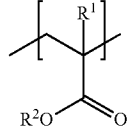

(1)

In general formula (1), $R^1$ represents a substituted or unsubstituted alkyl group having a carbon number of 1 to 6. The alkyl group may, for example, be substituted with a hydroxy group. $R^1$ is preferably a methyl group.

$R^2$ represents a group having a carbon number of 1 to 12, and preferably a hydrocarbon group having a carbon number of 1 to 12. The hydrocarbon group may, for example, be substituted with a hydroxy group. $R^2$ is preferably a group having a carbon number of 1 to 8.

Although no specific limitations are placed on the monomer used to form the methacrylic acid ester monomer unit (A) represented by general formula (1), it is preferable to use a methacrylic acid ester monomer represented by the following general formula (2).

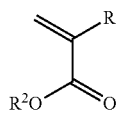

(2)

In general formula (2), $R^1$ represents a substituted or unsubstituted alkyl group having a carbon number of 1 to 6. The alkyl group may, for example, be substituted with a hydroxy group. $R^1$ is preferably a methyl group.

$R^2$ represents a group having a carbon number of 1 to 12, and preferably a hydrocarbon group having a carbon number of 1 to 12. The hydrocarbon group may, for example, be substituted with a hydroxy group. $R^2$ is preferably a group having a carbon number of 1 to 8.

Specific examples of such monomers include butyl methacrylate, ethyl methacrylate, methyl methacrylate, propyl methacrylate, isopropyl methacrylate, cyclohexyl methacrylate, phenyl methacrylate, 2-ethylhexyl methacrylate, t-butylcyclohexyl methacrylate, benzyl methacrylate, and 2,2,2-trifluoroethyl methacrylate. Methyl methacrylate, ethyl methacrylate, cyclohexyl methacrylate, phenyl methacrylate, and benzyl methacrylate are preferable from a viewpoint of heat resistance, handleability, and optical properties, and methyl methacrylate is preferable from a viewpoint of ease of acquisition and the like.

One of these methacrylic acid ester monomers may be used individually, or two or more of these methacrylic acid ester monomers may be used together.

The methacrylic acid ester monomer unit (A) of the methacrylic resin is included in the methacrylic resin in a proportion of 50 mass % to 97 mass %, preferably 55 mass % to 97 mass %, more preferably 55 mass % to 95 mass %, even more preferably 60 mass % to 93 mass %, and further preferably 60 mass % to 90 mass % from a viewpoint of imparting sufficient heat resistance to the methacrylic resin, a methacrylic resin composition, and a film according to the present embodiment through the subsequently described structural unit (B) having a cyclic structure-containing main chain.

((Structural Unit (B) Having Cyclic Structure-Containing Main Chain))

The structural unit (B) having a cyclic structure-containing main chain (hereinafter, also referred to as "structural unit (B)") that is included in the methacrylic resin according to the present embodiment is preferably inclusive of at least one structural unit selected from the group consisting of a maleimide-based structural unit (B-1), a glutaric anhydride-based structural unit (B-2), a glutarimide-based structural unit (B-3), and a lactone ring structural unit (B-4).

One type of structural unit (B) having a cyclic structure-containing main chain may be used individually, or two or more types of structural units (B) having a cyclic structure-containing main chain may be used in combination.

[Maleimide-Based Structural Unit (B-1)]

A structural unit represented by the following general formula (3) can suitably be used as a maleimide-based structural unit (B-1) included in the methacrylic resin according to the present embodiment.

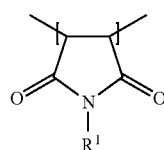

(3)

In general formula (3), $R^1$ represents one selected from the group consisting of a hydrogen atom, an alkyl group having a carbon number of 1 to 12, an alkoxy group having a carbon number of 1 to 12, and an aryl group having a carbon number of 6 to 12. Note that the alkyl group, alkoxy group, or aryl group may have a substituent on a carbon atom thereof.

Examples of monomers that can be used to form the maleimide-based structural unit (B-1) include, but are not specifically limited to, maleimide; N-alkyl group-substituted maleimides such as N-methylmaleimide, N-ethylmaleimide, and N-cyclohexylmaleimide; and N-aryl group-substituted maleimides such as N-phenylmaleimide, N-methylphenylmaleimide, N-ethylphenylmaleimide, N-butylphenylmaleimide, N-dimethylphenylmaleimide, N-hydroxyphenylmaleimide, N-methoxyphenylmaleimide, N-(o-chlorophenyl)maleimide, N-(m-chlorophenyl)maleimide, and N-(p-chlorophenyl)maleimide.

The monomer is preferably N-cyclohexylmaleimide, N-phenylmaleimide, N-methylphenylmaleimide, N-(o-chlorophenyl)maleimide, N-(m-chlorophenyl)maleimide, or N-(p-chlorophenyl)maleimide from a viewpoint of damp heat resistance and imparting heat resistance, is more preferably N-cyclohexylmaleimide or N-phenylmaleimide from a viewpoint of ease of acquisition and imparting heat resistance, and is even more preferably N-phenylmaleimide.

One type of maleimide-based structural unit (B-1) such as described above may be used individually, or two or more types of maleimide-based structural units (B-1) such as described above may be used in combination.

[Glutaric Anhydride-Based Structural Unit (B-2)]

A glutaric anhydride-based structural unit (B-2) included in the methacrylic resin according to the present embodiment may be formed after resin polymerization.

A structural unit represented by the following general formula (4) can suitably be used as the structural unit (B-2).

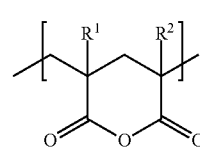

(4)

In general formula (4), $R^1$ and $R^2$ each represent, independently of one another, a hydrogen atom or a substituted or unsubstituted alkyl group having a carbon number of 1 to 6. The alkyl group may, for example, be substituted with a hydroxy group.

One type of glutaric anhydride-based structural unit (B-2) such as described above may be used individually, or two or more types of glutaric anhydride-based structural units (B-2) such as described above may be used in combination.

Although no specific limitations are placed on the method by which the glutaric anhydride-based structural unit (B-2) is formed, the structural unit (B-2) may be formed, for example, by copolymerizing a monomer having a structure represented by the following general formula (5) with a monomer used to form the methacrylic acid ester monomer unit (A), and subsequently carrying out cyclization through heat treatment in the presence or absence of a catalyst.

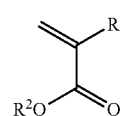

(5)

In general formula (5), $R^1$ represents a hydrogen atom or a substituted or unsubstituted alkyl group having a carbon number of 1 to 6. The alkyl group may, for example, be substituted with a hydroxy group.

$R^2$ represents a hydrogen atom or t-butyl.

Moreover, the monomer having the structure represented by general formula (5) may remain unreacted in the methacrylic resin to an extent that the effects disclosed herein can be exhibited.

[Glutarimide-Based Structural Unit (B-3)]

A glutarimide-based structural unit (B-3) included in the methacrylic resin according to the present embodiment may be formed after resin polymerization.

A structural unit represented by the following general formula (6) can suitably be used as the structural unit (B-3).

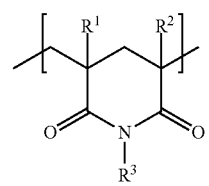

(6)

In general formula (6), $R^1$ and $R^2$ each represent, independently of one another, a hydrogen atom or a substituted or unsubstituted alkyl group having a carbon number of 1 to 6. The alkyl group may, for example, be substituted with a hydroxy group.

R³ represents one selected from the group consisting of a hydrogen atom, a substituted or unsubstituted alkyl group having a carbon number of 1 to 6, and a substituted or unsubstituted aryl group having a carbon number of 6 to 18.

It is particularly suitable that R¹, R², and R³ are each a methyl group.

One type of glutarimide-based structural unit (B-3) such as described above may be used individually, or two or more types of glutarimide-based structural units (B-3) such as described above may be used in combination.

The content of the glutarimide-based structural unit (B-3) is not specifically limited and can be determined as appropriate in consideration of heat resistance, shaping processability, optical properties, and so forth.

The content of the glutarimide-based structural unit (B-3) when the methacrylic resin is taken to be 100 mass % is preferably 1 mass % to 60 mass %, more preferably 3 mass % to 50 mass %, and particularly preferably 3 mass % to 25 mass %.

The content of the glutarimide-based structural unit (B-3) can be calculated, for example, by a method described in [0136] to [0137] of WO 2015/098096 A1.

The acid value of the resin including the glutarimide-based structural unit (B-3) is preferably 0.50 mmol/g or less, and more preferably 0.45 mmol/g or less when the balance of resin physical properties, shaping processability, color tone, and so forth is taken into account.

The acid value can be calculated, for example, by a titration method described in JP 2005-23272 A.

The glutarimide-based structural unit (B-3) can be obtained by a commonly known method such as a method in which after copolymerization of a methacrylic acid ester and/or methacrylic acid, a urea or unsubstituted urea reaction is carried out with ammonia or an amine at high temperature, a method in which ammonia or an amine is reacted with a methyl methacrylate-styrene copolymer, or a method in which ammonia or an amine is reacted with poly(methacrylic anhydride).

Specific examples include a method described by R. M. Kopchik in U.S. Pat. No. 4,246,374 A.

Moreover, the glutarimide-based structural unit (B-3) can be formed through imidization of an acid anhydride such as maleic anhydride, a half ester of the acid anhydride and a linear or branched alcohol having a carbon number of 1 to 20, or an α,β-ethylenically unsaturated carboxylic acid.

Examples of other preferable production methods that can be used include a method in which a (meth)acrylic acid ester is polymerized with an aromatic vinyl monomer or another vinyl monomer as necessary, and then an imidization reaction is carried out to obtain a resin including the glutarimide-based structural unit (B-3).

The imidization reaction process may be carried out using an imidization agent, and a ring-closing promoter may be added as necessary. Ammonia or a primary amine can be used as the imidization agent. Examples of primary amines that can suitably be used include methylamine, ethylamine, n-propylamine, and cyclohexylamine.

The method by which the imidization reaction is implemented is not specifically limited and may be a conventional and commonly known method. For example, a method using an extruder, a horizontal twin screw reactor, or a batch reaction tank may be adopted. The extruder is not specifically limited, and suitable examples thereof include single screw extruders, twin screw extruders, and multiscrew extruders. More suitably, a tandem reaction extruder in which two twin screw extruders are arranged in series may be used.

In production of the resin, an esterification process of treatment with an esterification agent may be included in addition to the imidization reaction process. Through inclusion of the esterification process, carboxyl groups included in the resin as a by-product of the imidization process can be converted to ester groups, and the acid value of the resin can be adjusted to within a desired range. The esterification agent is not specifically limited so long as the effects disclosed herein can be exhibited and suitable examples thereof include dimethyl carbonate and trimethylacetate. Although the amount of esterification agent that is used in not specifically limited, it is preferable to use 0 parts by mass to 12 parts by mass relative to 100 parts by mass of the resin. Furthermore, an aliphatic tertiary amine such as trimethylamine, triethylamine, or tributylamine may be used as a catalyst in combination with the esterification agent.

[Lactone Ring Structural Unit (B-4)]

A lactone ring structural unit (B-4) included in the methacrylic resin according to the present embodiment may be formed after resin polymerization.

A structural unit represented by the following general formula (7) can suitably be used as the structural unit (B-4).

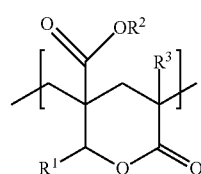

(7)

In general formula (7), R¹, R², and R³ each represent, independently of one another, a hydrogen atom or an organic group having a carbon number of 1 to 20. The organic group may include an oxygen atom.

One type of lactone ring structural unit (B-4) such as described above may be used individually, or two or more types of lactone ring structural units (B-4) such as described above may be used in combination.

Although no specific limitations are placed on the method by which the polymer including the lactone ring structural unit (B-4) is formed, production may be carried out by a method in which a monomer having a hydroxy group-containing side chain, such as a monomer having a structure represented by the following general formula (8) (for example, methyl 2-(hydroxymethyl)acrylate), is copolymerized with a monomer having an ester group, such as the aforementioned methacrylic acid ester monomer (A), and the resultant copolymer is subsequently subjected to heat treatment in the presence or absence of a specific catalyst to introduce a lactone ring structure into the polymer.

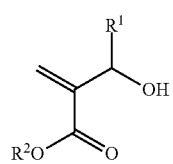

(8)

In general formula (8), R¹ represents a hydrogen atom or a substituted or unsubstituted alkyl group having a carbon number of 1 to 6. The alkyl group may, for example, be substituted with a hydroxy group.

$R^2$ represents a group having a carbon number of 1 to 12, and preferably a hydrocarbon group having a carbon number of 1 to 12. The hydrocarbon group may, for example, be substituted with a hydroxy group.

It is particularly suitable that $R^1$ is a hydrogen atom and $R^2$ is a methyl group.

The monomer having a structure represented by general formula (8) may remain unreacted in the methacrylic resin to an extent that the effects disclosed herein can be exhibited.

From a viewpoint of thermal stability and shaping processability, it is preferable that the methacrylic resin set forth above includes at least one structural unit selected from the group consisting of a maleimide-based structural unit (B-1) and a glutarimide-based structural unit (B-3) as the structural unit (B), and more preferable that the methacrylic resin includes a maleimide-based structural unit (B-1) as the structural unit (B).

Among maleimide-based structural units (B-1), an N-cyclohexylmaleimide-based structural unit and/or an N-aryl-substituted maleimide-based structural unit is preferable in view of ease of acquisition, and an N-aryl-substituted maleimide-based structural unit is more preferable, and an N-phenylmaleimide-based structural unit is even more preferable in view of the effect of imparting heat resistance that can be obtained through addition in a small amount.

The structural unit (B) having a cyclic structure-containing main chain is included in the methacrylic resin in a proportion of 3 mass % to 30 mass % from a viewpoint of heat resistance, thermal stability, strength, and fluidity of the methacrylic resin composition according to the present embodiment. From a viewpoint of imparting heat resistance and thermal stability to the methacrylic resin composition according to the present embodiment, the content of the structural unit (B) having a cyclic structure-containing main chain in the methacrylic resin is preferably 5 mass % or more, more preferably 7 mass % or more, and even more preferably 8 mass % or more. Moreover, from a viewpoint of maintaining a good balance of strength and fluidity required for a film, the content of the structural unit (B) having a cyclic structure-containing main chain in the methacrylic resin is preferably 28 mass % or less, more preferably 25 mass % or less, even more preferably 20 mass % or less, further preferably 18 mass % or less, and even further preferably less than 15 mass %.

Inclusion of the structural unit (B) having a cyclic structure-containing main chain in the methacrylic resin can inhibit thermal decomposition in a situation in which the methacrylic resin is placed in a high-temperature environment and can reduce the amount of volatile components that are generated. As a result, an effect of improving thermal stability of the methacrylic resin according to the present embodiment is achieved.

((Other Vinyl Monomer Unit (C) Copolymerizable with Methacrylic Acid Ester Monomer))

Examples of other vinyl monomer units (C) copolymerizable with a methacrylic acid ester monomer (hereinafter, also referred to as "monomer unit (C)") that may be included in the methacrylic resin according to the present embodiment include an aromatic vinyl monomer unit (C-1), an acrylic acid ester monomer unit (C-2), a vinyl cyanide monomer unit (C-3), and other monomer units (C-4).

One type of other vinyl monomer unit (C) that is copolymerizable with a methacrylic acid ester monomer may be used individually, or two or more types of other vinyl monomer units (C) that are copolymerizable with a methacrylic acid ester monomer may be used in combination.

An appropriate material for the monomer unit (C) can be selected depending on the properties required of the methacrylic resin according to the present embodiment, but in a case in which properties such as thermal stability, fluidity, mechanical properties, and chemical resistance are particularly necessary, at least one selected from the group consisting of an aromatic vinyl monomer unit (C-1), an acrylic acid ester monomer unit (C-2), and a vinyl cyanide monomer unit (C-3) is suitable.

[Aromatic Vinyl Monomer Unit (C-1)]

Although no specific limitations are placed on monomers that can be used to form an aromatic vinyl monomer unit (C-1) included in the methacrylic resin according to the present embodiment, an aromatic vinyl monomer represented by the following general formula (9) is preferable.

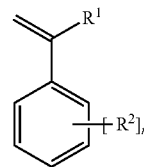

(9)

In general formula (9), $R^1$ represents a hydrogen atom or an alkyl group having a carbon number of 1 to 6. The alkyl group may, for example, be substituted with a hydroxy group.

$R^2$ is one selected from the group consisting of a hydrogen atom, an alkyl group having a carbon number of 1 to 12, an alkoxy group having a carbon number of 1 to 12, an aryl group having a carbon number of 6 to 8, and an aryloxy group having a carbon number of 6 to 8. Note that each $R^2$ may be the same group or a different group. Also, a cyclic structure may be formed by $R^2$ groups.

Moreover, n represents an integer of 0 to 5.

Specific examples of monomers represented by general formula (9) include, but are not specifically limited to, styrene, o-methylstyrene, m-methylstyrene, p-methylstyrene, 2,4-dimethylstyrene, 2,5-dimethylstyrene, 3,4-dimethylstyrene, 3,5-dimethylstyrene, p-ethylstyrene, m-ethylstyrene, o-ethylstyrene, p-tert-butylstyrene, 1-vinylnaphthalene, 2-vinylnaphthalene, 1,1-diphenylethylene, isopropenylbenzene (α-methylstyrene), isopropenyltoluene, isopropenylethylbenzene, isopropenylpropylbenzene, isopropenylbutylbenzene, isopropenylpentylbenzene, isopropenylhexylbenzene, and isopropenyloctylbenzene.

Of these examples, styrene and isopropenylbenzene are preferable, and styrene is more preferable from a viewpoint of imparting fluidity, reducing unreacted monomer through improvement of the polymerization conversion rate, and so forth.

The above examples may be selected as appropriate depending on the required properties of the methacrylic resin composition according to the present embodiment.

In a case in which an aromatic vinyl monomer unit (C-1) is used, the content thereof when the total amount of the monomer unit (A) and the structural unit (B) is taken to be 100 mass % is preferably 23 mass % or less, more preferably 20 mass % or less, even more preferably 18 mass % or less, further preferably 15 mass % or less, and even further preferably 10 mass % or less in view of the balance of heat resistance, residual monomer species reduction, and fluidity.

In a case in which the aromatic vinyl monomer unit (C-1) is used together with the maleimide-based structural unit (B-1) described above, a ratio (mass ratio) of the content of the monomer unit (C-1) relative to the content of the structural unit (B-1) (i.e., (C-1) content/(B-1) content) is preferably 0.3 to 5 from a viewpoint of processing fluidity in film shaping processing, an effect of silver streak reduction through residual monomer reduction, and so forth.

The upper limit for this ratio is preferably 5 or less, more preferably 3 or less, and even more preferably 1 or less from a viewpoint of maintaining good color tone and heat resistance. Moreover, the lower limit for this ratio is preferably 0.3 or more, and more preferably 0.4 or more from a viewpoint of residual monomer reduction.

One aromatic vinyl monomer (C-1) such as described above may be used individually, or two or more aromatic vinyl monomers (C-1) such as described above may be used in combination.

[Acrylic Acid Ester Monomer Unit (C-2)]

Although no specific limitations are placed on monomers that can be used to form an acrylic acid ester monomer unit (C-2) included in the methacrylic resin according to the present embodiment, an acrylic acid ester monomer represented by the following general formula (10) is preferable.

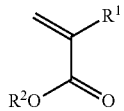

(10)

In general formula (10), $R^1$ represents a hydrogen atom or an alkoxy group having a carbon number of 1 to 12, and $R^2$ represents an alkyl group having a carbon number of 1 to 18.

The monomer used to form the acrylic acid ester monomer unit (C-2) is preferably methyl acrylate, ethyl acrylate, n-propyl acrylate, n-butyl acrylate, sec-butyl acrylate, 2-ethylhexyl acrylate, cyclohexyl acrylate, phenyl acrylate, or the like, and more preferably methyl acrylate, ethyl acrylate, or n-butyl acrylate from a viewpoint of increasing weatherability, heat resistance, fluidity, and thermal stability in the case of a methacrylic resin for the film according to the present embodiment, and is even more preferably methyl acrylate or ethyl acrylate from a viewpoint of ease of acquisition.

One type of acrylic acid ester monomer unit (C-2) such as described above may be used individually, or two or more types of acrylic acid ester monomer units (C-2) such as described above may be used together.

In a case in which an acrylic acid ester monomer unit (C-2) is used, the content thereof when the total amount of the monomer unit (A) and the structural unit (B) is taken to be 100 mass % is preferably 5 mass % or less, and more preferably 3 mass % or less from a viewpoint of heat resistance and thermal stability.

[Vinyl Cyanide Monomer Unit (C-3)]

Examples of monomers that may be used to form a vinyl cyanide monomer unit (C-3) included in the methacrylic resin according to the present embodiment include, but are not specifically limited to, acrylonitrile, methacrylonitrile, and vinylidene cyanide. Of these examples, acrylonitrile is preferable from a viewpoint of ease of acquisition and imparting chemical resistance.

One type of vinyl cyanide monomer unit (C-3) such as described above may be used individually, or two or more types of vinyl cyanide monomer units (C-3) such as described above may be used together.

In a case in which a vinyl cyanide monomer unit (C-3) is used, the content thereof when the total amount of the monomer unit (A) and the structural unit (B) is taken to be 100 mass % is preferably 15 mass % or less, more preferably 12 mass % or less, and even more preferably 10 mass % or less from a viewpoint of solvent resistance and retention of heat resistance.

[Monomer Unit (C-4) Other than (C-1) to (C-3)]

Examples of monomers that may be used to form a monomer unit (C-4) other than (C-1) to (C-3) that is included in the methacrylic resin according to the present embodiment include, but are not specifically limited to, amides such as acrylamide and methacrylamide; products obtained through esterification of both terminal hydroxy groups of ethylene glycol or an oligomer thereof with acrylic acid or methacrylic acid, such as ethylene glycol di(meth)acrylate, diethylene glycol di(meth)acrylate, triethylene glycol di(meth)acrylate, and tetraethylene glycol di(meth)acrylate; products obtained through esterification of two alcohol hydroxy groups with acrylic acid or methacrylic acid such as neopentyl glycol di(meth)acrylate and di(meth)acrylates; products obtained through esterification of polyhydric alcohol derivatives such as trimethylol propane and pentaerythritol with acrylic acid or methacrylic acid; and polyfunctional monomers such as divinylbenzene.

Among the monomers described above that may be used to form the monomer unit (C), at least one selected from the group consisting of methyl acrylate, ethyl acrylate, styrene, and acrylonitrile is preferable from a viewpoint of ease of acquisition.

The content of the other vinyl monomer unit (C) that is copolymerizable with a methacrylic acid ester monomer when the methacrylic resin is taken to be 100 mass % is 0 mass % to 20 mass %, preferably 0 mass % to 18 mass %, and more preferably 0 mass % to 15 mass % from a viewpoint of increasing the effect of imparting heat resistance through the structural unit (B).

Particularly in a case in which a crosslinkable polyfunctional (meth)acrylate having a plurality of reactive double bonds is used for the monomer unit (C), the content of the monomer unit (C) is preferably 0.5 mass % or less, more preferably 0.3 mass % or less, and even more preferably 0.2 mass % or less from a viewpoint of polymer fluidity.

In the present embodiment, the content of the structural unit (B) when the total amount of the structural unit (B) and the monomer unit (C) is taken to be 100 mass % is 45 mass % to 100 mass % from a viewpoint of heat resistance and optical properties of the methacrylic resin. In such a case, the content of the structural unit (C) is 0 mass % to 55 mass %. Moreover, the content of the structural unit (B) is preferably 50 mass % to 100 mass %, more preferably 50 mass % to 90 mass %, and even more preferably 50 mass % to 80 mass %.

The methacrylic resin may be one type of methacrylic resin used individually, or two or more types of methacrylic resins used together.

The following describes properties of the methacrylic resin according to the present embodiment.

<Weight Average Molecular Weight and Molecular Weight Distribution>

The weight average molecular weight (Mw) of the methacrylic resin according to the present embodiment is 65,000 to 300,000.

By setting the weight average molecular weight of the methacrylic resin within the range set forth above, the methacrylic resin and the methacrylic resin composition according to the present embodiment have excellent fluidity and excellent mechanical strength, such as Charpy impact strength. From a viewpoint of maintaining mechanical strength, the weight average molecular weight is preferably 65,000 or more, more preferably 70,000 or more, even more preferably 80,000 or more, and further preferably 100,000 or more. Moreover, from a viewpoint of ensuring fluidity in shaping processing, the weight average molecular weight is preferably 250,000 or less, more preferably 230,000 or less, even more preferably 220,000 or less, further preferably 200,000 or less, even further preferably 180,000 or less, and particularly preferably 170,000 or less.

The molecular weight distribution (weight average molecular weight (Mw)/number average molecular weight (Mn)) of the methacrylic resin is preferably 1.5 to 5 in view of the balance of fluidity, mechanical strength, and solvent resistance. The molecular weight distribution is more preferably 1.5 to 4.5, even more preferably 1.6 to 4, further preferably 1.6 to 3, and even further preferably 1.5 to 2.5.

The weight average molecular weight (Mw) and the number average molecular weight (Mn) can be measured by gel permeation chromatography (GPC). Specifically, standard methacrylic resins that can be acquired as reagents and have monodisperse weight average molecular weight, number average molecular weight, and peak molecular weight that are known and an analysis gel column that elutes higher molecular weight components earlier are used to prepare a calibration curve in advance from the elution time and weight average molecular weight of these standard methacrylic resins. Next, the weight average molecular weight and the number average molecular weight of a methacrylic resin sample that is a measurement target can be determined from the prepared calibration curve. Specifically, measurement can be performed by a method described in the subsequent EXAMPLES section.

<Proportions of Components within Specific Molecular Weight Ranges>

In the methacrylic resin according to the present embodiment, the content of components having a weight average molecular weight of 10,000 or less as measured by gel permeation chromatography (GPC) is preferably 0.1 mass % to 5.0 mass % from a viewpoint of improving processing fluidity, reducing poor external appearance of a shaped product, such as silver marks referred to as silver streaks in shaping, and preventing adhesion to a roller in film production.

A content of 0.1 mass % or more enables improvement of processing fluidity. The lower limit for this content is preferably 0.2 mass % or more, more preferably 0.5 mass % or more, and even more preferably 0.6 mass % or more. A content of 5 mass % or less can reduce poor surface appearance, such as by reducing silver streaks in shaping, improve mold release in shaping, inhibit adhesion to a roller in film production, and inhibit splitting when a film is held in stretching. The upper limit for this content is more preferably 4.0 mass % or less, even more preferably 3.0 mass % or less, and particularly preferably 2.0 mass % or less.

The content of components having a weight average molecular weight of 10,000 or less can be determined, for example, from an area ratio obtained from a GPC elution curve. Specifically, when the start point of the elution curve is taken to be A, the end point of the elution curve is taken to be B, a point on the base line at the elution time for a weight average molecular weight of 10,000 is taken to be X, and a point on the GPC elution curve at this elution time is taken to be Y as illustrated in FIG. 1, the content (mass %) of components having a weight average molecular weight of 10,000 or less can be determined as the area surrounded by a curve BY, a line segment BX, and a line segment XY as a proportion relative to the area of the GPC elution curve.

Measurement can suitably be performed by a method described in the subsequent EXAMPLES section.

In the methacrylic resin according to the present embodiment, the content of components having a weight average molecular weight of more than 10,000 and not more than 50,000 is preferably 10.0 mass % to 25.0 mass %.

A content of 10.0 mass % to 25.0 mass % can inhibit the formation of streaks in film shaping processing and provides improvement in terms of preventing adhesion to a roller in film shaping. From a viewpoint of imparting a good balance of processing properties such as processing fluidity, streak inhibition, and touch roller adhesion inhibition, the lower limit for this content is more preferably 12.0 mass % or more, and even more preferably 13.0 mass %, and the upper limit for this content is more preferably 24.0 mass % or less.

The content of components having a weight average molecular weight of more than 10,000 and not more than 50,000 can be determined in the same way as the content of components having a weight average molecular weight of 10,000 or less.

In the methacrylic resin according to the present embodiment, a ratio (b/a) of the content (b) of components having a weight average molecular weight of more than 50,000 relative to the content (a) of components having a weight average molecular weight of more than 10,000 and not more than 50,000 is preferably 2.5 to 8.5 from a viewpoint of obtaining a good balance of thermal stability and processability.

With regards to the ratio of high molecular weight components and low molecular weight components, due to the influence of viscosity difference between high molecular weight components and low molecular weight components in heated processing, a large ratio of low molecular weight components tends to provide excellent processing fluidity but increases roller adhesion in film processing, whereas a large ratio of high molecular weight components tends to facilitate formation of streaks in film processing.

In a case in which it is desirable to impart a good balance of the properties of both while providing improvement in terms of adhesion prevention, the ratio is preferably 3.0 or more, and more preferably 3.5 or more. On the other hand, in a case in which further improvement in terms of streaks in film processing is desirable, the ratio is preferably 8.0 or less, and more preferably 7.5 or less.

In the methacrylic resin according to the present embodiment, the total content of specific components including dimers, trimers, and the like that are any combination of the monomer (A), the monomer forming the structural unit (B), and the monomer (C) described above is required to be 0.01 mass % to 0.40 mass % from a viewpoint of preventing adhesion to a mold or roller in shaping processing, and inhibiting foaming in film production. The upper limit is preferably 0.35 mass % or less, more preferably 0.30 mass % or less, and particularly preferably 0.28 mass % or less in view of the balance of external appearance and adhesion. In a situation in which it is necessary to consider fluidity in shaping, the lower limit is preferably 0.02 mass % or more.

When the total content of these components is within any of the ranges set forth above, adhesion to a mold or film roller in shaping processing can be inhibited and shaping processability can be improved. However, a content of less than 0.01 mass % is not preferable because a complicated process is required to obtain such a content.

In the present embodiment, the specific components include dimer components and trimer components containing monomer species other than methyl methacrylate monomer and may suitably include dimers and trimers including monomer species of component (B) and/or component (C).

The total content of these components can be determined by gas chromatography/mass spectrometry (GC/MS) measurement.

The specific components in the present embodiment include components having similar volatility properties to the aforementioned dimers and trimers in GC/MS, and also include components of unidentifiable structure. Accordingly, the content of the specific components is indicated by the total content of components observed in a specific retention time range in GC/MS.

In terms of suitable columns that can be used in GC/MS measurement, a non-polar or slightly polar column is preferable, and a column having 5% phenyl-95% methylpolysiloxane as a stationary phase is more preferable. Specific examples include, 007-2, CP-Sil 8CB, DB-5, DB-5.625, DB-5ht, HP-5, HP-5 ms, OV®-5 (OV is a registered trademark in Japan, other countries, or both), PTE-5, PTE-5QTM, PAS-5, RSL-200, Rtx®-5 (Rtx is a registered trademark in Japan, other countries, or both), Rtx®-5ms, SAC-5, SE®-54 (SE is a registered trademark in Japan, other countries, or both), SPB®-5 (SPB is a registered trademark in Japan, other countries, or both), ULTRA-2, XTI-5, SE®-52, BP-5, PE-2, ZB-5, AT®-5 (AT is a registered trademark in Japan, other countries, or both), and EC®-5 (EC is a registered trademark in Japan, other countries, or both).

Helium gas can suitably be used as a carrier gas. The gas flow rate is preferably approximately 1 mL/min and is preferably controlled so as to be constant during measurement.

The sample injection volume is preferably approximately 1 μL.

Measurement by an internal standard method can suitably be adopted in GC/MS. One example of a method that can be used is described in the subsequent EXAMPLES section. No specific limitations are placed on the internal standard other than being a substance that has a different retention time to the retention time at which the specific components (target components) are observed, does not overlap with peaks of other components, and is a stable compound. The internal standard is preferably a hydrocarbon such as nonane, decane, or dodecane that is observed before the specific components or octadecyl 3-(3,5-di-tert-butyl-4-hydroxyphenyl)propionate or the like that is observed after the specific components, and is more preferably octadecyl 3-(3,5-di-tert-butyl-4-hydroxyphenyl)propionate observed after the specific components.

In a case in which octadecyl 3-(3,5-di-tert-butyl-4-hydroxyphenyl)propionate is used as the internal standard, the specific components including dimers and trimers are observed in a range from a retention time of 22 minutes until a retention time at which a peak of the internal standard is detected. The ratio of the specific components and the internal standard can be calculated from the ratio of the area between the aforementioned retention times and the area of the peak of the internal standard. The detection range for the specific components can be determined using data from the mass spectrum of peaks detected in GC/MS. For example, measurement may be performed by a method described in the subsequent EXAMPLES section. Note that FIGS. 2A and 2B are GC/MS charts for Example 4, which is in accordance with the present embodiment.

In a situation in which a peak due to an additive, such as a thermal stabilizer, appears in the above-described range from the retention time of 22 minutes to the retention time at which the peak of the internal standard is detected, calculation of the total amount of the specific components is performed by subtracting an area value of the peak due to the additive from the total area value for the above-described range.

One example of a method by which a measurement sample may be prepared is described in the subsequent EXAMPLES section.

Furthermore, the total content of the specific components is, more specifically, a value determined by GC/MS measurement using a specific device and specific conditions that are described in the subsequent EXAMPLES section.

The glass transition temperature of the methacrylic resin according to the present embodiment is preferably 115° C. or higher, more preferably 120° C. or higher, even more preferably 122° C. or higher, further preferably 123° C. or higher, even further preferably 124° C. or higher, and particularly preferably 125° C. or higher from a viewpoint of obtaining sufficient heat resistance.

The glass transition temperature can be measured by the midpoint method in accordance with ASTM D-3418. Specifically, the glass transition temperature can be measured by a method described in the subsequent EXAMPLES section.

(Methacrylic Resin Production Method)

No specific limitations are placed on the method by which the methacrylic resin according to the present embodiment is produced other than being a method by which the methacrylic resin according to the present embodiment set forth above can be obtained.

The methacrylic resin according to the present embodiment can be produced by bulk polymerization, solution polymerization, suspension polymerization, precipitation polymerization, or emulsion polymerization using monomers for forming a methacrylic acid ester monomer unit (A), a structural unit (B) having a cyclic structure-containing main chain, and, as necessary, another vinyl monomer unit (C) that is copolymerizable with a methacrylic acid ester monomer. It is preferable that bulk polymerization or solution polymerization, and more preferable that solution polymerization is used in production of the methacrylic resin.

Moreover, production of the methacrylic resin according to the present embodiment may be a continuous process or a batch process.

In the production method of the methacrylic resin according to the present embodiment, the monomers are preferably polymerized by radical polymerization.

The following provides a specific description of a case in which production is carried out by a batch process using solution polymerization by radical polymerization as one example of a method of producing the methacrylic resin according to the present embodiment.

The one example of a method of producing the methacrylic resin according to the present embodiment includes a compounding step of adding monomer into a reactor with an organic solvent as necessary, a polymerization step of adding a polymerization initiator into the reactor and carrying out a monomer polymerization reaction, and, as necessary, a devolatilization step of removing organic solvent and unreacted monomer.

((Compounding Step))

In the one example of a method of producing the methacrylic resin according to the present embodiment, a monomer that can form a methacrylic acid ester monomer unit (A), a monomer that can form a structural unit (B) having a cyclic structure-containing main chain, and, as necessary, a monomer that can form another vinyl monomer unit (C) that is copolymerizable with a methacrylic acid ester monomer and an organic solvent are initially compounded in a reactor (compounding step).

—Monomers—

The monomers are as previously described in relation to the monomer units (A) to (C) of the methacrylic resin according to the present embodiment.

Note that a polymerization inhibitor may remain in the monomers that are used to an extent that the polymerization reaction is not excessively impaired. The content of residual polymerization inhibitor relative to the total amount of all monomers is preferably 10 mass ppm or less, more preferably 5 mass ppm or less, and even more preferably 3 mass ppm or less from a viewpoint of polymerization reactivity and handleability.

—Organic Solvent—

The optionally used organic solvent is preferably a good solvent for the methacrylic resin in view of removal efficiency in the devolatilization step (described further below) for removing residual monomer from the methacrylic resin.

In view of the solubility of the copolymer forming the methacrylic resin, the solubility parameter δ of the organic solvent is preferably 7.0 $(cal/cm^3)^{1/2}$ to 12.0 $(cal/cm^3)^{1/2}$, more preferably 8.0 $(cal/cm^3)^{1/2}$ to 11.0 $(cal/cm^3)^{1/2}$, and even more preferably 8.2 $(cal/cm^3)^{1/2}$ to 10.5 $(cal/cm^3)^{1/2}$.

The solubility parameter δ can be determined, for example, with reference to non-patent literature such as "New Values of the Solubility Parameters from Vapor Pressure Data" by K. L. Hoy in P 76-P 118 of "Journal of Paint Technology, Vol. 42, No. 541, February 1970", and P-VII/675-P714 of "Polymer Handbook, Fourth Edition" by J. Brandrup et al.

Note that 1 $(cal/cm^3)^{1/2}$ is approximately 0.489 $(MPa)^{1/2}$.

Specific examples of organic solvents that can be used include aromatic hydrocarbons such as toluene, xylene, ethylbenzene, and mesitylene; alicyclic hydrocarbons such as cyclohexane, methylcyclohexane, and decalin; and ketone solvents such as methyl ethyl ketone and methyl isobutyl ketone.

Moreover, organic solvent recovered in the devolatilization step after polymerization may be used as the organic solvent.

In a case in which the recovered organic solvent contains unreacted monomer components, the compounding may be performed by analyzing the content of unreacted monomers contained in the organic solvent, and then only adding the required amounts of monomers thereto.

The additive amount of the organic solvent used in the polymerization step of the methacrylic resin according to the present embodiment is preferably an amount that enables polymerization to proceed without precipitation or the like of the copolymer or used monomers during production, and that can be easily removed.

In a case in which polymerization of the methacrylic resin is carried out by solution polymerization, the specific amount of the organic solvent is preferably 10 parts by mass to 200 parts by mass when the total amount of all used monomers is taken to be 100 parts by mass. The amount of the organic solvent is more preferably 25 parts by mass to 200 parts by mass, even more preferably 50 parts by mass to 200 parts by mass, and further preferably 50 parts by mass to 150 parts by mass.

—Reactor—

The reactor may be selected as appropriate in consideration of the size required from a viewpoint of amounts of materials and heat removal.

L/D of the reactor is preferably 0.5 to 50, more preferably 1 to 25, and even more preferably 1 to 10 from a viewpoint of stirring efficiency of the polymerization reaction solution.

The amount of monomers and/or organic solvent supplied into the reactor may be any amount without any particular problems so long as sufficient heat removal is possible. Polymerization may be carried out in a full state or may be carried out with a charging amount of 50% to 99% in the reactor. Moreover, polymerization may be carried out under reflux.

It is preferable that a stirring device is installed in the reactor. The stirring device that is used may, for example, be a stirring impeller such as a pitched-blade paddle impeller, a flat-blade paddle impeller, a propeller impeller, an anchor impeller, a Pfaudler impeller (swept back-blade impeller), a turbine impeller, a Brumagin impeller, a MAXBLEND impeller, a FULLZONE impeller, a ribbon impeller, a Super-Mix impeller, an Intermig impeller, a specialized impeller, or an axial flow impeller. Of these examples, a pitched-blade paddle impeller, a Pfaudler impeller, a MAXBLEND impeller, or a FULLZONE impeller is suitable.

The stirring speed in polymerization depends on the type of stirring device that is used, the stirring efficiency of the stirring impeller, the capacity of the polymerization tank, and so forth. The stirring speed should enable sufficient stirred mixing in both a low viscosity state at the start of polymerization and a high viscosity state at a later stage of polymerization, and is preferably approximately 1 rpm to 500 rpm in view of polymerization stability.

The method by which the monomers are introduced into the reactor is not specifically limited so long as the effects disclosed herein are obtained, and the monomers may be premixed and then introduced into the reactor or may be introduced into the reactor separately. It is preferable to premix some or all the monomers prior to introduction into the reactor in view of producibility and handleability.

When premixing is performed, some or all of an organic solvent that can be used in polymerization may be simultaneously mixed. In a case in which an organic solvent is used, it is preferable to use a solvent in which the monomers subjected to polymerization dissolve. The solubility parameter δ of the organic solvent is preferably 7.0 $(cal/cm^3)^{1/2}$ to 12.0 $(cal/cm^3)^{1/2}$.

In the compounding step, a molecular weight modifier or other additive (also useable in the subsequently described polymerization step) besides the monomers and the organic solvent may be added in advance, as necessary, so long as the effects disclosed herein can be exhibited.

((Polymerization Step))

In the one example of a method of producing the methacrylic resin according to the present embodiment, a polymerization initiator and, as necessary, a molecular weight modifier, other additives, and additional monomer are subsequently added to the reactor after the compounding step, and a monomer polymerization reaction is carried out (polymerization step).

In the polymerization step, the monomer polymerization reaction is initiated by starting addition of the polymerization initiator.

Note that the polymerization initiator may be added to the reactor after being dissolved in additional monomer and/or additional organic solvent.

—Polymerization Initiator—

The polymerization initiator used in the present embodiment may be any polymerization initiator that decomposes to generate active radicals at the polymerization temperature. The polymerization initiator may be selected such as to satisfy a half-life of 0.6 minutes to 60 minutes, and preferably 1 minute to 30 minutes at the polymerization temperature because it is necessary to reach the required polymerization conversion rate within the residence time. However, note that even an initiator having a half-life of longer than 60 minutes at the polymerization temperature can be used as a polymerization initiator that generates a suitable amount of active radicals for the present embodiment through charging of a specific amount in a single addition or over approximately 10 minutes. In order to achieve the required polymerization conversion rate in such a situation, the polymerization initiator is selected such as to satisfy a half-life of 60 minutes to 1,800 minutes, and preferably 260 minutes to 900 minutes at the polymerization temperature.

A suitable polymerization initiator for use can be selected as appropriate in consideration of the polymerization temperature and the polymerization time. For example, initiators described in the 13$^{th}$ edition of "Organic Peroxides" by NOF Corporation, technical documents of Atochem Yoshitomi, Ltd., "Azo Polymerization Initiators" by Wako Pure Chemical Industries, Ltd., and the like can suitably be used, and the half-life thereof can easily be determined from various constants and the like described therefor.

Examples of polymerization initiators that can be used in a case in which radical polymerization is performed include, but are not limited to, organic peroxides such as di-t-butyl peroxide, lauroyl peroxide, stearoyl peroxide, benzoyl peroxide, t-butyl peroxyneodecanoate, t-butyl peroxypivalate, dilauroyl peroxide, dicumyl peroxide, t-butyl peroxy-2-ethylhexanoate, 1,1-bis(t-butylperoxy)-3,3,5-trimethylcyclohexane, 1,1-bis(t-butylperoxy)cyclohexane (for example, PERHEXA® C (PERHEXA is a registered trademark in Japan, other countries, or both)), acetyl peroxide, caprylyl peroxide, 2,4-dichlorobenzoyl peroxide, isobutyl peroxide, acetyl cyclohexyl sulfonyl peroxide, t-butyl peroxypivalate, isopropyl peroxydicarbonate, isobutyl peroxydicarbonate, sec-butyl peroxydicarbonate, n-butyl peroxydicarbonate, 2-ethylhexyl peroxydicarbonate, bis(4-t-butylcyclohexyl) peroxydicarbonate, t-amyl peroxy-2-ethylhexanoate, 1,1,3,3-tetramethylbutyl peroxyethylhexanoate, 1,1,2-trimethylpropyl peroxy-2-ethylhexanoate, 2,5-dimethyl-2,5-di(t-butylperoxy)hexane (for example, PERHEXA® 25B), t-butylperoxy isopropyl monocarbonate, t-amyl peroxy isopropyl monocarbonate, 1,1,3,3-tetramethylbutyl peroxy isopropyl monocarbonate, 1,1,2-trimethylpropyl peroxyisopropyl monocarbonate, 1,1,3,3-tetramethylbutyl peroxyisononanoate, 1,1,2-trimethylpropyl peroxyisononanoate, and t-butyl peroxybenzoate, azo compounds such as azobisisobutyronitrile, azobisisovaleronitrile, azobisdimethylvaleronitrile, azobiscyclohexanenitrile, 1,1-azobis(1-cyclohexanecarbonitrile), 2,2'-azobis-4-methoxy-2,4-azobisisobutyronitrile, 2,2'-azobis-2,4-dimethylvaleronitrile, 2,2'-azobis-2-methylbutyronitrile, 1,1'-azobis(1-acetoxy-1-phenylethane), dimethyl-2,2'-azobisisobutyrate, and 4,4'-azobis-4-cyanovaleric acid, and other typically used radical polymerization initiators.

These radical polymerization initiators may be combined with an appropriate reducing agent and used as a redox initiator.

One of these polymerization initiators may be used individually, or two or more of these polymerization initiators may be used in combination.

The polymerization initiator is added in an amount required to obtain a desired polymerization rate in the polymerization reactor.

In the polymerization reaction, the degree of polymerization can be increased by increasing the supplied amount of polymerization initiator. However, use of a large amount of initiator tends to reduce the overall molecular weight and reduce polymerization stability due to excessive heat caused by an increase in the amount of heat generated in polymerization.

From a viewpoint of facilitating the achievement of the desired molecular weight and ensuring polymerization stability, the amount of the polymerization initiator that is used per 100 parts by mass, in total, of all used monomers is preferably 0 parts by mass to 1 part by mass, more preferably 0.001 parts by mass to 0.8 parts by mass, and even more preferably 0.01 parts by mass to 0.5 parts by mass. The additive amount of the polymerization initiator can be selected as appropriate in consideration of the temperature at which polymerization is carried out and the half-life of the initiator.

In the method of producing the methacrylic resin according to the present embodiment, it is preferable that the amount of radicals in the polymerization reaction system is optimized from (a) a viewpoint of restricting the amount of oligomers (for example, dimers and trimers) and low molecular weight components (for example, components having a weight average molecular weight of 500 to 10,000) produced in a later stage of polymerization, (b) a viewpoint of increasing the polymerization conversion rate, (c) a viewpoint of increasing the molecular weight of the resultant methacrylic resin, and (d) a viewpoint of polymerization stability through suppression of excessive heat in polymerization.

More specifically, in the present embodiment, it is preferable that the type of initiator, amount of initiator, polymerization temperature, and so forth are appropriately selected such that a ratio of the total amount of radicals generated by the polymerization initiator relative to the total amount of unreacted monomers remaining in the reaction system is maintained constantly at a specific value or less.

The following describes a suitable method for addition of the polymerization initiator in the polymerization step.

This method controls the amount of radicals generated in polymerization such that the total amount of components in the methacrylic resin and the amount of components having a weight average molecular weight of 10,000 or less can be kept within a desired range.

In the present embodiment, when the total time from starting addition of the polymerization initiator to ending addition of the polymerization initiator is taken to be B hours, it is preferable that in a period from starting addition of the polymerization initiator to 0.5×B hours thereafter, there is at least one instance in which the additive amount of the polymerization initiator per unit time is less than the additive amount of the polymerization initiator per unit time when starting addition thereof (condition (i)).

In particular, from a viewpoint of optimizing the radical concentration, it is preferable that the addition rate is gradually reduced.

In the present embodiment, in addition to condition (i), the additive amount of the polymerization initiator per unit time during a period from 0.01×B hours after starting addition of the polymerization initiator to 0.3×B hours after starting addition of the polymerization initiator is preferably 70% or less of the additive amount of the polymerization initiator per unit time when starting addition thereof (condition (ii)), more preferably 60% or less, even more preferably 50% or less, and particularly preferably 40% or less.

For example, in a case in which the addition rate (additive amount per unit time) of the polymerization initiator at the start of polymerization is 100 ppm/hr and the total time from starting addition of the polymerization initiator to ending addition of the polymerization initiator (B hours) is 10 hours, it is preferable that the addition rate (additive amount per unit time) during a period from 0.1 hours after starting addition of the polymerization initiator to 3 hours after starting addition of the polymerization initiator is 70 ppm/hr or less.

In addition to the above, it is more suitable in the present embodiment that the average additive amount of the polymerization initiator per unit time during a period from 0.01×B hours after starting addition of the polymerization initiator to 0.3×B hours after starting addition of the polymerization initiator is preferably 70% or less of the average additive amount of the polymerization initiator per unit time during a period from starting addition of the polymerization initiator to 0.01×B hours after starting addition of the polymerization initiator, more preferably 60% or less, even more preferably 50% or less, and particularly preferably 40% or less.

In the present embodiment, in addition to condition (i), the additive amount of the polymerization initiator per unit time during a period from 0.7×B hours after starting addition of the polymerization initiator to 1.0×B hours after starting addition of the polymerization initiator is preferably 25% or less of the additive amount of the polymerization initiator per unit time when starting addition thereof (condition (iii)), more preferably 20% or less, and even more preferably 18% or less.

For example, in a case in which the addition rate (additive amount per unit time) of the polymerization initiator at the start of polymerization is 100 ppm/hr and the total time from starting addition of the polymerization initiator to ending addition of the polymerization initiator (B hours) is 10 hours, it is preferable that the addition rate (additive amount per unit time) during a period from 7 hours after starting addition of the polymerization initiator to 10 hours after starting addition of the polymerization initiator is 25 ppm/hr or less.

In addition to the above, it is more suitable in the present embodiment that the average additive amount of the polymerization initiator per unit time during a period from 0.7×B hours after starting addition of the polymerization initiator to 1.0×B hours after starting addition of the polymerization initiator is preferably 25% or less of the average additive amount of the polymerization initiator per unit time during a period from starting addition of the polymerization initiator to 0.01×B hours after starting addition of the polymerization initiator, more preferably 20% or less, and even more preferably 18% or less.

Conditions (ii) and (iii) are more preferably adopted in combination.

Furthermore, in the present embodiment, in addition to condition (i), it is preferable that when the total additive amount of the polymerization initiator is taken to be 100 mass %, the additive amount of the polymerization initiator during a period from 0.5×B hours after starting addition of the polymerization initiator to 1.0×B hours after starting addition of the polymerization initiator is 20 mass % to 80 mass % (condition (iv)), more preferably 20 mass % to 70 mass %, and even more preferably 20 mass % to 60 mass %.

Moreover, in the present embodiment, in addition to condition (i), the polymerization reaction time during which the monomer polymerization reaction is carried out is preferably 1.0×B hours to 5.0×B hours (condition (v)), more preferably 1.0×B hours to 4.5×B hours, and even more preferably 1.0×B hours to 4.0×B hours.

Conditions (iv) and (v) are more preferably adopted in combination.

In the case of any of (i) to (v), the method by which the polymerization initiator is supplied is preferably through dissolving the polymerization initiator in a monomer and/or organic solvent used in the polymerization reaction in advance and then supplying the polymerization initiator therewith from a viewpoint of supply stability. The monomer and/or organic solvent that is used is preferably the same as used in the polymerization reaction. It is more preferable that the polymerization initiator is supplied in a dissolved state in an organic solvent from a viewpoint of avoiding blockage of polymerization piping and the like.

—Molecular Weight Modifier—

Examples of molecular weight modifiers that may optionally be used include chain transfer agents and iniferters.

In the production process of the methacrylic resin contained in the methacrylic resin composition according to the present embodiment, the molecular weight of the produced polymer can be controlled to an extent that the objectives of this disclosure are not impeded.

The molecular weight can be controlled through use of a chain transfer agent such as an alkyl mercaptan, dimethylacetamide, dimethylformamide, or triethylamine; an iniferter such as a dithiocarbamate, triphenylmethyl azobenzene, or a tetraphenylethane derivative; or the like as the aforementioned chain transfer agent or iniferter. Moreover, the molecular weight can be controlled by adjusting the additive amount of such chain transfer agents and iniferters.

In a case in which a chain transfer agent or iniferter such as described above is used, an alkyl mercaptan is suitable in terms of handleability and stability. Examples of alkyl mercaptans that can be used include, but are not limited to, n-butyl mercaptan, n-octyl mercaptan, n-dodecyl mercaptan, t-dodecyl mercaptan, n-tetradecyl mercaptan, n-octadecyl mercaptan, 2-ethylhexyl thioglycolate, ethylene glycol dithioglycolate, trimethylolpropane tris(thioglycolate), and pentaerythritol tetrakis(thioglycolate).

A molecular weight modifier such as described above can be appropriately added in accordance with the required molecular weight. In general, the molecular weight modifier is used within a range of 0.001 parts by mass to 3 parts by mass per 100 parts by mass, in total, of all used monomers.

Other methods of controlling the molecular weight include changing the polymerization method, adjusting the amount of polymerization initiator, and changing the polymerization temperature.

One of these methods of molecular weight control may be used individually, or two or more of these methods may be used together.

A chain transfer agent (molecular weight modifier) may be used in the methacrylic resin according to the present embodiment with the aim of adjusting the molecular weight and improving polymer thermal stability. The type of chain transfer agent that is used and the method of use thereof are not limited so long as the effects disclosed herein can be exhibited.

In the methacrylic resin according to the present embodiment, it is necessary to control the total amount of components including dimers and trimers to an appropriate amount. Moreover, from a viewpoint of controlling the amount of components having a weight average molecular weight of 10,000 or less to an appropriate amount, it is preferable that a method is selected that ensures that the amount of remaining chain transfer agent is not excessive relative to the amount of remaining monomer in the polymerization reaction system.

Suitable examples of methods of supplying the chain transfer agent include a method in which the chain transfer agent is dissolved in a monomer in advance, a method in which the chain transfer agent is added in a single addition and/or consecutively at a stage at which the degree of polymerization is 50% or less, a method in which the chain transfer agent is added in a single addition and/or continuously in a period until the degree of polymerization is 90%, and a method in which the amount of the chain transfer agent that is added is gradually reduced.

—Other Additives—

No specific limitations are placed on other additives that may optionally be used so long as the effects disclosed herein can be exhibited, and such other additives may be selected as appropriate depending on the objective.

The dissolved oxygen concentration in the polymerization solution in the polymerization step is not specifically limited but is preferably 10 ppm or less.

The dissolved oxygen concentration can be measured, for example, using a dissolved oxygen (DO) meter B-505 (produced by Iijima Electronics Corporation).

Examples of methods by which the concentration of dissolved oxygen can be reduced include a method in which an inert gas is bubbled into the polymerization solution, a method in which an operation of pressurizing the inside of a vessel containing the polymerization solution to approximately 0.2 MPa with an inert gas and then releasing the pressure is repeated prior to polymerization, and a method in which an inert gas is passed through a vessel containing the polymerization solution.

In a case in which the methacrylic resin is produced by solution polymerization, the polymerization temperature is not specifically limited so long as it is a temperature at which polymerization proceeds, but from a viewpoint of producibility, the polymerization temperature is preferably 50° C. to 200° C., more preferably 80° C. to 200° C., even more preferably 80° C. to 180° C., further preferably 80° C. to 160° C., and particularly preferably 90° C. to 160° C.

Although no specific limitations are placed on the polymerization reaction time other than being a time that enables achievement of the required degree of polymerization, the polymerization reaction time is preferably 0.5 hours to 15 hours, more preferably 1 hour to 12 hours, and even more preferably 1 hour to 10 hours from a viewpoint of producibility.

Note that the polymerization reaction time is the time from starting addition of the polymerization initiator until termination of the polymerization reaction, or the time from starting addition of the polymerization initiator until starting removal of the polymerization reaction solution from the reactor.

The method by which the monomer polymerization reaction is terminated in the polymerization step may be a commonly known method that is selected as appropriate depending on the reaction system.

((Devolatilization Step))

A devolatilization device may be used to remove organic solvent and unreacted monomer from a polymerization reaction product that is taken out of the polymerization reactor. Removed solvent may be reused in the polymerization reaction after undergoing a refinement operation.

A device that enables heat treatment of the polymerization reaction product at a temperature of 150° C. to 320° C., and also enables separation and collection of volatile content can suitably be used as the devolatilization device.

Examples include an extruder having a vent at one or a plurality of locations, an SC processor, a KRC kneader, a gear pump-equipped vacuum tank, a thin film evaporator EXEVA for high viscous products, and a flash drum.

One of these devolatilization devices may be used individually, or two or more of these devolatilization devices may be used together.

Herein, it is preferable that the total residual volatile content contained in the resin after devolatilization in the devolatilization step is 1 mass % or less.

The methacrylic resin according to the present embodiment can be produced by the production method set forth above.

(Methacrylic Resin Composition)

The methacrylic resin composition according to the present embodiment contains the methacrylic resin set forth above and may optionally further contain a rubbery polymer, another resin other than the methacrylic resin, and additives.

—Rubbery Polymer—

A rubbery polymer may be contained in the methacrylic resin composition according to the present embodiment within a range not exceeding 3.5 parts by mass per 100 parts by mass of the methacrylic resin. Through inclusion of a rubbery polymer in an amount of preferably 0.5 parts by mass or more, more preferably 1 part by mass or more, and even more preferably 1.5 parts by mass or more, an effect of inhibiting film adhesion to a roller in film shaping can be obtained. Moreover, through inclusion of a rubbery polymer in an amount of 3.5 parts by mass or less, and preferably 3.0 parts by mass or less, optical properties of the resin can be preserved.

The rubbery polymer is not specifically limited so long as it can exhibit the aforementioned effect and may be a commonly known material.

For example, rubber particles having a multilayer structure of a typical butadiene-based ABS rubber, acrylic rubber, polyolefin rubber, silicone rubber, fluororubber, or the like may be used.

In a case in which the film according to the present embodiment is required to have high transparency, a rubbery polymer having a similar refractive index to the methacrylic resin set forth above is appropriate, and an acrylic rubbery polymer is particularly appropriate.

Examples of rubbery polymers that can suitably be used in the present embodiment include, but are not limited to, acrylic rubbery polymers proposed in the first to third examples, set forth below.

First Example: Rubbery Polymer Disclosed in JP S60-17406 B

The rubbery polymer of the first example comprises multilayer structure particles produced by the following steps (A) to (C).

Step (A): A first layer formation step in which emulsion polymerization of methyl methacrylate individually or of a mixture of methyl methacrylate and a monomer that is copolymerizable therewith is carried out to obtain a dispersion liquid of a polymer that has a glass transition point of 25° C. or higher and is composed mainly of methyl methacrylate Step (B): A second layer formation step in which a mixture that contains an alkyl acrylate, a monomer that is copolymerizable therewith or a polyfunctional crosslinking agent, and a polyfunctional grafting agent in a proportion of 0.1 mass % to 5 mass % relative to the total weight of the mixture and that forms a copolymer having a glass transition point of 25° C. or lower upon polymerization is added to the product obtained through step (A) and emulsion polymerization is carried out Step (C): A third layer formation step in which stepwise emulsion polymerization of methyl methacrylate or a monomer mixture composed mainly thereof that forms a polymer having a glass transition temperature of 25° C. or higher upon polymerization is carried out with the product obtained through step (B) while increasing a chain transfer agent in steps The multilayer structure particles are multilayer structure particles formed from acrylic rubber in which the molecular weight of the third layer decreases gradually from inside to outside.

Second Example: Rubbery Polymer Disclosed in JP H8-245854 A

The rubbery polymer of the second example is an acrylic multilayer structure polymer powder described below.

The acrylic multilayer structure polymer powder has a polymer melting onset temperature of 235° C. or higher. An inner layer contains a polymer that has a glass transition temperature Tg of 25° C. or lower when polymerized individually. The inner layer includes at least one soft polymer layer. The outermost layer is a hard polymer layer containing a polymer for which Tg is 50° C. or higher when polymerized individually.

The rubber polymer of the second example is an acrylic multilayer structure polymer powder containing coagulated powder obtained through coagulation of an emulsion latex of an acrylic multilayer structure polymer. The proportion of fine powder having a particle diameter of 212 μm or less among the coagulated powder after drying is 40 mass % and the volume of pores having a pore diameter of 5 μm or less in the coagulated powder after drying is 0.7 cc or less per unit area as measured by mercury intrusion.

Third Example: Rubbery Polymer Disclosed in JP H7-68318 B

The rubbery polymer of the third example is a multilayer structure acrylic polymer satisfying the following requirements (a) to (g).

Specifically, the multilayer structure polymer includes:

(a) 25 mass % to 45 mass % of an innermost hard layer polymer obtained through polymerization of a monomer mixture containing 90 mass % to 99 mass % of methyl methacrylate, 1 mass % to 10 mass % of an alkyl acrylate in which the alkyl group has a carbon number of 1 to 8, and 0.01 mass % to 0.3 mass % of at least one graft bondable monomer selected from the group consisting of allyl, methallyl, and crotyl esters of α,β-unsaturated carboxylic acids that are copolymerizable therewith;

(b) 35 mass % to 45 mass % of a soft layer polymer obtained through polymerization, in the presence of the innermost hard layer polymer, of a monomer mixture containing 70 mass % to 90 mass % of n-butyl acrylate, 10 mass % to 30 mass % of styrene, and 1.5 mass % to 3.0 mass % of at least one graft bondable monomer selected from the group consisting of allyl, methallyl, and crotyl esters of α,β-unsaturated carboxylic acids that are copolymerizable therewith; and (c) 20 mass % to 30 mass % of an outermost hard layer polymer obtained through polymerization, in the presence of the innermost hard layer polymer and the soft layer polymer, of a mixture containing 90 mass % to 99 mass % of methyl methacrylate and 1 mass % to 10 mass % of a monomer having an alkyl group carbon number of 1 to 8, wherein (d) the weight ratio of soft layer polymer/(innermost hard layer polymer+soft layer polymer) is 0.45 to 0.57, (e) the average particle diameter is 0.2 μm to 0.3 μm, and when the multilayer structure acrylic polymer is separated using acetone, (f) the graft rate is 20 mass % to 40 mass %, and (g) the tensile elasticity of an acetone-insoluble portion is 1,000 kg/cm$^2$ to 4,000 kg/cm$^2$.

Other examples of rubbery polymers that may be used include the following particles.

For example, acrylic rubber particles having a three or four layer structure or the like such as described in JP S55-27576 B, JP S58-1694 B, JP S59-36645 B, JP S59-36646 B, JP S62-41241 B, JP S59-202213 A, JP S63-27516 A, JP S51-129449 A, JP S52-56150 A, JP S50-124647 A, and so forth may be used.

The rubbery polymer contained in the methacrylic resin composition according to the present embodiment preferably has a multilayer structure.

In a case in which the rubbery polymer has a multilayer structure, a larger number of layers in the rubbery polymer enables greater control of elasticity of the rubbery polymer to within a suitable range. However, when film color tone and the like in a case in which a rubbery polymer is included are taken into account, particles having a structure including three or more layers are preferable, and acrylic rubber particles having a structure including three or more layers are more preferable.

The use of rubber particles having a structure with three or more layers as the rubbery polymer tends to inhibit thermal degradation in shaping processing of the film according to the present embodiment and deformation of the rubbery polymer upon heating, and tends to preserve heat resistance and transparency of the film.

The rubbery polymer having a structure including three or more layers comprises rubber particles having a structure in which a soft layer composed of an elastomeric polymer and a hard layer composed of a glassy polymer are laminated, and a preferable example thereof is particles having a three layer structure in which a hard layer (first layer), a soft layer (second layer), and a hard layer (third layer) are formed in this order from an inner side.

The inclusion of hard layers as an innermost layer and an outermost layer tends to inhibit deformation of the rubbery polymer, whereas inclusion of a soft component in a central layer tends to impart good toughness.

A rubbery polymer including three layers may, for example, be formed from a multilayer structure graft copolymer. The multilayer structure graft copolymer may be produced, for example, using methyl methacrylate and a monomer that is copolymerizable with methyl methacrylate.

Examples of the monomer that is copolymerizable with methyl methacrylate include, but are not limited to, commonly known monofunctional monomers such as (meth)acrylic acid, (meth)acrylates other than methyl methacrylate, styrene, and α-methylstyrene, and polyfunctional monomers such as ethylene glycol di(meth)acrylate, polyethylene glycol di(meth)acrylate, 1,3-butylene glycol di(meth)acrylate, 1,4-butanediol di(meth)acrylate, triallyl isocyanurate, diallyl maleate, and divinylbenzene.

One of these monomers may be used individually, or two or more of these monomers may be used together as necessary.

Specifically, in a case in which the rubbery polymer has a three layer structure, a copolymer forming an innermost layer thereof is preferably a copolymer obtained using 65 mass % to 90 mass % of methyl methacrylate and 10 mass % to 35 mass % of another copolymerizable monomer that is copolymerizable with methyl methacrylate.

Moreover, the other copolymerizable monomer that is copolymerizable with methyl methacrylate in this copolymer preferably includes 0.1 mass % to 5 mass % of an acrylic acid ester monomer, 5 mass % to 35 mass % of an aromatic vinyl compound monomer, and 0.01 mass % to 5 mass % of a copolymerizable polyfunctional monomer from a viewpoint of appropriate refractive index control.

Although no specific limitations are placed on the acrylic acid ester monomer (monomer forming innermost layer in copolymer), n-butyl acrylate and 2-hexyl acrylate are preferable.

Examples of the aromatic vinyl compound monomer include the same aromatic vinyl compounds as can be used as monomers in the methacrylic resin. Styrene or a derivative thereof is preferable from a viewpoint of adjusting the refractive index of the innermost layer to provide the film according to the present embodiment with good transparency.

Although no specific limitations are placed on the copolymerizable polyfunctional monomer, ethylene glycol di(meth)acrylate, polyethylene glycol di(meth)acrylate, 1,3-butylene glycol di(meth)acrylate, 1,4-butanediol di(meth)acrylate, allyl (meth)acrylate, triallyl isocyanurate, diallyl maleate, divinylbenzene, and the like are preferable. One of these monomers may be used individually, or two or more of these monomers may be used together. Of these monomers, allyl (meth)acrylate is more preferable.

The second layer of the rubbery polymer including three layers (i.e., the soft layer) is an elastomeric copolymer that displays rubber elasticity and is important for providing the film with excellent impact strength.

The second layer is preferably formed from a copolymer of an alkyl acrylate and a monomer that is copolymerizable with the alkyl acrylate or from a polymer of a copolymerizable polyfunctional monomer, for example.

Examples of the alkyl acrylate include, but are not specifically limited to, methyl acrylate, ethyl acrylate, n-butyl acrylate, and 2-ethylhexyl acrylate. One of these alkyl acrylates may be used individually, or two or more of these alkyl acrylates may be used together. In particular, n-butyl acrylate and 2-ethylhexyl acrylate are preferable.

The other monomer that is copolymerizable with the alkyl acrylate may be a typical monomer without any specific limitations. However, styrene or a derivative thereof is preferable from a viewpoint of adjusting the refractive index of the second layer to match the methacrylic resin and thereby obtain good transparency.

Although no specific limitations are placed on the copolymerizable polyfunctional monomer, ethylene glycol di(meth)acrylate, polyethylene glycol di(meth)acrylate, 1,3-butylene glycol di(meth)acrylate, 1,4-butanediol di(meth)acrylate, allyl (meth)acrylate, triallyl isocyanurate, diallyl maleate, divinylbenzene, and the like are preferable. One of these copolymerizable polyfunctional monomers may be used individually, or two or more of these copolymerizable polyfunctional monomers may be used together.

In a case in which the rubbery polymer has a three layer structure, the outermost layer is preferably formed from a copolymer including 70 mass % to 100 mass % of methyl methacrylate and 0 mass % to 30 mass % of another copolymerizable monomer that is copolymerizable with methyl methacrylate.

Although no specific limitations are placed on the other copolymerizable monomer that is copolymerizable with methyl methacrylate and is used in formation of the outermost layer, n-butyl acrylate and 2-hexyl acrylate are preferable.

In a case in which the rubbery polymer includes three layers, the rubbery polymer may contain an elastomeric polymer having a crosslinked structure. The elastomeric polymer having a crosslinked structure is preferably contained in the second layer.

The elastomeric polymer is obtained through copolymerization of a polyfunctional monomer, and a crosslinked structure can be formed in the polymer. The crosslinked structure in the elastomeric polymer imparts an appropriate level of rubber elasticity and can maintain its form in a dispersed state without dissolving in a monomer mixture.

The polyfunctional monomer used to form the crosslinked structure may be a compound that is copolymerizable with methyl methacrylate and methyl acrylate.

The amount of the polyfunctional monomer that is used is preferably 0.1 mass % to 5 mass % relative to the entire second layer. An amount of 0.1 mass % or more enables a sufficient crosslinking effect, whereas an amount of 5 mass % or less enables appropriate crosslinking strength and an excellent rubber elasticity effect. Moreover, when the amount of the polyfunctional monomer that is used is 0.1 mass % or more, the elastomeric polymer can maintain the form of a rubbery elastic body without dissolving or swelling even in a situation in which a cast polymerization process is implemented.

In addition, a polyfunctional grafting agent is preferably used in the second layer to form graft bonds for providing close affinity with a polymer of the subsequently described third layer.

The polyfunctional grafting agent is a polyfunctional monomer having different functional groups and examples thereof include, but are not limited to, allyl esters of acrylic acid, methacrylic acid, maleic acid, fumaric acid, and the like. Of these examples, allyl acrylate and allyl methacrylate are preferable.

The amount of the polyfunctional grafting agent that is used is preferably within a range of 0.1 mass % to 3 mass % relative to the entire second layer. Use of 0.1 mass % or more of a polyfunctional grafting agent enables a sufficient grafting effect, whereas use of 3 mass % or less of a polyfunctional grafting agent prevents reduction of rubber elasticity.

In polymerization of the third layer (outermost layer), a chain transfer agent may be used for molecular weight adjustment to obtain good affinity with the methacrylic resin.

It is necessary to match the refractive index of the dispersed rubbery polymer and the refractive index of the methacrylic resin in order to provide the film according to the present embodiment with good transparency. However, in a case in which an alkyl acrylate is used as a main component in the second layer as described above, it is extremely difficult to achieve perfect matching of the refractive index of the second layer to the methacrylic resin. For example, in a case in which an alkyl acrylate and styrene or a derivative thereof are copolymerized in the second layer with the aim of refractive index matching, although the refractive indices may be roughly equal and transparency may be improved in a certain temperature region, a change in temperature leads to divergence of the refractive indices and deterioration of transparency.

One example of a means of avoiding this problem is a method in which a first layer having a refractive index roughly matching that of the methacrylic resin is provided. Reducing the thickness of the second layer is also an effective method for preventing deterioration of transparency of the film according to the present embodiment.

The average particle diameter of the rubbery polymer is preferably 0.03 µm to 1 µm, more preferably 0.05 µm to 0.7 µm, even more preferably 0.05 µm to 0.5 µm, further preferably 0.05 µm to 0.4 µm, and even further preferably 0.05 µm to 0.3 µm from a viewpoint of providing the film according to the present embodiment with impact strength, a viewpoint of surface smoothness, and a viewpoint of obtaining the desired film thickness.

When the average particle diameter of the rubbery polymer is 0.03 µm or more, sufficient impact strength tends to be obtained in the film according to the present embodiment, and when the average particle diameter of the rubbery polymer is 1 µm or less, it is possible to prevent the appearance of fine ripple-like defects at the surface of the film according to the present embodiment and obtain mirror surface properties, and it is possible to suppress reduction in surface gloss of a stretched section in a situation in which heated shaping is performed and ensure transparency.

The average particle diameter of the rubbery polymer can be measured by conventional and commonly known methods. For example, the methods described below in (1) and (2) may be used.

(1) Part of a shaped product of the methacrylic resin composition is cut out by a circular saw and then a sample for observation is prepared by a $RuO_4$ (ruthenium oxide) staining, ultrathin sectioning method. The cross-sections of rubber particles that have been dyed are observed using a transmission electron microscope produced by Hitachi, Ltd. (model: H-600), and then images thereof are recorded. The diameters of 20 representative particles that have been printed at high magnification are measured using a scale and an average value of the particle diameters is calculated to determine the average particle diameter of the rubber particles.

(2) An emulsion of the rubbery polymer is sampled and is diluted with water to a solid content of 500 ppm. Absorbance thereof at a wavelength of 550 nm is then measured using a UV1200V spectrophotometer (produced by Shimadzu Corporation). The average particle diameter of the rubbery polymer is then determined from the measured value using a calibration curve prepared by measuring absorbance in the same way with respect to samples for which the particle diameter has been measured from transmission electron microscope photographs.

Roughly the same particle diameter measurement value can be obtained in both of the measurement methods (1) and (2).

The difference between the refractive index of the methacrylic resin and the refractive index of the rubbery polymer is preferably 0.03 or less, more preferably 0.025 or less, and even more preferably 0.02 or less from a viewpoint of transparency and a viewpoint of temperature dependence of transparency in the film according to the present embodiment.

The method by which the rubbery polymer is produced may, for example, be emulsion polymerization.

Specifically, in a case in which the rubbery polymer includes three layers as described above, the rubbery polymer (particles) can easily be obtained as a latex by first adding a monomer mixture for the first layer and completing polymerization thereof in the presence of an emulsifier and a polymerization initiator, subsequently adding a monomer mixture for the second layer and completing polymerization thereof, and then adding a monomer mixture for the third layer and completing polymerization thereof.

The rubbery polymer may be collected as a powder from the latex by a commonly known method such as salting-out, spray drying, or freeze drying.

In a case in which the rubbery polymer is a polymer including three layers, aggregation of particles of the rubbery polymer can be avoided by providing a hard layer as the third layer.

—Other Resins—

The methacrylic resin composition according to the present embodiment may contain another resin other than the above-described methacrylic resin and rubbery polymer in combination therewith.

The other resin may be any commonly known thermoplastic resin that can exhibit properties required of the methacrylic resin composition according to the present embodiment.

Examples of thermoplastic resins that can be used include, but are not limited to, polyethylene resins, polypropylene resins, polystyrene resins, syndiotactic polystyrene resins, polycarbonate resins, ABS resins, acrylic resins, AS resins, BAAS resins, MBS resins, AAS resins, biodegradable resins, polycarbonate-ABS resin alloys, polyalkylene arylate resins (for example, polybutylene terephthalate, polyethylene terephthalate, polypropylene terephthalate, polytrimethylene terephthalate, and polyethylene naphthalate), polyamide resins, polyphenylene ether resins, polyphenylene sulfide resins, and phenolic resins.

In particular, AS resins and BAAS resins are preferable from a viewpoint of fluidity improvement, ABS resins and MBS resins are preferable from a viewpoint of impact resistance improvement, and polyester resins are preferable from a viewpoint of chemical resistance improvement. Moreover, polyphenylene ether resins, polyphenylene sulfide resins, phenolic resins, and the like are preferable from a viewpoint of flame retardance improvement. Polycarbonate resins are preferable when it is necessary to impart heat resistance or impact resistance, or to adjust optical properties. Furthermore, acrylic resins have good compatibility with the methacrylic resin set forth above and are preferable for adjusting properties such as fluidity and impact resistance while maintaining transparency.

—Acrylic Resin—

In a case in which an acrylic resin differing from the methacrylic resin according to the present embodiment is used in combination therewith, a monomer represented by the following general formula (9) can suitably be used as a monomer for forming methacrylic acid ester monomer units included in the acrylic resin.

(9)

In general formula (9), $R^1$ is a methyl group.

Moreover, $R^2$ is a group having a carbon number of 1 to 12, and preferably a hydrocarbon group having a carbon number of 1 to 12. The group may have a hydroxy group on a carbon thereof.

Examples of methacrylic acid ester monomers represented by general formula (9) include, but are not limited to, butyl methacrylate, ethyl methacrylate, methyl methacrylate, propyl methacrylate, isopropyl methacrylate, cyclohexyl methacrylate, phenyl methacrylate, 2-ethylhexyl methacrylate, t-butylcyclohexyl methacrylate, benzyl methacrylate, and 2,2,2-trifluoroethyl methacrylate. Methyl methacrylate is preferable from a viewpoint of ease of acquisition and the like.

One of these methacrylic acid ester monomers may be used individually, or two or more of these methacrylic acid ester monomers may be used together.

The content of the methacrylic acid ester monomer unit when the acrylic resin is taken to be 100 mass % may be 80 mass % to 99.5 mass %, preferably 85 mass % to 99.5 mass %, more preferably 90 mass % to 99 mass %, even more preferably 92 mass % to 99.3 mass %, further preferably 92 mass % to 99 mass %, and even further preferably 94 mass % to 99 mass % in view of the balance of heat resistance, thermal stability, and fluidity.

The acrylic resin includes the methacrylic acid ester monomer unit and one or more other vinyl monomer units that are copolymerizable with the methacrylic acid ester monomer unit.

Examples of monomers that can be used to form other vinyl monomer units in the acrylic resin that are copolymerizable with the methacrylic acid ester monomer unit include, but are not limited to, acrylic acid ester monomers represented by the following general formula (10).

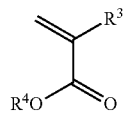

(10)

In general formula (10) $R^3$ is a hydrogen atom and $R^4$ is an alkyl group having a carbon number of 1 to 18.

Examples of monomers other than acrylic acid ester monomers that may be used to form vinyl monomer units that are copolymerizable with the methacrylic acid ester monomer unit include acrylic acid, methacrylic acid, and the like; unsaturated group-containing dibasic carboxylic acids such as maleic acid, fumaric acid, itaconic acid, and cinnamic acid and esters thereof; aromatic vinyl monomers such as styrene monomers (for example, styrene, o-methylstyrene, m-methylstyrene, p-methylstyrene, 2,4-dimethylstyrene, 2,5-dimethylstyrene, 3,4-dimethylstyrene, 3,5-dimethylstyrene, p-ethylstyrene, m-ethylstyrene, o-ethylstyrene, p-tert-butylstyrene, and isopropenylbenzene (α-methylstyrene)), 1-vinylnaphthalene, 2-vinylnaphthalene, 1,1-diphenylethylene, isopropenyltoluene, isopropenylethylbenzene, isopropenylpropylbenzene, isopropenylbutylbenzene, isopropenylpentylbenzene, isopropenylhexylbenzene, and isopropenyloctylbenzene; vinyl cyanide monomers such as acrylonitrile, methacrylonitrile, and vinylidene cyanide; amides such as acrylamide and methacrylamide; products obtained through esterification of both terminal hydroxy groups of ethylene glycol or an oligomer thereof with acrylic acid or methacrylic acid, such as ethylene glycol di(meth)acrylate, diethylene glycol di(meth)acrylate, triethylene glycol di(meth)acrylate, and tetraethylene glycol di(meth)acrylate; products obtained through esterification of two alcohol hydroxy groups with acrylic acid or methacrylic acid such as neopentyl glycol di(meth)acrylate and di(meth)acrylates; products obtained through esterification of polyhydric alcohol derivatives such as trimethylol propane and pentaerythritol with acrylic acid or methacrylic acid; and polyfunctional monomers such as divinylbenzene.

In particular, methyl acrylate, ethyl acrylate, n-propyl acrylate, n-butyl acrylate, sec-butyl acrylate, 2-ethylhexyl acrylate, and the like are preferable, and methyl acrylate, ethyl acrylate, and n-butyl acrylate are more preferable as monomers for forming other vinyl monomer units that are copolymerizable with the methacrylic acid ester monomer unit from a viewpoint of increasing weatherability, heat resistance, fluidity, and thermal stability in the methacrylic resin according to the present embodiment, and methyl acrylate and ethyl acrylate are even more preferable from a viewpoint of ease of acquisition.

One of these vinyl monomers may be used individually, or two or more of these vinyl monomers may be used together.

The content of a monomer used to form another vinyl monomer unit that is copolymerizable with the methacrylic acid ester monomer unit in the acrylic resin can be selected as appropriate within a range that does not result in the loss of properties when used in the methacrylic resin composition, and when the acrylic resin is taken to be 100 mass %, may be 0.5 mass % to 20 mass %, preferably 0.5 mass % to 15 mass %, more preferably 0.5 mass % to 10 mass %, even more preferably 0.7 mass % to 8 mass %, further preferably 1 mass % to 8 mass %, and even further preferably 1 mass % to 6 mass % from a viewpoint of fluidity, heat resistance, and thermal stability.

The weight average molecular weight (Mw) of the acrylic resin can be selected as appropriate in consideration of heat resistance, processing fluidity, and thermal stability of the methacrylic resin to achieve the desired heat resistance, fluidity, and thermal stability, and is preferably 20,000 to 300,000, more preferably 20,000 to 250,000, even more preferably 50,000 to 250,000, and particularly preferably 70,000 to 230,000.

Note that the weight average molecular weight of a mixed methacrylic resin of the above-described methacrylic resin and acrylic resin is preferably at least 65,000 and not more than 300,000, more preferably at least 65,000 and not more than 250,000, and even more preferably at least 70,000 and not more than 230,000 from a viewpoint of mechanical strength, solvent resistance, and fluidity.

Moreover, the molecular weight distribution (Mw/Mn) of the acrylic resin can be selected as appropriate in consideration of the balance of fluidity, mechanical properties, and so forth, and is preferably 1.5 to 7, more preferably 1.5 to 5, and even more preferably 1.5 to 4.

The weight average molecular weight (Mw) and the number average molecular weight (Mn) can be measured by gel permeation chromatography (GPC). Specifically, standard methacrylic resins that can be acquired as reagents and have monodisperse weight average molecular weight, number average molecular weight, and peak molecular weight that are known and an analysis gel column that elutes higher molecular weight components earlier are used to prepare a calibration curve in advance from the elution time and weight average molecular weight of these standard methacrylic resins. Next, the weight average molecular weight, the number average molecular weight, and the peak molecular weight of a methacrylic resin sample that is a measurement target can be determined from the prepared calibration curve. Specifically, measurement can be performed by a method described in the subsequent EXAMPLES section.

The method by which the acrylic resin is produced is not specifically limited and the acrylic resin may, for example, be produced through bulk polymerization, solution polymerization, suspension polymerization, precipitation polymerization, or emulsion polymerization using a methacrylic acid ester monomer and one or more other vinyl monomers that are copolymerizable with the methacrylic acid ester monomer. Production of the acrylic resin is preferably performed by bulk polymerization, solution polymerization, or suspension polymerization, more preferably by solution polymerization or suspension polymerization, and even more preferably by suspension polymerization.

One of the various thermoplastic resins set forth above may be used individually, or two or more of these thermoplastic resins may be used in combination.

In a case in which another resin is used in combination with the methacrylic resin set forth above in the methacrylic resin composition according to the present embodiment, although no specific limitations are made so long as the effects disclosed herein can be exhibited, the proportion in which the other resin is used relative to 100 mass %, in total, of the methacrylic resin and the other resin is, in consideration of property imparting effect, (i) preferably 95 mass % or less, more preferably 85 mass % or less, even more preferably 80 mass % or less, and further preferably 75 mass % or less when an acrylic resin is used as the other resin, and (ii) preferably 50 mass % or less, more preferably 45 mass % or less, even more preferably 40 mass % or less, further preferably 30 mass % or less, and even further preferably 20 mass % or less when a resin other than an acrylic resin is used as the other resin.

Moreover, in a case in which another resin is used, the lower limit for the amount of the other resin that is used is preferably 0.1 mass % or more, more preferably 1 mass % or more, even more preferably 2 mass % or more, further preferably 3 mass % or more, and even further preferably 5 mass % or more in consideration of property imparting effect.

The type and content of the other resin can be selected as appropriate depending on the effect that is expected through combined use with the other resin.

In the present embodiment, in a case in which the methacrylic resin and another resin are used in combination, the other resin may suitably be an acrylic resin that includes at least a methacrylic acid ester monomer unit in a proportion of 80 mass % to 99.5 mass % and has a weight average molecular weight of 20,000 to 300,000 as measured by gel permeation chromatography (GPC).

In such a situation, the mixed resin preferably includes 10 mass % to 99 mass % of the methacrylic resin and 90 mass % to 1 mass % of the acrylic resin, more preferably includes 15 mass % to 95 mass % of the methacrylic resin and 85 mass % to 5 mass % of the acrylic resin, and even more preferably includes 20 mass % to 80 mass % of the methacrylic resin and 80 mass % to 20 mass % of the acrylic resin from a viewpoint of color tone.

—Additives—

In the methacrylic resin composition according to the present embodiment, certain additives may be added to impart various properties such as rigidity and dimensional stability.

Examples of additives that may be used include, but are not limited to, various stabilizers such as ultraviolet absorbers, thermal stabilizers, and light stabilizers; plasticizers (paraffinic process oils, naphthenic process oils, aromatic process oils, paraffin, organopolysiloxanes, and mineral oils); flame retardants (for example, flame retardants based on halogens, silica, silicone, and phosphorus, such as organophosphorus compounds, red phosphorus, and inorganic phosphates); flame retardant synergists (for example, antimony oxides, metal oxides, and metal hydroxides); curing agents (for example, amines such as diethylenetriamine, triethylenetetramine, tetraethylenepentamine, pentaethylenehexamine, diethylaminopropylamine, 3,9-bis(3-aminopropyl)-2,4,8,10-tetraoxaspiro[5,5]undecane, menthane diamine, isophorone diamine, N-aminoethylpiperazine, m-xylylenediamine, m-phenylenediamine, diaminophenylmethane, diaminodiphenyl sulfone, dicyandiamide, and adipic acid dihydrazide, phenolic resins such as phenol novolac resin and cresol novolac resin, polymercaptans such as liquid polymercaptans and polysulfides, and acid anhydrides such as phthalic anhydride, tetrahydrophthalic anhydride, hexahydrophthalic anhydride, methyltetrahydrophthalic anhydride, methylhexahydrophthalic anhydride, methylnadic anhydride, pyromellitic anhydride, methylcyclohexene tetracarboxylic anhydride, dodecylsuccinic anhydride, trimellitic anhydride, chlorendic anhydride, benzophenonetetracarboxylic anhydride, and ethylene glycol bis(anhydrotrimellitate)); curing promoters (for example, imidazoles such as 2-methylimidazole, 2-ethylimidazole, 2-ethyl-4-methylimidazole, 2-phenylimidazole, 2-undecylimidazole, 2-heptadecylimidazole, and 2-phenyl-4-methylimidazole, organophosphines such as triphenylphosphine and tributylphosphine, tertiary amines such as benzyldimethylamine, 2-(dimethylaminomethyl)phenol, 2,4,6-tris(diaminomethyl)phenol, and tetramethylhexanediamine, boron salts such as triphenylphosphine tetraphenylborate, tetraphenylphosphonium tetraphenylborate, and triethylamine tetraphenylborate, and quinoid compounds such as 1,4-benzoquinone, 1,4-naphthoquinone, 2,3-dimethyl-1,4-benzoquinone, 2,6-dimethylbenzoquinone, and 2,3-dimethoxy-1,4-benzoquinone); antistatic agents (for example, polyamide elastomers, agents based on quaternary ammonium salts, pyridine derivatives, aliphatic sulfonic acid salts, aromatic sulfonic acid salts, aromatic sulfonic acid salt copolymers, sulfuric acid ester salts, polyhydric alcohol partial esters, alkyl diethanolamines, alkyl diethanolamides, polyalkylene glycol derivatives, agents based on betaine, and imidazoline derivatives); conductive agents; stress relaxation agents; release agents (for example, alcohols, esters of alcohols and fatty acids, esters of alcohols and dicarboxylic acids, and silicone oil); crystallization promoters; hydrolysis inhibitors; lubricants (for example, higher fatty acids and metal salts thereof such as stearic acid, behenic acid, zinc stearate, calcium stearate, and magnesium stearate, and higher fatty acid amides such as ethylene bisstearamide); impact resistance imparting agents; slidability modifiers (for example, modifiers based on hydrocarbons such as low molecular weight polyethylene, higher alcohols, polyhydric alcohols, polyglycols, polyglycerols, higher fatty acids, higher fatty acid metal salts, fatty acid amides, esters of fatty acids and aliphatic alcohols, full esters and partial esters of fatty acids and polyhydric alcohols, full esters and partial esters of fatty acids and polyglycols, and modifiers based on silicone and fluororesins); compatibilizers; nucleating agents; strengthening agents such as fillers; flow modifiers; dyes (for example, nitroso dyes, nitro dyes, azo dyes, stilbene azo dyes, ketoimine dyes, triphenylmethane dyes, xanthene dyes, acridine dyes, quinoline dyes, methine/polymethine dyes, thiazole dyes, indamine/indophenol dyes, azine dyes, oxazine dyes, thiazine dyes, sulfide dyes, aminoketone/oxyketone dyes, anthraquinone dyes, indigoid dyes, and phthalocyanine dyes); sensitizers; colorants (for example, inorganic pigments such as titanium oxide, carbon black, titanium yellow, iron oxide pigments, ultramarine, cobalt blue, chromium oxide, spinel green, lead chromate pigments, and cadmium pigments; organic pigments such as azo lake pigments, benzimidazolone pigments, diarylide pigments, azo pigments such as condensed azo pigments, phthalocyanine pigments such as phthalocyanine blue and phthalocyanine green, isoindolinone pigments, quinophthalone pigments, quinacridone pigments, perylene pigments, anthraquinone pigments, perinone pigments, dioxazine violet, and other condensed polycyclic pigments; and metallic pigments such as a scaly aluminum metallic pigment, a spherical aluminum pigment used for improving weld external appearance, mica powder for pearl-like metallic pigment, and pigments obtained through metal plating or sputtering to coat polyhedral particles of an inorganic material such as glass); thickeners; anti-settling agents; anti-sagging agents; fillers (for example, fibrous reinforcing agents such as glass fiber and carbon fiber, glass beads, calcium carbonate, talc, and clay); defoamers (for example, silicone defoamers, surfactants, and organic defoamers such as polyethers and higher alcohols); coupling agents; light diffusing fine particles; rust inhibitors; antibacterial and antifungal agents; antifouling agents; and conductive polymers.

—Light Diffusing Fine Particles—

Examples of the light diffusing fine particles include, but are not limited to, inorganic fine particles such as alumina, titanium oxide, calcium carbonate, barium sulfate, silicon dioxide, and glass beads, and organic fine particles such as styrene crosslinked beads, MS crosslinked beads, and siloxane crosslinked beads. Moreover, hollow crosslinked fine particles composed of a resin material having high transparency such as an acrylic resin, polycarbonate resin, MS resin, or cycloolefin resin, hollow fine particles composed of glass, or the like may be used as the light diffusing fine particles.

The inorganic fine particles are more preferably alumina, titanium oxide, or the like from a viewpoint of diffusing properties and ease of acquisition.

One type of light diffusing fine particles may be used individually, or two or more types of light diffusing fine particles may be used together.

The refractive index of the light diffusing fine particles is preferably 1.3 to 3.0, more preferably 1.3 to 2.5, and even more preferably 1.3 to 2.0. A refractive index of 1.3 or more enables sufficient scattering performance for practical use in the film according to the present embodiment, whereas a refractive index of 3.0 or less inhibits scattering in proximity to a lamp in a situation in which the film according to the present embodiment is used in a component disposed in proximity to the lamp, and can effectively prevent luminance irregularity and emitted light color tone irregularity.

The refractive index is a value at a temperature of 20° C. that is based on the D line (589 nm). The method by which the refractive index of the light diffusing fine particles is measured may, for example, be a method in which the light diffusing fine particles are immersed in a liquid having a refractive index that can be gradually changed, the refractive index of the liquid is changed while observing interfaces of the light diffusing fine particles, and the refractive index of the liquid at a point at which the interfaces of the light diffusing fine particles become unclear is measured. The refractive index of the liquid can be measured by an Abbe refractometer or the like.

The average particle diameter of the light diffusing fine particles is preferably 0.1 μm to 20 μm, more preferably 0.2 μm to 15 μm, even more preferably 0.3 μm to 10 μm, and further preferably 0.4 μm to 5 μm.

An average particle diameter of 20 μm or less is preferable for suppressing optical loss due to backward reflection and the like and in terms that incident light can be efficiently diffused at a light emission surface side. An average particle diameter of 0.1 μm or more is preferable since this enables diffusion of emitted light and can provide the desired surface light emission luminance and diffusing properties.

The content of the light diffusing fine particles in the methacrylic resin composition according to the present embodiment relative to 100 parts by mass of the methacrylic resin is preferably 0.0001 parts by mass to 0.03 parts by mass, and more preferably 0.0001 parts by mass to 0.01 parts by mass from a viewpoint of expression of a light diffusing effect and a viewpoint of uniformity of surface light emission.

—Thermal Stabilizer—

Examples of thermal stabilizers that may be used include, but are not limited to, hindered phenol antioxidants, phosphoric antioxidants, and sulfuric antioxidants. The methacrylic resin according to the present embodiment is suitable for use in various applications such as melt-extrusion, injection molding, and film shaping applications. The heat history imparted in processing depends on the processing method and may take various forms such as tens of seconds in the case of processing using an extruder to tens of minutes to several hours in the case of shaping processing of a thick product or shaping of a sheet.

In a case in which a long heat history is imparted, it is necessary to increase the additive amount of thermal stabilizer in order to obtain the desired thermal stability. From a viewpoint of inhibiting thermal stabilizer bleed-out and preventing adhesion of a film to a roller in film production, it is preferable to use a plurality of thermal stabilizers together. For example, it is preferable to use a hindered phenol antioxidant together with at least one selected from a phosphoric antioxidant and a sulfuric antioxidant.

One of such antioxidants may be used, or two or more of such antioxidants may be used together.

Examples of thermal stabilizers that may be used include, but are not limited to, pentaerythritol tetrakis[3-(3,5-di-tert-butyl-4-hydroxyphenyl)propionate], thiodiethylene bis[3-(3,5-di-tert-butyl-4-hydroxyphenyl)propionate], octadecyl-3-(3,5-di-tert-butyl-4-hydroxyphenyl)propionate, 3,3',3",5,5',5"-hexa-tert-butyl-a,a',a"-(mesitylene-2,4,6-triyl)tri-p-cresol, 4,6-bis(octylthiomethyl)-o-cresol, 4,6-bis(dodecylthiomethyl)-o-cresol, ethylenebis(oxyethylene) bis[3-(5-tert-butyl-4-hydroxy-m-tolyl)propionate], hexamethylene bis[3-(3,5-di-tert-butyl-4-hydroxyphenyl)propionate], 1,3,5-tris(3,5-di-tert-butyl-4-hydroxybenzyl)-1,3,5-triazine-2,4,6(1H,3H,5H)-trione, 1,3,5-tris[(4-tert-butyl-3-hydroxy-2,6-xylene)methyl]-1,3,5-triazine-2,4,6(1H,3H,5H)-trione, 2,6-di-tert-butyl-4-(4,6-bis(octylthio)-1,3,5-triazin-2-ylamine)phenol, 2-[1-(2-hydroxy-3,5-di-tert-pentylphenyl)ethyl]-4,6-di-tert-pentylphenyl acrylate, and 2-tert-butyl-4-methyl-6-(2-hydroxy-3-tert-butyl-5-methylbenzyl)phenyl acrylate.

In particular, pentaerythritol tetrakis[3-(3,5-di-tert-butyl-4-hydroxyphenyl)propionate], octadecyl-3-(3,5-di-t-butyl-4-hydroxyphenyl)propionate, and 2-[1-(2-hydroxy-3,5-di-tert-pentylphenyl)ethyl]-4,6-di-tert-pentylphenyl acrylate are preferable.

A commercially available phenolic antioxidant may be used as a hindered phenol antioxidant serving as the thermal stabilizer. Examples of such commercially available phenolic antioxidants include, but are not limited to, Irganox 1010 (pentaerythritol tetrakis[3-(3,5-di-t-butyl-4-hydroxyphenyl)propionate]; produced by BASF), Irganox 1076 (octadecyl-3-(3,5-di-t-butyl-4-hydroxyphenyl)propionate; produced by BASF), Irganox 1330 (3,3',3",5,5',5"-hexa-t-butyl-a,a',a"-(mesitylene-2,4,6-triyl)tri-p-cresol; produced by BASF), Irganox 3114 (1,3,5-tris(3,5-di-t-butyl-4-hydroxybenzyl)-1,3,5-triazine-2,4,6(1H,3H,5H)-trione; produced by BASF), Irganox 3125 (produced by BASF), ADK STAB AO-60 (pentaerythritol tetrakis[3-(3,5-di-t-butyl-4-hydroxyphenyl)propionate]; produced by Adeka Corporation), ADK STAB AO-80 (3,9-bis{2-[3-(3-t-butyl-4-hydroxy-5-methylphenyl)propionyloxy]-1,1-dimethylethyl}-2,4,8,10-tetraoxaspiro[5.5]undecane; produced by Adeka Corporation), Sumilizer BHT (produced by Sumitomo Chemical Co., Ltd.), Cyanox 1790 (produced by Cytec Solvay Group), Sumilizer GA-80 (produced by Sumitomo Chemical Co., Ltd.), Sumilizer GS (2-[1-(2-hydroxy-3,5-di-tert-pentylphenyl)ethyl]-4,6-di-tert-pentylphenyl acrylate; produced by Sumitomo Chemical Co., Ltd.), Sumilizer GM (2-tert-butyl-4-methyl-6-(2-hydroxy-3-tert-butyl-5-methylbenzyl)phenyl acrylate; produced by Sumitomo Chemical Co., Ltd.), and vitamin E (produced by Eisai Co., Ltd.).

Of these commercially available phenolic antioxidants, Irganox 1010, ADK STAB AO-60, ADK STAB AO-80, Irganox 1076, Sumilizer GS, and the like are preferable in terms of thermal stability imparting effect in the resin.

One of these phenolic antioxidants may be used individually, or two or more of these phenolic antioxidants may be used together.

Examples of phosphoric antioxidants that may be used as the thermal stabilizer include, but are not limited to, tris(2,4-di-t-butylphenyl) phosphite, phosphorus acid bis(2,4-bis(1,1-dimethylethyl)-6-methylphenyl)ethyl ester, tetrakis(2,4-di-t-butylphenyl)(1,1-biphenyl)-4,4'-diyl bisphosphonite, bis(2,4-di-t-butylphenyl)pentaerythritol diphosphite, bis(2,6-di-t-butyl-4-methylphenyl)pentaerythritol diphosphite, bis(2,4-dicumylphenyl)pentaerythritol diphosphite, tetrakis(2,4-t-butylphenyl)(1,1-biphenyl)-4,4'-diyl bisphosphonite, di-t-butyl-m-cresyl phosphonite, and 4-[3-[(2,4,8,10-tetra-tert-butyldibenzo[d,f][1,3,2]dioxaphosphepin)-6-yloxy]propyl]-2-methyl-6-tert-butylphenol.

A commercially available phosphoric antioxidant may be used as the phosphoric antioxidant. Examples of commercially available phosphoric antioxidants that may be used include, but are not limited to, Irgafos 168 (tris(2,4-di-t-butylphenyl) phosphite; produced by BASF), Irgafos 12 (tris[2-[[2,4,8,10-tetra-t-butyldibenzo[d,f][1,3,2]dioxaphosphepin-6-yl]oxy]ethyl]amine; produced by BASF), Irgafos 38 (phosphorus acid bis(2,4-bis(1,1-dimethylethyl)-6-methylphenyl)ethyl ester; produced by BASF), ADK STAB 229K (produced by Adeka Corporation), ADK STAB PEP-36 (produced by Adeka Corporation), ADK STAB PEP-36A (produced by Adeka Corporation), ADK STAB PEP-8 (produced by Adeka Corporation), ADK STAB HP-10 (produced by Adeka Corporation), ADK STAB 2112 (produced by Adeka Corporation), ADK STAB 1178 (produced by Adeka Corporation), ADK STAB 1500 (produced by Adeka Corporation), Sandstab P-EPQ (produced by Clariant), Weston 618 (produced by GE), Weston 619G (produced by GE), Ultranox 626 (produced by GE), Sumilizer GP (4-[3-[(2,4,8,10-tetra-tert-butyldibenzo[d,f][1,3,2]dioxaphosphepin)-6-yloxy]propyl]-2-methyl-6-tert-butylphenol; produced by Sumitomo Chemical Co., Ltd.), and HCA (9,10-dihydro-9-oxa-10-phosphaphenanthrene-10-oxide; produced by Sanko Co., Ltd.).

Of these commercially available phosphoric antioxidants, Irgafos 168, ADK STAB PEP-36, ADK STAB PEP-36A, ADK STAB HP-10, and ADK STAB 1178 are preferable, and ADK STAB PEP-36A and ADK STAB PEP-36 are particularly preferable from a viewpoint of thermal stability imparting effect in the resin and combined effect with various antioxidants.

One of these phosphoric antioxidants may be used individually, or two or more of these phosphoric antioxidants may be used together.

Examples of sulfuric antioxidants that may be used as the thermal stabilizer include, but are not limited to, 2,4-bis(dodecylthiomethyl)-6-methylphenol (Irganox 1726 produced by BASF), Irganox 1520L (produced by BASF), 2,2-bis{[3-(dodecylthio)-1-oxopropoxy]methyl}propan-1,3-diyl bis[3-(dodecylthio)propionate] (ADK STAB AO-412S produced by Adeka Corporation), 2,2-bis{[3-(dodecylthio)-1-oxopropoxy]methyl}propan-1,3-diyl bis[3-(dodecylthio)propionate] (KEMINOX PLS produced by Chemipro Kasei Kaisha, Ltd.), and di(tridecyl)-3,3'-thiodipropionate (AO-503 produced by Adeka Corporation).

Of these commercially available sulfuric antioxidants, ADK STAB AO-412S and KEMINOX PLS are preferable from a viewpoint of thermal stability imparting effect in the resin and combined effect with various antioxidants, and from a viewpoint of handleability.

One of these sulfuric antioxidants may be used individually, or two or more of these sulfuric antioxidants may be used together.

Although the content of the thermal stabilizer may be any amount that enables an effect of thermal stability improvement, excessively high thermal stabilizer content may lead to problems such as bleed-out during processing. Accordingly, the content of the thermal stabilizer relative to 100 parts by mass of the methacrylic resin is preferably 5 parts by mass or less, more preferably 3 parts by mass or less, even more preferably 1 part by mass or less, further preferably 0.8 parts by mass or less, even further preferably 0.01 parts by mass to 0.8 parts by mass, and particularly preferably 0.01 parts by mass to 0.5 parts by mass.

—Lubricant—

Examples of lubricants that may be used include, but are not limited to, fatty acid esters, fatty acid amides, fatty acid metal salts, hydrocarbon lubricants, and alcohol lubricants.

Fatty acid esters that may be used as the lubricant include conventional and commonly known fatty acid esters without any specific limitations.

Examples of fatty acid esters include ester compounds of a fatty acid having a carbon number of 12 to 32, such as lauric acid, palmitic acid, heptadecanoic acid, stearic acid, oleic acid, arachidic acid, or behenic acid, and a monohydric aliphatic alcohol, such as palmityl alcohol, stearyl alcohol, or behenyl alcohol, or a polyhydric aliphatic alcohol, such as glycerin, pentaerythritol, dipentaerythritol, or sorbitan; and composite ester compounds of a fatty acid, a polybasic organic acid, and a monohydric aliphatic alcohol or a polyhydric aliphatic alcohol. Examples of fatty acid ester lubricants such as described above include cetyl palmitate, butyl stearate, stearyl stearate, stearyl citrate, glycerin monocaprylate, glycerin monocaprate, glycerin monolaurate, glycerin monopalmitate, glycerin dipalmitate, glycerin monostearate, glycerin distearate, glycerin tristearate, glycerin monooleate, glycerin dioleate, glycerin trioleate, glycerin monolinoleate, glycerin monobehenate, glycerin mono-12-hydroxystearate, glycerin di-12-hydroxystearate, glycerin tri-12-hydroxystearate, glycerin diacetomonostearate, glycerin citric acid fatty acid ester, pentaerythritol adipate stearate, montanic acid partially saponified ester, pentaerythritol tetrastearate, dipentaerythritol hexastearate, and sorbitan tristearate.

One of these fatty acid ester lubricants may be used individually, or two or more of these fatty acid ester lubricants may be used in combination.

Examples of commercially available products that may be used include the RIKEMAL series, the POEM series, the RIKESTER series, and the RIKEMASTER series produced by Riken Vitamin Co., Ltd., and the EXCEL series, the RHEODOL series, the EXCEPARL series, and the COCONAD series produced by Kao Corporation. More specific examples include RIKEMAL S-100, RIKEMAL H-100, POEM V-100, RIKEMAL B-100, RIKEMAL HC-100, RIKEMAL S-200, POEM B-200, RIKESTER EW-200, RIKESTER EW-400, EXCEL S-95, and RHEODOL MS-50.

Fatty acid amide lubricants that may be used include conventional and commonly known fatty acid amide lubricants without any specific limitations.

Examples of fatty acid amide lubricants include saturated fatty acid amides such as lauramide, palmitamide, stearamide, behenamide, and hydroxystearamide; unsaturated fatty acid amides such as oleamide, erucamide, and ricinoleamide; substituted amides such as N-stearyl stearamide, N-oleyl oleamide, N-stearyl oleamide, N-oleyl stearamide, N-stearyl erucamide, and N-oleyl palmitamide; methylol amides such as methylol stearamide and methylol behenamide; saturated fatty acid bisamides such as methylene bisstearamide, ethylene biscapramide, ethylene bislauramide, ethylene bisstearamide (ethylene bis(stearyl amide)), ethylene bisisostearamide, ethylene bishydroxystearamide, ethylene bisbehenamide, hexamethylene bisstearamide, hexamethylene bisbehenamide, hexamethylene bishydroxystearamide, N,N'-distearyl adipamide, and N,N'-distearyl sebacamide; unsaturated fatty acid bisamides such as ethylene bisoleamide, hexamethylene bisoleamide, N,N'-dioleyl adipamide, and N,N'-dioleyl sebacamide; and aromatic bisamides such as m-xylylene bisstearamide and N,N'-distearyl isophthalamide.

One of these fatty acid amide lubricants may be used individually, or two or more of these fatty acid amide lubricants may be used in combination.

Examples of commercially available products that may be used include the DIAMID series (produced by Nippon Kasei Chemical Co., Ltd.), the AMIDE series (produced by Nippon Kasei Chemical Co., Ltd.), the NIKKA AMIDE series (produced by Nippon Kasei Chemical Co., Ltd.), the METHYLOL AMIDE series (produced by Nippon Kasei Chemical Co., Ltd.), the BISAMIDE series (produced by Nippon Kasei Chemical Co., Ltd.), the SLIPACKS series (produced by Nippon Kasei Chemical Co., Ltd.), the KAO WAX series (produced by Kao Corporation), the FATTY AMIDE series (produced by Kao Corporation), and ethylene bisstearamides (produced by Dainichi Chemical Industry Co., Ltd.).

The term "fatty acid metal salt" refers to a metal salt of a higher fatty acid and examples thereof include lithium stearate, magnesium stearate, calcium stearate, calcium laurate, calcium ricinoleate, strontium stearate, barium stearate, barium laurate, barium ricinoleate, zinc stearate, zinc laurate, zinc ricinoleate, zinc 2-ethylhexanoate, lead stearate, dibasic lead stearate, lead naphthenate, calcium 12-hydroxystearate, and lithium 12-hydroxystearate. Of these fatty acid metal salts, calcium stearate, magnesium stearate, and zinc stearate are particularly preferable because the resultant transparent resin composition has excellent processability and exceptional transparency.

Examples of commercially available products that may be used include the SZ series, the SC series, the SM series, and the SA series produced by Sakai Chemical Industry Co., Ltd.

In a case in which a fatty acid metal salt is used, the amount thereof is preferably 0.2 mass % or less from a viewpoint of transparency retention.

One of these lubricants may be used individually, or two or more of these lubricants may be used together.

The lubricant that is used preferably has a decomposition onset temperature of 200° C. or higher. The decomposition onset temperature can be measured through the 1% weight loss temperature by TGA.

Although the content of the lubricant may be any amount that enables an effect as a lubricant, excessively high lubricant content may lead to problems such as bleed-out during processing or poor extrusion due to screw slipping. Accordingly, the amount of the lubricant relative to 100 parts by mass of the methacrylic resin is preferably 5 parts by mass or less, more preferably 3 parts by mass or less, even more preferably 1 part by mass or less, further preferably 0.8 parts by mass or less, even further preferably 0.01 parts by mass to 0.8 parts by mass, and particularly preferably 0.01 parts by mass to 0.5 parts by mass. Addition of the lubricant in an amount that is within any of the ranges set forth above is preferable because this tends to suppress reduction in transparency caused by addition of the lubricant, inhibit adhesion to a metal roller in film production, and suppress the occurrence of problems such as peeling in long-term reliability testing after secondary processing of a film by primer application or the like.

—Ultraviolet Absorber—

Examples of ultraviolet absorbers that may be used include, but are not limited to, benzotriazole compounds, benzotriazine compounds, benzoate compounds, benzophenone compounds, oxybenzophenone compounds, phenolic compounds, oxazole compounds, malonic acid ester compounds, cyanoacrylate compounds, lactone compounds, salicylic acid ester compounds, and benzoxazinone compounds.

Examples of benzotriazole compounds include 2,2'-methylenebis[4-(1,1,3,3-tetramethylbutyl)-6-(2H-benzotriazol-2-yl)phenol], 2-(3,5-di-tert-butyl-2-hydroxyphenyl)-5-chlorobenzotriazole, 2-(2H-benzotriazol-2-yl)-p-cresol, 2-(2H-benzotriazol-2-yl)-4,6-bis(1-methyl-1-phenylethyl)phenol, 2-benzotriazol-2-yl-4,6-di-tert-butylphenol, 2-[5-chloro(2H)-benzotriazol-2-yl]-4-methyl-6-t-butylphenol, 2-(2H-benzotriazol-2-yl)-4,6-di-t-butylphenol, 2-(2H-benzotriazol-2-yl)-4-(1,1,3,3-tetramethylbutyl)phenol, 2-(2H-benzotriazol-2-yl)-4-methyl-6-(3,4,5,6-tetrahydrophthalimidylmethyl)phenol, methyl 3-(3-(2H-benzotriazol-2-yl)-5-t-butyl-4-hydroxyphenyl)propionate/polyethylene glycol 300 reaction product, 2-(2H-benzotriazol-2-yl)-6-(linear/branched dodecyl)-4-methylphenol, 2-(5-methyl-2-hydroxyphenyl)benzotriazole, 2-[2-hydroxy-3,5-bis(α,α-dimethylbenzyl)phenyl]-2H-benzotriazole, and 3-(2H-benzotriazol-2-yl)-5-(1,1-dimethylethyl)-4-hydroxy-C7-9 branched/linear alkyl esters.

Examples of benzotriazine compounds include 2-mono(hydroxyphenyl)-1,3,5-triazine compounds, 2,4-bis(hydroxyphenyl)-1,3,5-triazine compounds, and 2,4,6-tris(hydroxyphenyl)-1,3,5-triazine compounds. Specific examples include 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine, 2,4-diphenyl-(2-hydroxy-4-butoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2- hydroxy-4-benzyloxyphenyl)-1,3,5-triazine, 2,4-diphenyl-6-(2-hydroxy-4-butoxyethoxy)-1,3,5-triazine, 2,4-bis(2-hydroxy-4-butoxyphenyl)-6-(2,4-dibutoxyphenyl)-1,3,5-triazine, 2,4,6-tris(2-hydroxy-4-methoxyphenyl)-1,3,5-triazine, 2,4,6-tris(2-hydroxy-4-ethoxyphenyl)-1,3,5-triazine, 2,4,6-tris(2-hydroxy-4-propoxyphenyl)-1,3,5-triazine, 2,4,6-tris(2-hydroxy-4-butoxyphenyl)-1,3,5-triazine, 2,4,6-tris(2-hydroxy-4-hexyloxyphenyl)-1,3,5-triazine, 2,4,6-tris(2-hydroxy-4-octyloxyphenyl)-1,3,5-triazine, 2,4,6-tris(2-hydroxy-4-dodecyloxyphenyl)-1,3,5-triazine, 2,4,6-tris(2-hydroxy-4-benzyloxyphenyl)-1,3,5-triazine, 2,4,6-tris(2-hydroxy-4-ethoxyethoxyphenyl)-1,3,5-triazine, 2,4,6-tris(2-hydroxy-4-butoxyethoxyphenyl)-1,3,5-triazine, 2,4,6-tris(2-hydroxy-4-propoxyethoxyphenyl)-1,3,5-triazine, 2,4,6-tris(2-hydroxy-4-methoxycarbonylpropyloxyphenyl)-1,3,5-triazine, 2,4,6-tris(2-hydroxy-4-ethoxycarbonylethyloxyphenyl)-1,3,5-triazine, 2,4,6-tris(2-hydroxy-4-(1-(2-ethoxyhexyloxy)-1-oxopropan-2-yloxy)phenyl)-1,3,5-triazine, 2,4,6-tris(2-hydroxy-3-methyl-4-methoxyphenyl)-1,3,5-triazine, 2,4,6-tris(2-hydroxy-3-methyl-4-ethoxyphenyl)-1,3,5-triazine, 2,4,6-tris(2-hydroxy-3-methyl-4-propoxyphenyl)-1,3,5-triazine, 2,4,6-tris(2-hydroxy-3-methyl-4-butoxyphenyl)-1,3,5-triazine, 2,4,6-tris(2-hydroxy-3-methyl-4-hexyloxyphenyl)-1,3,5-triazine, 2,4,6-tris(2-hydroxy-3-methyl-4-octyloxyphenyl)-1,3,5-triazine, 2,4,6-tris(2-hydroxy-3-methyl-4-dodecyloxyphenyl)-1,3,5-triazine, 2,4,6-tris(2-hydroxy-3-methyl-4-benzyloxyphenyl)-1,3,5-triazine, 2,4,6-tris(2-hydroxy-3-methyl-4-ethoxyethoxyphenyl)-1,3,5-triazine, 2,4,6-tris(2-hydroxy-3-methyl-4-butoxyethoxyphenyl)-1,3,5-triazine, 2,4,6-tris(2-hydroxy-3-methyl-4-propoxyethoxyphenyl)-1,3,5-triazine, 2,4,6-tris(2-hydroxy-3-methyl-4-methoxycarbonylpropyloxyphenyl)-1,3,5-triazine, 2,4,6-tris(2-hydroxy-3-methyl-4-ethoxycarbonylethyloxyphenyl)-1,3,5-triazine, and 2,4,6-tris(2-hydroxy-3-methyl-4-(1-(2-ethoxyhexyloxy)-1-oxopropan-2-yloxy)phenyl)-1,3,5-triazine.

Of these benzotriazine compounds, an ultraviolet absorber having a 2,4-bis(2,4-dimethylphenyl)-6-[2-hydroxy-4-(3-alkyloxy-2-hydroxypropyloxy)-5-α-cumylphenyl]-s-triazine framework ("alkyloxy" refers to a long chain alkyloxy group such as an octyloxy, nonyloxy, or decyloxy group) is more preferable in terms of having excellent absorption properties and high compatibility with amorphous thermoplastic resins, and particularly with acrylic resins.

Particularly from a viewpoint of resin compatibility and volatility during heating, the ultraviolet absorber is preferably a benzotriazole compound or a benzotriazine compound, and from a viewpoint of inhibiting decomposition of the ultraviolet absorber due to heating during extrusion processing, the ultraviolet absorber is preferably a benzotriazine compound.

One of these ultraviolet absorbers may be used individually, or two or more of these ultraviolet absorbers may be used together.

An ultraviolet absorber is normally added to absorb ultraviolet light and suppress transmission at from 200 nm to 380 nm. However, in the case of a thin film or the like, it is necessary to add a large amount of ultraviolet absorber and transmission cannot be effectively suppressed through only a single type of ultraviolet absorber. To efficiently suppress transmission through a small amount of ultraviolet absorber, it is preferable to use two types in combination in the form of a compound having an absorption maximum at a wavelength of 200 nm to 315 nm and a compound having an absorption maximum at a wavelength of 315 nm to 380 nm.

For example, it is preferable to use 2-(4,6-diphenyl-1,3,5-triazin-2-yl)-5-[2-(2-ethylhexanoyloxy)ethoxy]phenol (LA-46 produced by Adeka Corporation) having an absorption maximum at 280 nm to 300 nm in combination with at least one selected from the group consisting of 2,4-bis[2-hydroxy-4-butoxyphenyl]-6-(2,4-dibutoxyphenyl)-1,3,5-triazine (TINUVIN 460 produced by BASF), hydroxyphenyltriazine TINUVIN 477 (produced by BASF), and 2,4,6-tris(2-hydroxy-4-hexyloxy-3-methylphenyl)-1,3,5-triazine (LA-F70 produced by Adeka Corporation) having an absorption maximum at 350 nm to 380 nm.

The melting point (Tm) of the ultraviolet absorber is preferably 80° C. or higher, more preferably 100° C. or higher, even more preferably 130° C. or higher, and further preferably 160° C. or higher.

When the ultraviolet absorber is heated from 23° C. to 260° C. at a rate of 20° C./min, the weight loss ratio of the ultraviolet absorber is preferably 50% or less, more preferably 30% or less, even more preferably 15% or less, further preferably 10% or less, and even further preferably 5% or less.

Although the amount of the ultraviolet absorber that is used may be any amount for which heat resistance, damp heat resistance, thermal stability, and shaping processability are not impaired and the effects disclosed herein can be exhibited, addition of an excessively large amount of the ultraviolet absorber may lead to problems such as bleed-out in processing. Accordingly, the amount of the ultraviolet absorber relative to 100 parts by mass of the methacrylic resin is preferably 5 parts by mass or less, more preferably 3 parts by mass or less, even more preferably 2.5 parts by mass or less, further preferably 2 parts by mass or less, and even further preferably 0.01 parts by mass to 1.8 parts by mass.

The following provides a specific description of properties of the methacrylic resin composition according to the present embodiment.

<Weight Average Molecular Weight and Molecular Weight Distribution>

The weight average molecular weight (Mw) of the methacrylic resin composition according to the present embodiment is preferably 65,000 to 300,000 from a viewpoint of fluidity and mechanical strength, such as Charpy impact strength, in the same way as for the methacrylic resin according to the present embodiment. The weight average molecular weight is preferably 65,000 or more, more preferably 70,000 or more, even more preferably 80,000 or more, and further preferably 100,000 or more from a viewpoint of maintaining mechanical strength. Moreover, the weight average molecular weight is preferably 250,000 or less, more preferably 230,000 or less, even more preferably 220,000 or less, further preferably 200,000 or less, even further preferably 180,000 or less, and particularly preferably 170,000 or less from a viewpoint of ensuring fluidity in shaping processing.

The molecular weight distribution (weight average molecular weight (Mw)/number average molecular weight (Mn)) of the methacrylic resin composition is preferably 1.5 to 5 in view of the balance of fluidity, mechanical strength, and solvent resistance. The molecular weight distribution is more preferably 1.5 to 4.5, even more preferably 1.6 to 4, further preferably 1.6 to 3, and even further preferably 1.5 to 2.5.

The method by which the weight average molecular weight (Mw) and the number average molecular weight (Mn) are measured may be the same as described in relation to the methacrylic resin.

<Proportions of Components within Specific Molecular Weight Ranges>

In the methacrylic resin composition according to the present embodiment, the content of components having a weight average molecular weight of 10,000 or less as measured by gel permeation chromatography (GPC) is preferably 0.1 mass % to 5.0 mass % from a viewpoint of improving processing fluidity, reducing poor external appearance of a shaped product in shaping, such as silver marks referred to as silver streaks, and preventing adhesion to a roller in film production. When the content of these specific components is within the range set forth above, the number of bubbles that may be generated in the resin composition can be kept to within a suitable range.

A content of 0.1 mass % or more enables improvement of processing fluidity. The lower limit for this content is preferably 0.2 mass % or more, more preferably 0.5 mass % or more, and even more preferably 0.6 mass % or more. A content of 5 mass % or less can reduce poor external appearance, such as by reducing silver streaks in shaping, improve mold release in shaping, inhibit adhesion to a roller in film production, and inhibit splitting when a film is held in stretching. The upper limit for this content is more preferably 4.0 mass % or less, even more preferably 3.0 mass % or less, and particularly preferably 2.0 mass % or less.

The content of components having a weight average molecular weight of 10,000 or less may be as previously described in relation to the methacrylic resin.

In the methacrylic resin composition according to the present embodiment, the content of components having a weight average molecular weight of more than 10,000 and not more than 50,000 is preferably 10.0 mass % to 25.0 mass %.

A content of 10.0 mass % to 25.0 mass % can inhibit the formation of streaks in film shaping processing and provides improvement in terms of preventing adhesion to a roller in film shaping. From a viewpoint of imparting a good balance of processing properties such as processing fluidity, streak inhibition, and touch roller adhesion inhibition, the lower limit for this content is more preferably 12.0 mass % or more, and even more preferably 13.0 mass %, and the upper limit for this content is more preferably 24.0 mass % or less.

The content of components having a weight average molecular weight of more than 10,000 and not more than 50,000 may be as previously described in relation to the methacrylic resin.

In the methacrylic resin composition according to the present embodiment, a ratio (b/a) of the content (b) of components having a weight average molecular weight of more than 50,000 relative to the content (a) of components having a weight average molecular weight of more than 10,000 and not more than 50,000 is preferably 2.5 to 8.5 from a viewpoint of obtaining a good balance of thermal stability and processability.

With regards to the ratio of high molecular weight components and low molecular weight components, due to the influence of viscosity difference between high molecular weight components and low molecular weight components in heated processing, a large ratio of low molecular weight components tends to provide excellent processing fluidity but increases roller adhesion in film processing, whereas a large ratio of high molecular weight components tends to facilitate formation of streaks in film processing.

In a case in which it is desirable to impart a good balance of the properties of both while providing further improvement in terms of adhesion prevention, the ratio is preferably 3.0 or more, and more preferably 3.5 or more. On the other hand, in a case in which further improvement in terms of streaks in film processing is desirable, the ratio is preferably 8.0 or less, and more preferably 7.5 or less.

In the methacrylic resin composition according to the present embodiment, the total content of specific components including dimers, trimers, and the like that are any combination of the monomer (A), the monomer forming the structural unit (B), and the monomer (C) described above is required to be 0.01 mass % to 0.40 mass % from a viewpoint of preventing adhesion to a mold or roller in shaping processing, and inhibiting foaming in film production. The upper limit for this content is preferably 0.35 mass % or less, more preferably 0.30 mass % or less, and particularly preferably 0.28 mass % or less in view of the balance of external appearance and adhesion. Moreover, the lower limit is preferably 0.02 mass % or more in a case in which it is necessary to consider fluidity in shaping.

When the total content of these components is within any of the ranges set forth above, adhesion to a mold or film roller in shaping processing can be inhibited and shaping processability can be improved. However, a content of less than 0.01 mass % is not preferable because a complicated process is required to obtain such a content.

The total content of these components may be as previously described in relation to the methacrylic resin.

The glass transition temperature of the methacrylic resin composition according to the present embodiment is preferably 115° C. or higher, more preferably 120° C. or higher, even more preferably 122° C. or higher, further preferably 123° C. or higher, even further preferably 124° C. or higher, and particularly preferably 125° C. or higher from a viewpoint of obtaining sufficient heat resistance.

The glass transition temperature may be as previously described in relation to the methacrylic resin.

In particular, it is preferable that the methacrylic resin composition according to the present embodiment contains:

a methacrylic resin that includes 50 mass % to 97 mass % of a methacrylic acid ester monomer unit (A), 3 mass % to 30 mass % of a structural unit (B) having a cyclic structure-containing main chain, and 0 mass % to 20 mass % of another vinyl monomer unit (C) that is copolymerizable with a methacrylic acid ester monomer; and another resin, and satisfies conditions (1) to (3), shown below.

(1) The methacrylic resin composition has a weight average molecular weight of 65,000 to 300,000 as measured by gel permeation chromatography (GPC).

(2) The total content of components detected at a retention time of 22 minutes to 32 minutes in measurement by GC/MS is 0.01 mass % to 0.40 mass % when the methacrylic resin composition is taken to be 100 mass %.

(3) In the methacrylic resin and the other resin, the structural unit (B) having a cyclic structure-containing main chain is contained in a proportion of 3 mass % to 19 mass % when the methacrylic resin and the other resin are taken to be 100 mass %, in total.

Note that it is preferable that the methacrylic resin composition according to the present embodiment is formed from the methacrylic resin set forth above and the other resin set forth above, and satisfies the preceding conditions (1) to (3).

With regards to condition (3), the proportion constituted by the structural unit (B) having a cyclic structure-containing main chain in the methacrylic resin and the other resin when the methacrylic resin and the other resin are taken to be 100 mass %, in total, is more preferably 3 mass % to 18 mass %, and even more preferably 3 mass % to 16 mass % in view of the balance of heat resistance, optical properties, and thermal stability of the resin composition.

<Heat Resistance>

The glass transition temperature may be used as an indicator of heat resistance.

The glass transition temperature of the methacrylic resin composition according to the present embodiment is preferably 120° C. or higher, more preferably 121° C. or higher, even more preferably 122° C. or higher, further preferably 123° C. or higher, even further preferably 124° C. or higher, and particularly preferably 125° C. or higher from a viewpoint of heat resistance in practical use.

The glass transition temperature can be measured in accordance with ASTM D-3418. Specifically, the glass transition temperature can be measured by a method described in the subsequent EXAMPLES section.

<Thermal Stability>

When the methacrylic resin composition according to the present embodiment is used to produce a film, the resin may be held in a molten state inside a shaping machine. Since the resin is held at high temperature for a long time, the resin material is required to have a low tendency to thermally decompose (i.e., have thermal stability).

Moreover, in a case in which thickness-reduction of the film according to the present embodiment is necessary, high thermal stability is required since it is necessary to perform shaping at high temperature.

The weight loss ratio upon holding at a specific temperature for a specific time and the temperature at which a specific weight loss ratio is reached (thermal decomposition onset temperature) can be used as indicators of thermal stability.

Specifically, in thermogravimetric analysis (TGA) of the methacrylic resin composition according to the present embodiment, the weight loss ratio of the methacrylic resin composition when held at approximately 290° C. for 30 minutes is preferably 5.0% or less, more preferably 4.0% or less, even more preferably 3.0% or less, and further preferably 2.0% or less.

The weight loss ratio of the methacrylic resin composition when held at 290° C. for 30 minutes can be measured by a method described in the subsequent EXAMPLES section.

The thermal decomposition onset temperature (° C.) (temperature at time of 1% weight loss) of the methacrylic resin composition according to the present embodiment is preferably 290° C. or higher. The thermal decomposition onset temperature is more preferably 300° C. or higher, even more preferably 310° C. or higher, further preferably 320° C. or higher, and even further preferably 325° C. or higher.

Note that the thermal decomposition onset temperature may, for example, be taken to be the 1% weight loss temperature (thermal decomposition onset temperature), which is the temperature at which the weight decreases by 1% upon heating, and the specific measurement method thereof may be a method described in the subsequent EXAMPLES section.

In the methacrylic resin contained in the film according to the present embodiment, increasing the ratio of the structural unit (B) having a cyclic structure-containing main chain such as to relatively reduce the amount of the methacrylic acid ester monomer unit (A) that is copolymerized is an effective way of preventing thermal decomposition in a shaping process of the film according to the present embodiment and obtaining excellent thermal stability in practical use. However, if the ratio of the structural unit (B) relative to the monomer unit (A) is excessively high, it may not be possible to obtain properties such as shaping fluidity and surface hardness that are required as a film. Accordingly, it is necessary to consider the balance of these properties when setting the ratio of the monomer unit (A) and the structural unit (B).

Moreover, increasing the copolymerization ratio of the structural unit (B) having a cyclic structure-containing main chain is effective in terms that a decomposition reaction due to depolymerization upon exposure to high temperature is inhibited, and thus increasing the ratio of the structural unit (B) relative to the monomer unit (A) can provide sufficient thermal stability even if the amount of thermal stabilizer is reduced. Conversely, the amount of thermal decomposition in a high-temperature environment increases in a situation in which the ratio of the methacrylic acid ester monomer unit (A) is relatively large. Although a thermal stabilizer may be added with the aim of inhibiting thermal decomposition, addition of an excessive amount of thermal stabilizer may lead to reduction of heat resistance and problems such as bleed-out in shaping.

As previously explained, the methacrylic resin composition may contain a thermal stabilizer to obtain the properties demanded as a film.

In the present embodiment, when the content of the thermal stabilizer is taken to be Y (content (parts by mass) relative to 100 parts by mass of methacrylic resin), the content of the methacrylic acid ester monomer unit (A) is taken to be P (content (mass %) relative to 100 mass % of methacrylic resin), and the content of the structural unit (B) having a cyclic structure-containing main chain is taken to be Q (content (mass %) relative to 100 mass % of methacrylic resin), the content Y (parts by mass) is preferably $0.053 \times P/Q - 0.4$ or more, more preferably $0.053 \times P/Q - 0.35$ or more, even more preferably $0.053 \times P/Q - 0.3$ or more, further preferably $0.053 \times P/Q - 0.27$ or more, and even further preferably $0.053 \times P/Q - 0.25$ or more from a viewpoint of the balance of inhibition of thermal decomposition at high temperature, shaping processability, and heat resistance.

(Methacrylic Resin Composition Production Method)

The methacrylic resin composition according to the present embodiment can be produced through melt-kneading of the methacrylic resin according to the present embodiment and the optionally added rubbery polymer, other resin (resin other than methacrylic resin), and additives.

The method by which the methacrylic resin composition is produced may, for example, be a method of kneading using a kneading machine such as an extruder, a heating roller, a kneader, a roller mixer, or a Banbury mixer. Of these methods, kneading using an extruder is preferable in terms of producibility. The kneading temperature may be set in accordance with the preferred processing temperature of the polymer forming the methacrylic resin and any other resins mixed therewith. As a rough guide, the kneading temperature may be within a range of 140° C. to 300° C., and preferably a range of 180° C. to 280° C. Moreover, it is preferable that the extruder includes a vent in order to reduce volatile content.

(Film)

The film according to the present embodiment contains the methacrylic resin composition according to the present embodiment set forth above.

The film according to the present embodiment may suitably be used as an optical film.

In a case in which the film according to the present embodiment is used as an optical film, the thickness of the film is preferably within a range of 5 μm to 200 μm. A thickness of 5 μm or more ensures sufficient strength for practical use and prevents the film from being easily broken during handling. A thickness of 200 μm or less provides a good balance in terms of the aforementioned retardation (Re, Rth) and folding strength.

In a case in which the film according to the present embodiment is used as a polarizer protective film, the thickness of the film is preferably 5 μm to 100 μm, more preferably 10 μm to 80 μm, and even more preferably 10 μm to 60 μm.

In a case in which the film according to the present embodiment is used as a transparent plastic substrate, the thickness of the film is preferably 20 μm to 180 μm, more preferably 20 μm to 160 μm, and even more preferably 30 μm to 160 μm.

The following describes properties of the film according to the present embodiment.

<In-Plane Retardation Re>

The absolute value of in-plane direction retardation Re of the film according to the present embodiment is preferably 30 nm or less. Note that herein, the in-plane direction retardation Re is a value determined by conversion for a thickness of 100 μm.

The absolute value of the in-plane direction retardation Re is more preferably 20 nm or less, even more preferably 15 nm or less, and particularly preferably 11 nm or less.

In general, the absolute value of the in-plane direction retardation Re is an indicator that expresses the magnitude of birefringence. The film according to the present embodiment has sufficiently low birefringence relative to existing resins (for example, PMMA, PC, triacetyl cellulose resin, and cycloolefin resin) and is suitable for use as an optical material in applications that require low birefringence or zero birefringence.

Conversely, when the absolute value of the in-plane direction retardation Re is more than 30 nm, this indicates that refractive index anisotropy is high and that use as an optical material in applications requiring low birefringence or zero birefringence may not be possible. There are cases in which processing by stretching is performed in order to improve the mechanical strength of an optical material (for example, a film or sheet). However, if the absolute value of the in-plane direction retardation Re after this stretching is more than 30 nm, it is not possible to obtain a material having low birefringence or zero birefringence as an optical material.

<Thickness Direction Retardation Rth>

The absolute value of thickness direction retardation Rth of the film according to the present embodiment is preferably 30 nm or less. Note that herein, the thickness direction retardation Rth is a value determined by conversion for a thickness of 100 μm.

The absolute value of the thickness direction retardation Rth is more preferably 20 nm or less, even more preferably 15 nm or less, and particularly preferably 11 nm or less.

In the case of an optical material, and particularly an optical film, the thickness direction retardation Rth is an indicator that correlates with viewing angle properties of a display device into which the optical film is incorporated. Specifically, when the absolute value of the thickness direction retardation Rth is small, this indicates that viewing angle properties are good and that reduction of contrast and color tone variation of display color depending on the viewing angle are small.

A feature of the film according to the present embodiment is that the absolute value of the thickness direction retardation Rth thereof in use as an optical film is extremely low compared to existing resins (for example, PMMA, PC, triacetyl cellulose resin, and cycloolefin resin).

<Photoelastic Coefficient>

The absolute value of the photoelastic coefficient $C_R$ of the film according to the present embodiment is preferably $3.0 \times 10^{-12}$ $Pa^{-1}$ or less, more preferably $2.0 \times 10^{-12}$ $Pa^{-1}$ or less, and even more preferably $1.0 \times 10^{-12}$ $Pa^{-1}$ or less.

The photoelastic coefficient is described in various documents (for example, refer to Review of Chemistry, No. 39, 1998 (published by Japan Scientific Societies Press)) and is defined by the following formulae (i-a) and (i-b). The closer the value of the photoelastic coefficient $C_R$ is to zero, the smaller the change in birefringence caused by external force.

$$C_R = |\Delta n|/\sigma_R \tag{i-a}$$

$$|\Delta n| = |nx - ny| \tag{i-b}$$

(In the above formulae, $C_R$ represents the photoelastic coefficient, $\sigma_R$ represents tensile stress, $|\Delta n|$ represents the absolute value of birefringence, nx represents the refractive index of the tension direction, and ny represents the refractive index of an in-plane direction that is perpendicular to the tension direction.)

The photoelastic coefficient $C_R$ of the film according to the present embodiment is sufficiently small compared to existing resins (for example, PMMA, PC, triacetyl cellulose resin, and cycloolefin resin). Accordingly, changes in birefringence occur less readily because (photoelastic) birefringence due to external force does not arise. Moreover, since (photoelastic) birefringence due to residual stress in shaping tends not to arise, the birefringence distribution in the resultant shaped product is small.

The following describes the relationship between birefringence Δn and stretch ratio S.

When property evaluation of the film according to the present embodiment is performed with respect to a uniaxially stretched film, the value of the gradient K of a least squares approximation linear relationship (ii-a) between the birefringence Δn(S) and the stretch ratio S preferably satisfies the following formula (ii-b).

$$\Delta n(S) = K \times S + C \tag{ii-a}$$

$$|K| \leq 0.30 \times 10^{-5} \tag{ii-b}$$

(In the above formulae, Δn(S) represents birefringence and S represents the stretch ratio. The birefringence Δn(S) is a value determined by converting a value measured for the film (value determined by formula (i-b)) to that for a thickness of 100 μm. C is a constant and indicates birefringence in an unstretched state.)

The absolute value (|K|) of the gradient K is more preferably $0.15 \times 10^{-5}$ or less, and even more preferably $0.10 \times 10^{-5}$ or less.

The value of K is a value that is determined by measuring the glass transition temperature (Tg) of the film by DSC and then performing uniaxial stretching at a stretching temperature of (Tg+20)° C. and a stretching rate of 500 mm/min.

The increase in birefringence is known to generally be smaller when the stretching rate is slower. The value of K can be calculated, for example, by measuring values for the birefringence (Δn(S)) exhibited by uniaxially stretched films obtained through stretching with stretch ratios (S) of 100%, 200%, and 300%, plotting these values against the stretch ratio corresponding thereto, and making a least squares approximation. When the pre-stretching chuck separation is taken to be $L_0$ and the post-stretching chuck separation is taken to be $L_1$, the stretch ratio (S) is a value represented by the following formula.

$$S=\{(L_1-L_0)/L_0\}\times 100(\%)$$

There are cases in which a film-like or sheet-like shaped product is processed by stretching with the aim of increasing mechanical strength. In the previously described relationship, the value of the gradient K indicates the degree of change in the birefringence ($\Delta n(S)$) relative to the stretch ratio (S). A large value for K indicates a large change in birefringence with respect to stretching and a small value for K indicates a small change in the birefringence with respect to stretching.

The value of the gradient K for the film according to the present embodiment is sufficiently small compared to existing resins (for example, PMMA, PC, triacetyl cellulose resin, and cycloolefin resin). Therefore, a feature of the film according to the present embodiment is that birefringence does not easily increase even upon processing by stretching relative to the increase in birefringence that occurs through stretching orientation in stretching of existing resins.

<Refractive Index>

The refractive index $d_{blend}$ of the film according to the present embodiment is preferably within a range of 1.48 to 1.53. In particular, in a case in which the obtained film is to be used as an optical film, the refractive index $d_{blend}$ is more preferably within a range of 1.48 to 1.51. A refractive index $d_{blend}$ within the range set forth above is suitable for use as a polarizing plate material in a liquid-crystal television. The refractive index of a conventional polarizing plate material is, for example, 1.49 to 1.53 in the case of a polyvinyl alcohol resin, 1.49 in the case of a triacetyl cellulose resin, and 1.53 in the case of a cyclic polyolefin resin.

<Transparency>

Total luminous transmittance can be used as an indicator of transparency.

The total luminous transmittance of the film according to the present embodiment may be optimized as appropriate depending on the intended use. In applications that require transparency, the total luminous transmittance at a thickness of 100 μm is preferably 80% or more from a viewpoint of visibility. The total luminous transmittance is more preferably 85% or more, even more preferably 88% or more, and particularly preferably 90% or more.

Although the total luminous transmittance is preferably as high as possible, in practical use, sufficient visibility can be ensured even at a total luminous transmittance of 94% or less.

The total luminous transmittance can be measured, for example, by a method described in the subsequent EXAMPLES section.

It is envisaged that the film according to the present embodiment may be used outdoors or in a liquid-crystal television and, depending on the application, may be exposed to ultraviolet rays. In such a situation, the ultraviolet rays may cause yellowing and reduce transparency, and thus a technique of adding an ultraviolet absorber to the film to suppress these effects may be adopted.

In this case, the light transmittance at 380 nm for a thickness of 100 μm is preferably 15% or less, more preferably 10% or less, and even more preferably 8% or less.

In the same way, the light transmittance at 280 nm for a thickness of 100 μm is preferably 15% or less, more preferably 10% or less, and even more preferably 8% or less.

<Shaping Processability>

Shaping processability can be evaluated, for example, based on tendency not to adhere to a roller used for film winding. Specifically, evaluation can be performed by a method described in the subsequent EXAMPLES section.

<External Appearance>

External appearance can be evaluated, for example, based on the presence of bubbles, the presence of streaks, the presence of silver streaks, and so forth. Specifically, evaluation can be performed by a method described in the subsequent EXAMPLES section.

The presence of bubbles, which is one indicator of external appearance, can be evaluated, for example, by using an optical microscope to calculate the number of bubbles having a major diameter of 100 μm or more contained per 100 $cm^2$ of a film with a thickness of approximately 100 μm that is produced at a barrel set temperature of 290° C., and performing evaluation based on the number of bubbles.

In this case, the number of bubbles per 100 $cm^2$ of the film surface is preferably less than 5, more preferably less than 3, and even more preferably less than 2.

(Film Production Method)

The film according to the present embodiment can be produced through shaping using the methacrylic resin composition according to the present embodiment set forth above.

The method by which the film is produced may be a commonly known method such as injection molding, sheet forming, blow molding, injection blow molding, inflation molding, T-die molding, press forming, extrusion molding, foam molding, or casting, and secondary processing shaping such as pressure forming or vacuum forming may also be used.

Moreover, a method in which the methacrylic resin (composition) is produced by kneading using a kneading device such as a heating roller, a kneader, a Banbury mixer, or an extruder, is subsequently cooled and pulverized, and is then shaped by transfer molding, injection molding, compression molding, or the like is another example of a method of producing the film.

After shaping, the film may be stretched by a commonly known method.

The film may be subjected to longitudinal uniaxial stretching in the direction of mechanical flow (MD direction), transverse uniaxial stretching in a perpendicular direction (TD direction) relative to the direction of mechanical flow, or biaxial stretching by sequential biaxial stretching using roll stretching and tenter stretching, simultaneous biaxial stretching by tenter stretching, biaxial stretching by tubular stretching, inflation stretching, tenter method sequential biaxial stretching, or the like. The strength of the film can be improved by performing stretching.

In particular, in the case of tenter method sequential biaxial stretching, a raw material resin is, for example, fed into a single screw or twin screw extruder, the resin is melt-kneaded, and then a sheet extruded from a T-die is guided on a casting roller and is solidified. Next, the extruded sheet is introduced into a roller-type longitudinal stretching machine and is stretched in the direction of mechanical flow (MD direction). The longitudinally stretched sheet is subsequently introduced into a tenter-type transverse stretching machine and is stretched in a perpendicular direction (TD direction) relative to the direction of mechanical flow. This tenter method sequential biaxial stretching enables simple control of the stretch ratio and can yield a film having orientation balance in the MD direction and the TD direction.

The final stretch ratio can be determined in consideration of the heat shrinkage rate of the resultant shaped and stretched product. The stretch ratio in at least one of the directions is preferably 0.1% to 400%, more preferably 10% to 400%, and even more preferably 50% to 350%. When the stretch ratio is less than the lower limit set forth above, folding strength tends to be insufficient, and when the stretch ratio is more than the upper limit set forth above, a film cannot be continuously and stably produced because breaking or rupturing frequently occurs during the film production process. By designing within any of the ranges set forth above, it is possible to obtain a preferable shaped and stretched product in terms of birefringence, heat resistance, and strength.

The stretching temperature is preferably Tg−30° C. to Tg+50° C. Tg (glass transition point) refers to a value for the resin composition forming the film. In order that the resultant film has good surface properties, the lower limit for the stretching temperature is preferably Tg−20° C. or higher, more preferably Tg−10° C. or higher, even more preferably Tg or higher, further preferably Tg+5° C. or higher, and particularly preferably Tg+7° C. or higher. Moreover, the upper limit for the stretching temperature is preferably Tg+45° C. or lower, and more preferably Tg+40° C. or lower.

In a case in which the film according to the present embodiment is to be used as an optical film, the film is preferably subjected to heat treatment (annealing) or the like after stretching to stabilize optical isotropy and mechanical properties of the film. The heat treatment conditions are not specifically limited and may be selected as appropriate in the same manner as for the conditions of heat treatment performed with respect to conventional and commonly known stretched films.

In a case in which the film according to the present embodiment is to be used as an optical film, a technique in which a target film and a resin that is non-adhesive with respect to the film are coextruded from a multilayer die, and the non-adhesive resin layer is subsequently removed to obtain the target film may suitably be adopted.

This technique is preferable from the following viewpoints (a) to (c).

(a) Film production stability is improved through an insulative effect and a film strengthening effect of the non-adhesive resin layer.

(b) An effect of preventing adhesion of dust, suspended matter, rubbish, vaporized matter of additives and the like, and other contaminants in air to the film during film production is obtained.

(c) An effect of preventing scratching of the film surface and adhesion of contaminants such as rubbish during handling after film production is obtained.

Although the effects (a) to (c) can be obtained even when a non-adhesive resin is used at one side of an acrylic thermoplastic resin in coextrusion, the effects can be obtained to a greater extent when both sides of an acrylic thermoplastic resin are sandwiched between a non-adhesive resin in coextrusion.

If the solubility parameter value of the non-adhesive resin that is coextruded from the multilayer die is similar to the solubility parameter value of the resin forming the film, there is good compatibility between the resins, which tends to facilitate mixing when blending is performed and tends to facilitate adhesion between resin layers that are in contact during coextrusion in film production. Therefore, in selection of the non-adhesive resin, it is preferable to select a resin of different polarity to the resin forming the film and for which the difference between solubility parameter values thereof is large.

Moreover, in a situation in which the temperature or viscosity of two types of resin that are in contact during coextrusion is large, interlayer disturbance tends to occur at the interface of the contacting resins and it may not be possible to obtain a film having good transparency. Therefore, in selection of a resin that is non-adhesive with respect to the acrylic thermoplastic resin that is a main component of the film, it is preferable to select a resin that has a similar viscosity to the viscosity of the acrylic thermoplastic resin at a similar temperature to the temperature of the acrylic thermoplastic resin in a die.

Various thermoplastic resins can be used as the non-adhesive resin so long as the conditions set forth above are satisfied. The non-adhesive resin is preferably a polyolefin resin, a styrene resin, a nylon resin, or a fluorine-containing resin, is more preferably a polyolefin resin, and is particularly preferably a polypropylene resin.

The methacrylic resin according to the present embodiment and the methacrylic resin composition according to the present embodiment can suitably be used as materials for various shaped products such as films.

Examples of applications for the shaped product include household goods, OA equipment, AV equipment, battery fittings, lighting equipment, automotive component applications for tail lamps, meter covers, head lamps, light guide rods, lenses, and so forth, housing applications, sanitary applications as a sanitary ware alternative or the like, and light guide plates, diffuser plates, polarizing plate protective films, quarter-wave plates, half-wave plates, viewing angle control films, liquid-crystal optical compensation films and other retardation films, display front plates, display base plates, lenses, touch panels, and the like used in displays such as liquid-crystal displays, plasma displays, organic EL displays, field emission displays, rear projection televisions, and head-up displays. The shaped product can also be suitably used as a transparent base plate or the like in a solar cell. Other possible applications include those in the fields of optical communication systems, optical switching systems, and optical measurement systems for waveguides, lenses, optical fibers, optical fiber coating materials, LED lenses, lens covers, and so forth. Moreover, use as a modifier for another resin is also possible.

Various shaped products such as films in which the methacrylic resin and resin composition thereof according to the present embodiment are used may be further subjected to surface functionalization treatment such as anti-reflection treatment, transparent conductive treatment, electromagnetic shielding treatment, or gas barrier treatment.

EXAMPLES

The following provides a description through specific examples and comparative examples. However, this disclosure is not limited to the following examples.

[Raw Materials]

Raw materials used in the subsequently described examples and comparative examples were as follows.

[[Monomers Forming Methacrylic Resins]]

Methyl methacrylate (MMA)

Produced by Asahi Kasei Chemicals Corporation (2.5 ppm of 2,4-dimethyl-6-tert-butylphenol produced by Chugai Boeki Co., Ltd. added as polymerization inhibitor)

N-Phenylmaleimide (N-PMI): Produced by Nippon Shokubai Co., Ltd.

N-Cyclohexylmaleimide (N-CMI): Produced by Nippon Shokubai Co., Ltd.

Methyl 2-(hydroxymethyl)acrylate (MHMA): Produced by Combi-Blocks Inc.

Acrylonitrile (AN)

[[Organic Solvents]]

Meta-xylene: Produced by Mitsui Chemicals, Inc.

Toluene

[[Other Materials]]

n-Octyl mercaptan (NOM): Produced by NOF Corporation; used as chain transfer agent t-Dodecyl mercaptan: Produced by Wako Pure Chemical Industries, Ltd.; used as chain transfer agent Dimethyl phosphite: Produced by Wako Pure Chemical Industries, Ltd.

PERHEXA C-75 (EB): Produced by NOF Corporation; purity 75% (containing 25% ethylbenzene); used as polymerization initiator t-Butylperoxy isopropyl carbonate: Produced by NOF Corporation; used as polymerization initiator PERHEXA 25B: Produced by NOF Corporation; purity 90% or higher; used as polymerization initiator Stearyl phosphate/distearyl phosphate mixture: Phoslex A-18 produced by Sakai Chemical Industry Co., Ltd.; used as cyclocondensation catalyst

[[Additives]]

(a-1) ADK STAB PEP-36A (PEP-36): Produced by Adeka Corporation (a-2) ADK STAB HP-10: Produced by Adeka Corporation (a-3) ADK STAB AO-412S: Produced by Adeka Corporation (a-4) ADK STAB AO-80: Produced by Adeka Corporation (a-5) Irganox 1010: Produced by BASF (a-6) LA-F70: Produced by Adeka Corporation (a-7) LA-46: Produced by Adeka Corporation (a-8) TINUVIN 460: Produced by BASF (a-9) RIKEMAL H-100: Produced by Riken Vitamin Co., Ltd.

(a-10) RIKESTER EW-400: Produced by Riken Vitamin Co., Ltd.

[[Other Resins]]

(R-1) STYLAC T8707: Produced by Asahi Kasei Corporation (R-2) Resin obtained according to following procedure A vessel including a stirrer having an attached four pitched-blade paddle impeller was charged with 2 kg of water, 65 g of tribasic calcium phosphate, 39 g of calcium carbonate, and 0.39 g of sodium lauryl sulfate to obtain a mixed liquid (A).

Next, 26 kg of water was charged to a 60 L reactor and was heated to 80° C. The mixed liquid (A) was added into the reactor and a premixed polymer raw material of 21,900 g of methyl methacrylate, 560 g of methyl acrylate, 45 g of lauroyl peroxide, and 54 g of n-octyl mercaptan was further added.

Thereafter, suspension polymerization was carried out while maintaining a temperature of approximately 80° C. A heat generation peak was observed 120 minutes after addition of the polymer raw material.

The temperature was subsequently increased to 92° C. at a rate of 1° C./min and was held at 92° C. for approximately 60 minutes to substantially complete the polymerization reaction.

Next, cooling was performed to 50° C. and 20 mass % sulfuric acid was added for suspension agent dissolution.

The polymerization reaction solution was then passed through a sieve having a 1.68 mm mesh to remove aggregates, moisture was separated by filtration, and the resultant slurry was dehydrated to obtain a bead-like polymer. The obtained bead-like polymer was washed with sodium hydroxide aqueous solution adjusted to a pH of approximately 8 to 9.5, was dehydrated as described above, and was then washed through repeated washing with deionized water and dehydration to obtain polymer particles.

The polymer had a weight average molecular weight of 100,000 as measured by GPC and a Vicat softening temperature of 109° C.

The following describes methods used to measure the properties of methacrylic resins and methacrylic resin compositions.

(I. Measurement of Methacrylic Resin Weight Average Molecular Weight)

The weight average molecular weight (Mw) of methacrylic resins produced in the subsequently described production examples was measured with the following device and conditions.

Measurement device: Gel permeation chromatograph (HLC-8320GPC) produced by Tosoh Corporation Measurement conditions Column: TSK guard column Super H-H×1, TSK gel Super HM-M×2, TSK gel Super H2500×1; connected in series in this order. In this column, elution was fast for high molecular weights and slow for low molecular weights.

Developing solvent: Tetrahydrofuran; flow rate: 0.6 mL/min; 0.1 g/L of 2,6-di-t-butyl-4-methylphenol (BHT) added as internal standard Detector: Refractive index (RI) detector Detection sensitivity: 3.0 mV/min Column temperature: 40° C.

Sample: Solution of 0.02 g of methacrylic resin in 20 mL of tetrahydrofuran

Injection volume: 10 µL

Standard samples for calibration curve: Following 10 types of polymethyl methacrylate (PMMA Calibration Kit M-M-10 produced by Polymer Laboratories Ltd.) of differing molecular weight, each having a known monodisperse weight peak molecular weight Weight peak molecular weight (Mp)

Standard sample 1: 1,916,000

Standard sample 2: 625,500

Standard sample 3: 298,900

Standard sample 4: 138,600

Standard sample 5: 60,150

Standard sample 6: 27,600

Standard sample 7: 10,290

Standard sample 8: 5,000

Standard sample 9: 2,810

Standard sample 10: 850

The RI detection intensity relative to the elution time of the methacrylic resin was measured under the conditions shown above.

The weight average molecular weight (Mw) of the methacrylic resin was determined based on the area of the GPC elution curve and a third-order approximation formula calibration curve.

(II. Measurement of Monomer Unit Composition)

Acrylic copolymers obtained by polymerization were subjected to NMR and FT-IR measurement to confirm the composition of monomer units and structural units.

NMR: JNM-ECA500 produced by JEOL Ltd.

FT-IR: IR-410 produced by JASCO Corporation; ATR method (DuraScope (ATR crystal: diamond/ZnSe); resolution: 4 $cm^{-1}$)

(III. Measurement of Total Amount of Components)

Methacrylic resins (specifically, soluble content in reprecipitation) produced in the subsequently described production examples were subjected to GC/MS measurement with the following device and conditions, and using octadecyl 3-(3,5-di-tert-butyl-4-hydroxyphenyl)propionate as an internal standard to calculate the total amount of components including dimers and trimers of monomers, and the like.

First, a standard solution was prepared according to the following procedure. Octadecyl 3-(3,5-di-tert-butyl-4-hydroxyphenyl)propionate in an amount of 25.0 mg was added into a volumetric flask having a capacity of 100 mL. The volumetric flask was filled with chloroform up to the calibration line thereof to prepare a 0.025 mass % octadecyl 3-(3,5-di-tert-butyl-4-hydroxyphenyl)propionate standard solution.

Next, a GC/MS measurement solution was prepared according to the following procedure. A resin sample of approximately 0.5 g was dissolved in 10 mL of chloroform, and then reprecipitation from 60 mL of methanol was performed. The insoluble content was removed by filtration and the chloroform/methanol soluble content was heated to dryness at 60° C. for 90 minutes under nitrogen blowing. Next, 1 mL of the standard solution was added to the concentrated soluble content and the soluble content was dissolved therein to obtain a GC/MS measurement solution.

GC/MS measurement was then carried out with the following device and conditions using 1 µL of the GC/MS measurement solution.

It was confirmed in advance by separate GC/MS measurement that peaks for dimers and trimers of the used monomers are observed between retention times of 22 minutes and 32 minutes with the device and conditions shown below. Based on this, a total area value of peaks observed between retention times of 22 minutes and 32 minutes in GC/MS measurement of the GC/MS measurement solution was attributed to components including dimers and trimers of monomers, and the like. In this manner, the total amount of components contained in the GC/MS measurement solution was calculated.

Note that in a situation in which a peak due to an additive, such as a thermal stabilizer, appeared in the retention time range mentioned above, calculation of the total amount of components was performed by subtracting an area value of the peak attributed to the additive from the total area value.

Measurement Device
GC/MS GC-7890A and MSD-5975C produced by Agilent Technologies
Measurement Conditions
Column: HP-5MS (length 30 m, internal diameter 0.25 mm, film thickness 0.25 µm)
Carrier gas: Helium (1 mL/min)
Detector: MSD
Ionization method: EI
Oven temperature: Held at 50° C. for 5 minutes, increased to 325° C. at 10° C./min, and held at 325° C. for 10 minutes
Injection port temperature: 325° C.
Transfer temperature: 325° C.
Mass spectrum range: 20 to 800
Split ratio: 10:1
Injection volume: 1 µL
Internal standard: Octadecyl 3-(3,5-di-tert-butyl-4-hydroxyphenyl)propionate Data from the GC/MS measurement was processed according to the following procedure.

A peak area value detected for octadecyl 3-(3,5-di-tert-butyl-4-hydroxyphenyl)propionate was calculated and was then compared with a total area value of peaks detected in the component detection region for the resin sample to approximate the total amount [mg] of components. The calculation formula is shown below.

Total amount of components [mg]=(Octadecyl 3-(3,5-di-tert-butyl-4-hydroxyphenyl)propionate additive amount 0.25 [mg])×(Component peak total area value)/(Octadecyl 3-(3,5-di-tert-butyl-4-hydroxyphenyl)propionate peak area value)

This total amount of components was divided by the amount of the resin sample after reprecipitation treatment to calculate the total content (mass %) of components.

Note that in a GC/MS total ion chromatogram, the base line may gradually rise with increasing oven temperature. In the case of locations where the gradient of the base line was large, integration was performed divided into a number of times in consideration of the gradient of the base line to accurately calculate a peak area value, and these integrated values were summed to obtain the "component peak total area value".

FIGS. 2A and 2B are GC/MS charts from calculation of the total amount of components including dimers and trimers of monomers, and the like, in a methacrylic resin and a resin composition of Example 4. In FIGS. 2A and 2B, the vertical axis represents intensity (−) and the horizontal axis represents time (minutes). Moreover, in FIGS. 2A and 2B, a hatched region indicates the area of a calculation section for peaks observed between retention times of 22 minutes and 32 minutes.

(IV. Proportions of Components within Specific Molecular Weight Ranges)

The molecular weight measurement device described in section (I) was used to determine the content of components having a molecular weight of 10,000 or less through a fraction due to components having a molecular weight of at least 500 and not more than 10,000. The content of components having a weight average molecular weight of more than 10,000 and not more than 50,000 was determined in the same way. Moreover, a ratio (b/a) of the content (b) of components having a weight average molecular weight of more than 50,000 relative to the content (a) of components having a weight average molecular weight of more than 10,000 and not more than 50,000 was calculated.

The following describes methods of evaluating properties of methacrylic resins, methacrylic resin compositions, and films.

<1. Heat Resistance: Measurement of Glass Transition Temperature>

Methacrylic resin compositions obtained in the subsequently described examples and comparative examples were measured in accordance with ASTM D-3418 using a thermal analyzer (Diamond DSC produced by PerkinElmer Inc.), and the glass transition temperature (° C.) thereof was calculated by the midpoint method. The results of evaluation are shown in Table 1.

<2. Shaping Processability: Roller Adhesion Prevention>

Methacrylic resin compositions obtained in the subsequently described examples and comparative examples were each used to produce a sheet of approximately 100 µm in thickness using an extruder (Ø32 mm single screw extruder produced by Research Laboratory of Plastics Technology Co., Ltd.; L/D=32; number of vents: 1) under conditions of a set temperature of 270° C., a screw rotation speed of 15 rpm, a roller rotation speed of 1 m/min, and a roller temperature within a range of "glass transition temperature−20° C." to "glass transition temperature+15° C.".

The sheet was wound by a second roller via a first temperature control roller (material: S45C; hard chrome plated; surface roughness: 0.2S; mirror finish) that allowed adjustment of the set temperature. The first temperature control roller and the second roller each had an external diameter of 15 cm. The distance between the first temperature control roller and the second roller (distance between the centers of the rollers) was 24 cm. The center of the first temperature control roller and the center of the second roller were set at the same height.

Figure 3:
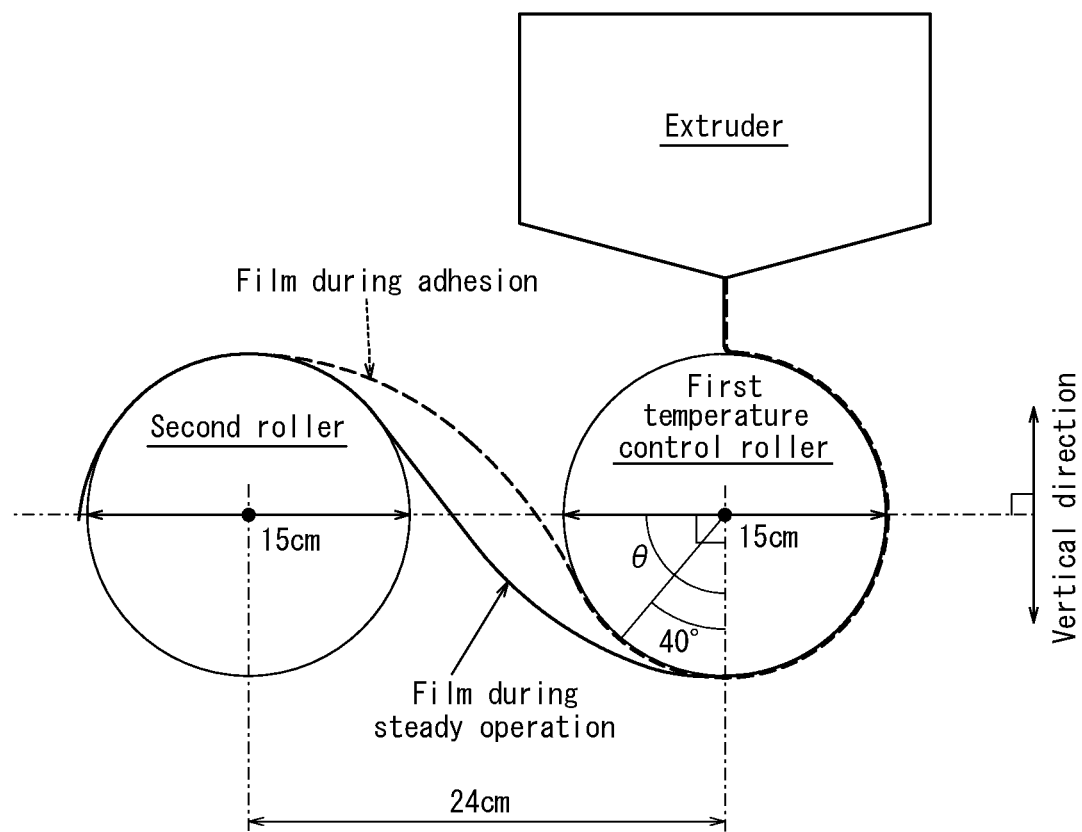
FIG. 3 illustrates the appearance around a first temperature control roller and a second roller during film production in evaluation of roller adhesion prevention of a methacrylic resin and resin composition according to a present embodiment.

FIG. 3 illustrates the appearance around the first temperature control roller and the second roller during film production in evaluation of roller adhesion prevention of the methacrylic resin and resin composition according to the present embodiment.

As illustrated in FIG. 3, a sheet that is travelling toward the second roller from the first temperature control roller adheres to the outer circumference of the first temperature control roller for a specific distance from a lowermost end of the first temperature control roller before separating from the first temperature control roller and then being wound around the second roller of approximately the same diameter. The solid line in FIG. 3 indicates the film during steady operation in the present test. In the case of steady operation, an angle formed by the lowermost end of the first temperature control roller, the cross-sectional center of the first temperature control roller, and the separation point, which is denoted θ (refer to FIG. 3), is normally 40° in the present test. On the other hand, the dashed line in FIG. 3 indicates a film during adhesion. In the present test, a case in which the angle θ is 90° is taken to be a case in which adhesion occurs.

The set temperature of the first temperature control roller at a point at which the angle θ reached 90° was taken to be an adhesion start temperature, and a temperature difference (° C.) of "adhesion start temperature−glass transition temperature" was observed.

This was used as an indicator for evaluation of roller adhesion prevention by evaluating a temperature difference of +7° C. or more as "excellent", a temperature difference of +5° C. or more as "good", and a temperature difference of less than +5° C. as "poor". A larger "adhesion start temperature−glass transition temperature" difference was evaluated to indicate better roller adhesion prevention. The results of evaluation are shown in Table 1.

<3. Evaluation of Thermal Stability>
(3-a) Temperature at Time of 1% Weight Loss Methacrylic resins and resin compositions obtained in the subsequently described examples and comparative examples were measured with the following device and conditions. The temperature at which the weight of the resin or resin composition was reduced by 1% was calculated and was taken to be the thermal decomposition onset temperature (° C.) (temperature at time of 1% weight loss). The results of evaluation are shown in Table 1.

Measurement device: Differential thermogravimetric analyzer Thermo plus EVO II TG8120 produced by Rigaku Corporation Sample weight: Approximately 10 mg Measurement atmosphere: Nitrogen (100 mL/min)

Measurement conditions: The resin or resin composition was held at 100° C. for 5 minutes and then heated to 400° C. at 10° C./min while taking the point of 1% weight loss to be the thermal decomposition onset temperature (1% weight loss temperature).

(3-b) Amount of Decomposition Upon Holding at 290° C. for 30 Minutes

The methacrylic resin or resin composition was subjected to weight measurement under the following set conditions and the weight loss ratio (%) upon holding at approximately 290° C. for 30 minutes was calculated. The results of evaluation are shown in Table 1.

Measurement device: Differential thermogravimetric analyzer Thermo plus EVO II TG8120 produced by Rigaku Corporation Sample weight: Approximately 10 mg Measurement atmosphere: Nitrogen (100 mL/min)

Measurement conditions: The resin or resin composition was held at 50° C. for 2 minutes, heated to 200° C. at 20° C./min, heated to 250° C. at 20° C./min, heated to a set temperature of 284° C. at 10° C./min, and held at 284° C. for 60 minutes, and the weight loss ratio (%) 30 minutes after the start of holding was calculated. Note that when the set temperature was 284° C., the measurement temperature was approximately 290° C.

<4. Optical Properties>
(4-a) In-Plane Retardation (Re)

For methacrylic resins and resin compositions, the retardation (nm) in a wavelength range of 400 nm to 800 nm was measured by the spinning analyzer method using an RETS-100 produced by Otsuka Electronics Co., Ltd., and the obtained value was converted for a film thickness of 100 μm to obtain a measurement value. The results of evaluation are shown in Table 1.

Note that the absolute value (|Δn|) of birefringence and the in-plane retardation (Re) have the following relationship.

$$Re=|\Delta n|\times d$$

(d: sample thickness)

Moreover, the absolute value (|Δn|) of birefringence is a value shown below.

$$|\Delta n|=|nx-ny|$$

(nx: refractive index of stretching direction; ny: refractive index of in-plane direction perpendicular to stretching direction)

(4-b) Thickness Direction Retardation (Rth)

For methacrylic resins and resin compositions, the retardation (nm) at a wavelength of 589 nm was measured using a retardation meter (KOBRA-21ADH) produced by Oji Scientific Instruments, and the obtained value was converted for a film thickness of 100 μm to obtain a measurement value. The results of evaluation are shown in Table 1.

Note that the absolute value (Amp of birefringence and the thickness direction retardation (Rth) have the following relationship.

$$Rth=|\Delta n|\times d$$

(d: sample thickness)

Moreover, the absolute value (|Δn|) of birefringence is a value shown below.

$$|\Delta n|=|(nx+ny)/2-nz|$$

(nx: refractive index of stretching direction; ny: refractive index of in-plane direction perpendicular to stretching direction; nz: refractive index of out-of-plane thickness direction perpendicular to stretching direction)

Note that in the case of an ideal film having perfect optical isotropy in all directions in three dimensions, the in-plane retardation (Re) and the thickness direction retardation (Rth) are both 0.

(4-c) Measurement of Photoelastic Coefficient

The photoelastic coefficients ($Pa^{-1}$) of methacrylic resins and resin compositions were measured using a birefringence measurement device that is described in detail in Polymer Engineering and Science 1999, 39, 2349-2357.

Specifically, a film tensing device (produced by Imoto Machinery Co., Ltd.) was set up in the path of laser light and film birefringence was measured in a wavelength range of 400 nm to 800 nm by the spinning analyzer method using an RETS-100 produced by Otsuka Electronics Co., Ltd. while applying tensile stress at 23° C. Measurement was performed for a specimen width of 6 mm at a strain rate during tensing of 50%/min (chuck separation: 50 mm, chuck movement speed: 5 mm/min).

The photoelastic coefficient ($C_R$) was calculated according to the following formula from the relationship between the absolute value ($|\Delta n|$) of birefringence and the tensile stress ($\sigma_R$) by making a least squares approximation and then determining the gradient of the resultant straight line. This calculation was performed using data in a tensile stress range of 2.5 MPa $\leq \sigma_R \leq$ 10 MPa. The results of evaluation are shown in Table 1.

$$C_R = |\Delta n|/\sigma_R$$

Note that the absolute value ($|\Delta n|$) of birefringence is a value shown below.

$$|\Delta n| = |nx - ny|$$

(nx: refractive index of tension direction; ny: refractive index of in-plane direction perpendicular to tension direction)

(4-d) Transparency (4-d-1) Measurement of Total Luminous Transmittance

Films (approximately 100 μm in thickness) formed from methacrylic resins and resin compositions obtained in the subsequently described examples and comparative examples were used to measure total luminous transmittance in accordance with ISO 13468-1 regulations as an indicator of transparency. The results of evaluation are shown in Table 1.

(4-d-2) Measurement of Light Transmittance at 380 nm

Light transmittance for light having a wavelength of 380 nm was measured in the same manner as in section (4-d-1). The results of evaluation are shown in Table 1.

(4-d-3) Measurement of Light Transmittance at 280 nm

Light transmittance for light having a wavelength of 280 nm was measured in the same manner as in section (4-d-1). The results of evaluation are shown in Table 1.

<5. External Appearance>

(5-a) Presence of Bubbles

Methacrylic resins and resin compositions obtained in the subsequently described examples and comparative examples were each used to produce a film of approximately 100 μm in thickness and approximately 12 cm in width using an extruder (Ø32 mm single screw extruder produced by Research Laboratory of Plastics Technology Co., Ltd.; L/D=32; number of vents: 1) with a set temperature of 290° C. and a roller temperature of "glass transition temperature–10° C.". The resin composition that was used was dried in advance for 24 hours in an oven set to 105° C.

Approximately 5 minutes after the temperature of the produced film had stabilized, 10 pieces of approximately 20 cm each were cut out from the film. The surface of each film was observed using an optical microscope and the number of bubbles having a major diameter of 100 μm or more contained per 100 $cm^2$ of the film was counted. An average value of the numbers counted for the 10 pieces was calculated. The results of evaluation are shown in Table 1.

(5-b) Presence of Streaks

Methacrylic resins and resin compositions obtained in the subsequently described examples and comparative examples were used to produce films of approximately 100 μm in thickness at a set temperature of 280° C.

A judgment of "good" was made in a case in which streaks did not arise at the film surface and a judgment of "poor" was made in a case in which streaks did arise. The results of evaluation are shown in Table 1.

<6. Overall Evaluation>

With regards to the above evaluations, an evaluation of "excellent" was made in cases that were judged to be most suitable for film applications, an evaluation of "good" was made in cases that were judged to be suitable for film applications, and an evaluation of "poor" was made in cases in which a deficiency was observed in any of the evaluations and that were judged to be unsuitable for film applications. The results of evaluation are shown in Table 1.

The following describes methacrylic resin production examples.

Production Example 1

A raw material solution was prepared by charging 432.3 kg of methyl methacrylate (MMA), 33.0 kg of N-phenylmaleimide (PMI), 84.7 kg of N-cyclohexylmaleimide (CMI), 450.0 kg of meta-xylene, and 100 mass ppm (relative to 100 parts by mass, in total, of all monomers) of n-octyl mercaptan into a 1.25 $m^3$ reaction tank equipped with a stirring device having an attached paddle impeller, a temperature sensor, a cooling tube, and a nitrogen introduction tube, and then dissolving these materials. The raw material solution was heated to 125° C. under stirring while passing nitrogen therethrough.

An initiator feed liquid was separately prepared by mixing 0.23 kg of PERHEXA C-75 and 1.82 kg of meta-xylene.

Once the raw material solution reached 127° C., feeding (addition) of the initiator feed liquid (polymerization initiator mixed liquid) as in (1) to (6) of the following profile was started.

(1) 0.0 hr to 0.5 hr: Feed rate of 1.00 kg/hr
(2) 0.5 hr to 1.0 hr: Feed rate of 0.50 kg/hr
(3) 1.0 hr to 2.0 hr: Feed rate of 0.42 kg/hr
(4) 2.0 hr to 3.0 hr: Feed rate of 0.35 kg/hr
(5) 3.0 hr to 4.0 hr: Feed rate of 0.14 kg/hr
(6) 4.0 hr to 7.0 hr: Feed rate of 0.13 kg/hr After the initiator had been fed over a total of 7 hours (B hr=7 hr), the reaction was continued for a further 1 hour, and thus the polymerization reaction was performed for 8 hours from starting addition of the initiator.

The internal temperature in the polymerization reaction was controlled to 127±2° C. The polymerization conversion rate of the resultant polymerization liquid was measured. The results were MMA units: 93.7 mass %; PMI units: 95.5 mass %; and CMI units: 91.2 mass %. Overall, the polymerization conversion rate was 93%.

A Ø42 mm devolatilization extruder having four fore vents and one back vent was used to perform devolatilization treatment of the resultant polymerization liquid at 140 rpm and 10 kg/hr, in terms of amount of resin, and to obtain resin pellets.

The resultant pellets had a weight average molecular weight of 180,000 and a glass transition temperature of 135° C.

The chemical composition of the pellets as determined by NMR was 79 mass % of MMA units, 6 mass % of PMI units, and 15 mass % of CMI units.

Note that the production method of Production Example 1 satisfied the previously described production method conditions (i) to (v).

Production Example 2

Production was implemented in the same manner as in Production Example 1 with the exception that 530.8 kg of methyl methacrylate (MMA), 19.3 kg of N-phenylmaleimide (N-PMI), 450 kg of meta-xylene, and 200 mass ppm (relative to 100 parts by mass, in total, of all monomers) of n-octyl mercaptan were used.

The resultant pellets had a glass transition temperature of 121° C.

The chemical composition of the pellets as determined by NMR was 97 mass % of MMA units and 3 mass % of PMI units.

Production Example 3

Production was implemented in the same manner as in Production Example 1 with the exception that 380.1 kg of methyl methacrylate (MMA), 6.1 kg of N-phenylmaleimide (N-PMI), 163.9 kg of N-cyclohexylmaleimide (N-CMI), 450 kg of meta-xylene, and 200 mass ppm (relative to 100 parts by mass, in total, of all monomers) of n-octyl mercaptan were used.

The resultant pellets had a glass transition temperature of 145° C.

The chemical composition of the pellets as determined by NMR was 71 mass % of MMA units, 1 mass % of PMI units, and 28 mass % of CMI units.

Production Example 4

A 1.25 m³ reaction tank equipped with a stirring device having an attached paddle impeller, a temperature sensor, a cooling tube, and a nitrogen introduction tube was charged with 437.5 kg of methyl methacrylate (MMA), 46.5 kg of N-phenylmaleimide (N-PMI), 66.0 kg of N-cyclohexylmaleimide, 450 kg of meta-xylene, and 100 mass ppm (relative to 100 parts by mass, in total, of all monomers) of n-octyl mercaptan, and these materials were heated to 120° C. under stirring while passing nitrogen therethrough.

An initiator feed liquid A was separately prepared by mixing 0.18 kg of PERHEXA 25B and 0.73 kg of meta-xylene, and an initiator feed liquid B was separately prepared by mixing 0.061 kg of PERHEXA 25B and 0.24 kg of meta-xylene.

Once the raw material solution temperature reached 130° C., the initiator feed liquid A was fed for 10 minutes at a feed rate of 5.5 kg/hr. After 2 hours, the raw material solution temperature was reduced to 115° C. over 0.5 hours, the initiator feed liquid B was fed for 10 minutes at a feed rate of 1.8 kg/hr (B hr=2.83 hr) once the temperature reached 115° C., and then the reaction was continued. The polymerization reaction was implemented for a total of 13 hours to end the reaction A Ø42 mm devolatilization extruder having four fore vents and one back vent was used to perform devolatilization treatment of the resultant polymerization liquid at 140 rpm and 10 kg/hr, in terms of amount of resin, and to obtain resin pellets.

The resultant pellets had a glass transition temperature of 132° C.

The chemical composition of the pellets as determined by NMR was 81 mass % of MMA units, 8 mass % of N-PMI units, and 11 mass % of N-CMI units.

Note that the production method of Production Example 4 satisfied the previously described production method conditions (i) to (v).

Production Example 5

A raw material solution was prepared by charging 437.3 kg of methyl methacrylate (MMA), 46.5 kg of N-phenylmaleimide (PMI), 66.0 kg of N-cyclohexylmaleimide (CMI), 450.0 kg of meta-xylene, and 700 mass ppm (relative to 100 parts by mass, in total, of all monomers) of n-octyl mercaptan into a 1.25 m³ reaction tank equipped with a stirring device having an attached paddle impeller, a temperature sensor, a cooling tube, and a nitrogen introduction tube, and then dissolving these materials. The raw material solution was heated to 125° C. under stirring while passing nitrogen therethrough.

An initiator feed liquid was separately prepared by mixing 0.23 kg of PERHEXA C-75 and 1.82 kg of meta-xylene.

Once the raw material solution reached 127° C., feeding (addition) of the initiator feed liquid (polymerization initiator mixed liquid) as in (1) to (6) of the following profile was started.

(1) 0.0 hr to 0.5 hr: Feed rate of 1.00 kg/hr
(2) 0.5 hr to 1.0 hr: Feed rate of 0.50 kg/hr
(3) 1.0 hr to 2.0 hr: Feed rate of 0.42 kg/hr
(4) 2.0 hr to 3.0 hr: Feed rate of 0.35 kg/hr
(5) 3.0 hr to 4.0 hr: Feed rate of 0.14 kg/hr
(6) 4.0 hr to 7.0 hr: Feed rate of 0.13 kg/hr After the initiator had been fed over a total of 7 hours (B hr=7 hr), the reaction was continued for a further 1 hour, and thus the polymerization reaction was performed for 8 hours from starting addition of the initiator.

The internal temperature in the polymerization reaction was controlled to 127±2° C.

A Ø42 mm devolatilization extruder having four fore vents and one back vent was used to perform devolatilization treatment of the resultant polymerization liquid at 140 rpm and 10 kg/hr, in terms of amount of resin, and to obtain resin pellets.

The chemical composition of the pellets as determined by NMR was 81 mass % of MMA units, 8 mass % of N-PMI units, and 11 mass % of N-CMI units.

Note that the production method of Production Example 5 satisfied the previously described production method conditions (i) to (v).

Production Example 6

A raw material solution was prepared by charging 437.5 kg of methyl methacrylate (MMA), 46.5 kg of N-phenylmaleimide (PMI), 59.4 kg of N-cyclohexylmaleimide (CMI), 6.6 kg of acrylonitrile (AN), 450.0 kg of meta-xylene, and 100 mass ppm (relative to 100 parts by mass, in total, of all monomers) of n-octyl mercaptan into a 1.25 m³ reaction tank equipped with a stirring device having an attached paddle impeller, a temperature sensor, a cooling tube, and a nitrogen introduction tube, and then dissolving these materials. The raw material solution was heated to 120° C. under stirring while passing nitrogen therethrough.

An initiator feed liquid A was separately prepared by mixing 0.18 kg of PERHEXA 25B and 0.73 kg of meta-xylene, and an initiator feed liquid B was separately prepared by mixing 0.061 kg of PERHEXA 25B and 0.24 kg of meta-xylene.

Once the raw material solution temperature reached 130° C., the initiator feed liquid A was fed for 10 minutes at a feed rate of 5.5 kg/hr. After 2 hours, the temperature in the reaction tank was reduced to 115° C. over 0.5 hours, the initiator feed liquid B was fed for 10 minutes at a feed rate of 1.8 kg/hr (B hr=2.83 hr) once the temperature reached 115° C., and then the reaction was continued. The polymerization reaction was implemented for a total of 13 hours to end the reaction.

A Ø42 mm twin screw devolatilization extruder having four fore vents and one back vent was used to perform devolatilization treatment of the resultant polymerization liquid at 140 rpm and 10 kg/hr, in terms of amount of resin, and to obtain resin pellets.

The resultant pellets had a glass transition temperature of 130° C.

The chemical composition of the pellets as determined by NMR and FT-IR was 81 mass % of MMA units, 8 mass % of PMI units, 10 mass % of CMI units, and 1 mass % of AN units.

Note that the production method of Production Example 6 satisfied the previously described production method conditions (i) to (v).

Production Example 7

A raw material solution was prepared by charging 492.3 kg of methyl methacrylate (MMA), 57.8 kg of N-phenylmaleimide (PMI), and 450.0 kg of meta-xylene into a 1.25 m³ reaction tank equipped with a stirring device having an attached paddle impeller, a temperature sensor, a cooling tube, and a nitrogen introduction tube, and then dissolving these materials. The raw material solution was heated to 125° C. under stirring while passing nitrogen therethrough.

An initiator feed liquid was separately prepared by mixing 0.23 kg of PHC-75 and 1.82 kg of meta-xylene.

Once the raw material solution temperature reached 128° C., feeding of the initiator feed liquid at a feed rate of 0.05 kg/hr was started. After 0.5 hours, the initiator feed liquid was fed for 3.5 hours at a changed feed rate of 0.18 kg/hr and was then fed for 2 hours at a feed rate of 0.52 kg/hr such that the initiator was fed over a total of 6 hours. The reaction was subsequently continued for a further 1 hour such that the polymerization reaction was ended after a total of 7 hours.

The internal temperature in the polymerization reaction was controlled to 128±2° C.

A Ø42 mm twin screw devolatilization extruder having four fore vents and one back vent was used to perform devolatilization treatment of the resultant polymerization liquid at 140 rpm and 10 kg/hr, in terms of amount of resin, and to obtain resin pellets.

The resultant pellets had a glass transition temperature of 130° C.

The chemical composition of the pellets as determined by NMR was 90 mass % of MMA units and 10 mass % of PMI units.

Note that the production method of Production Example 7 satisfied the previously described production method conditions (i), (ii), (iv), and (v) but did not satisfy condition (iii).

Production Example 8

A stainless steel reaction tank equipped with a paddle impeller and having an internal capacity of 20 L was charged with 6.48 kg of methyl methacrylate (MMA), 0.72 kg of N-phenylmaleimide (PMI), 7.20 kg of toluene, 0.0072 kg of dimethyl phosphite (1,000 mass ppm relative to 100 parts by mass, in total, of all monomers), and 0.0288 kg of t-dodecyl mercaptan (4,000 mass ppm relative to 100 parts by mass, in total, of all monomers). These materials were subjected to bubbling with nitrogen gas for 10 minutes under stirring at 100 rpm, and then heating thereof under a nitrogen atmosphere was started. t-Butylperoxy isopropyl carbonate (3,000 mass ppm relative to 100 parts by mass, in total, of all monomers) was added into the reaction tank once the temperature in the reaction tank reached 100° C. and a polymerization reaction was carried out for a total of 15 hours under reflux at a polymerization temperature of 105° C. to 110° C.

Next, the resultant polymerization liquid was fed into a 42 mm vented twin screw extruder that was controlled to a cylinder temperature of 240° C., vacuum devolatilization was performed through the vent, and extruded strands were pelletized to obtain pellets of a transparent heat resistant resin.

The pellets had a glass transition temperature of 130° C. The chemical composition of the pellets as determined by NMR was 90 mass % of MMA units and 10 mass % of N-PMI units.

Note that the production method of Production Example 8 did not satisfy the previously described production method condition (i).

Production Example 9

A raw material solution was prepared by charging 41.0 kg of methyl methacrylate (MMA), 10.0 kg of methyl 2-(hydroxymethyl)acrylate (produced by Combi-Blocks Inc.), and 50.0 kg of toluene into a 200 L reaction tank equipped with a stirring device having an attached paddle impeller, a temperature sensor, a cooling tube, and a nitrogen introduction tube. The raw material solution was heated to a liquid temperature of 107° C. under stirring while passing nitrogen therethrough.

An initiator feed liquid was separately prepared by mixing 0.05 kg of PHC-75 and 0.36 kg of toluene.

Once the raw material solution temperature reached 107° C., feeding of the initiator feed liquid as in (1) to (6) of the following profile was started.

(1) 0.0 hr to 0.5 hr: Feed rate of 0.20 kg/hr
(2) 0.5 hr to 1.0 hr: Feed rate of 0.10 kg/hr
(3) 1.0 hr to 2.0 hr: Feed rate of 0.08 kg/hr
(4) 2.0 hr to 3.0 hr: Feed rate of 0.07 kg/hr
(5) 3.0 hr to 4.0 hr: Feed rate of 0.028 kg/hr
(6) 4.0 hr to 7.0 hr: Feed rate of 0.026 kg/hr After the initiator had been fed over a total of 7 hours (B hr=7 hr), the reaction was continued for a further 1 hour, and the polymerization reaction was ended after a total of 8 hours.

The internal temperature in the polymerization reaction was controlled to 107±2° C. Next, 51 g of a stearyl phosphate/distearyl phosphate mixture was added to the resultant polymer solution, and a cyclocondensation reaction was carried out for 5 hours under reflux (approximately 90° C. to 110° C.).

A Ø42 mm twin screw devolatilization extruder having four fore vents and one back vent was used to perform cyclocondensation reaction and devolatilization treatment of the resultant polymerization liquid at 140 rpm and 10 kg/hr, in terms of amount of resin, and to obtain resin pellets. The chemical composition of the resultant resin was 82 mass % of MMA units, 17 mass % of lactone ring structural units, and 1 mass % of MHMA units. The glass transition temperature was 129° C.

Note that the production method of Production Example 9 satisfied the previously described production method conditions (i) to (v).

Production Example 10

A 20 L reaction tank equipped with a stirring device having an attached paddle impeller, a temperature sensor, a cooling tube, and a nitrogen introduction tube was charged with 4.1 kg of methyl methacrylate (MMA), 1 kg of methyl 2-(hydroxymethyl)acrylate (produced by Combi-Blocks Inc.), 0.20 parts by mass (relative to 100 parts by mass, in total, of all monomers) of n-dodecyl mercaptan as a chain transfer agent, and 5 kg of toluene, and these materials were heated to 107° C. under stirring while passing nitrogen therethrough.

The materials were subjected to bubbling with nitrogen gas for 10 minutes under stirring at 100 rpm, and then heating of these materials under a nitrogen atmosphere was started. Once the temperature in the polymerization tank reached 100° C., 0.15 parts by mass (relative to 100 parts by mass, in total, of all monomers) of t-butylperoxy isopropyl carbonate was added into the polymerization tank, and a polymerization reaction was carried out for a total of 15 hours under reflux at a polymerization temperature of 105° C. to 110° C. Next, 5.1 g of a stearyl phosphate/distearyl phosphate mixture was added to the resultant polymer solution and a cyclocondensation reaction was carried out for 5 hours under reflux (approximately 90° C. to 110° C.).

A Ø42 mm devolatilization extruder having four fore vents and one back vent was used to perform cyclocondensation reaction and devolatilization treatment of the resultant polymerization liquid at 140 rpm and 10 kg/hr, in terms of amount of resin, and to obtain resin pellets. The chemical composition of the resultant resin was 82 mass % of MMA units, 17 mass % of lactone ring structural units, and 1 mass % of MHMA units. The glass transition temperature was 129° C.

Note that the production method of Production Example 10 did not satisfy the previously described production method condition (i).

Production Example 11

A raw material solution was prepared by charging 69.1 kg of methyl methacrylate (MMA), 5.32 kg of styrene (St), 9.57 kg of methacrylic acid (MAA), 56.0 kg of meta-xylene, and 1,250 mass ppm (relative to 100 parts by mass, in total, of all monomers) of n-octyl mercaptan into a 200 L reaction tank equipped with a stirring device having an attached paddle impeller, a temperature sensor, a cooling tube, and a nitrogen introduction tube. The raw material solution was heated to 117° C. under stirring while passing nitrogen therethrough.

An initiator feed liquid A was separately prepared by mixing 0.029 kg of PH25B and 0.10 kg of meta-xylene, and an initiator feed liquid B was separately prepared by mixing 0.0098 kg of PH25B and 0.10 kg of meta-xylene.

Once the raw material solution temperature reached 117° C., the initiator feed liquid A was fed for 10 minutes at a feed rate of 0.774 kg/hr, and a reaction was carried out for 2 hours. Thereafter, the initiator feed liquid B was fed for 10 minutes at a feed rate of 0.660 kg/hr (B hr=2.33 hr), the reaction was continued for a further 10 hours, and thus the polymerization reaction was performed for a total of 12 hours 20 minutes to end the reaction.

The resultant polymerization liquid was supplied into a high-temperature vacuum chamber set at 270° C., unreacted material and solvent were removed, and a 6-membered ring acid anhydride was produced.

As a result of compositional analysis of the produced copolymer by NMR, it was determined that the copolymer included 78 mass % of MMA units, 7 mass % of St units, 4 mass % of MAA units, and 11 mass % of 6-membered ring acid anhydride units.

An autoclave having an internal capacity of 5 L was charged with 0.5 kg of copolymer pellets obtained in this manner. Thereafter, 3.0 kg of N,N-dimethylformamide was added and stirring was performed to dissolve the copolymer pellets. Next, 28% ammonia water containing two equivalents of ammonia relative to the amount of 6-membered ring acid anhydride units was added, and a reaction was carried out for 2 hours at 150° C.

The reaction liquid was removed and added into n-hexane to precipitate polymer. This polymer was then treated for 2 hours at 250° C. in a 10 Torr volatilization furnace.

The finally obtained copolymer was slightly yellow and transparent, and the chemical composition thereof according to nitrogen content quantification by elemental analysis, NMR, and IR was 78 mass % of MMA units, 7 mass % of St units, 4 mass % of MAA units, and 11 mass % of glutarimide-based structural units. The operation described above was repeated to prepare the pellets required for evaluation.

The resultant pellets had a glass transition temperature of 127° C.

Note that the production method of Production Example 11 satisfied the previously described production method conditions (i) to (iv) but did not satisfy condition (v).

Production Example 12

A raw material solution was prepared by charging 550 kg of methyl methacrylate (MMA), 450 kg of meta-xylene, and 400 mass ppm (relative to 100 parts by mass, in total, of all monomers) of n-octyl mercaptan into a 1.25 m³ reaction tank equipped with a stirring device having an attached paddle impeller, a temperature sensor, a cooling tube, and a nitrogen introduction tube, and then dissolving these materials. The raw material solution was heated to 125° C. under stirring while passing nitrogen therethrough.

An initiator feed liquid was separately prepared by mixing 0.23 kg of PERHEXA C-75 and 1.82 kg of meta-xylene. Once the raw material solution reached 127° C., feeding of the initiator feed liquid as in (1) to (6) of the following profile was started.

(1) 0.0 hr to 0.5 hr: Feed rate of 1.00 kg/hr
(2) 0.5 hr to 1.0 hr: Feed rate of 0.50 kg/hr
(3) 1.0 hr to 2.0 hr: Feed rate of 0.42 kg/hr
(4) 2.0 hr to 3.0 hr: Feed rate of 0.35 kg/hr
(5) 3.0 hr to 4.0 hr: Feed rate of 0.20 kg/hr
(6) 4.0 hr to 7.0 hr: Feed rate of 0.13 kg/hr After the initiator had been fed over a total of 7 hours (B hr=7 hr), the reaction was continued for a further 1 hour, and the polymerization reaction was ended after a total of 8 hours.

A Ø42 mm devolatilization extruder having four fore vents and one back vent was used to perform devolatilization treatment of the resultant polymerization liquid at 140 rpm and 10 kg/hr, in terms of amount of resin, and to obtain resin pellets.

An imidization reaction was then carried out by using a side feed to introduce a 40 mass % monomethylamine aqueous solution into a vented twin screw extruder with a barrel temperature of 250° C. in an amount of 5 parts by mass of monomethylamine relative to 100 parts by mass of the obtained resin pellets. Excess methylamine and moisture were appropriately removed from a vent provided at a downstream side of the extruder to obtain glutarimide ring-containing methacrylic resin pellets.

The imidization rate was 5% (i.e., the chemical composition of the resultant copolymer was 95 mass % of MMA units and 5 mass % of glutarimide-based structural units). The glass transition temperature was 122° C.

Note that the production method of Production Example 12 satisfied the previously described production method conditions (i) to (v).

Production Example 13

A 20 L reaction tank equipped with a stirring device having an attached paddle impeller, a temperature sensor, a cooling tube, and a nitrogen introduction tube was charged with 6.90 kg of methyl methacrylate (MMA), 0.53 kg of styrene (St), 0.96 kg of methacrylic acid (MAA), 5.60 kg of toluene, and 1,600 mass ppm (relative to 100 parts by mass, in total, of all monomers) of t-dodecyl mercaptan as a chain transfer agent, and these materials were heated to 107° C. under stirring while passing nitrogen therethrough.

The materials were subjected to bubbling with nitrogen gas for 10 minutes under stirring at 100 rpm, and then heating of these materials under a nitrogen atmosphere was started. Once the temperature in the reaction tank reached 100° C., 0.15 parts by mass (relative to 100 parts by mass, in total, of all monomers) of t-butylperoxy isopropyl carbonate was added into the polymerization tank, and a polymerization reaction was carried out for 15 hours under reflux at a polymerization temperature of 105° C. to 110° C.

The resultant polymerization liquid was supplied into a high-temperature vacuum chamber set at 270° C., unreacted material and solvent were removed, and a 6-membered ring acid anhydride was produced.

As a result of compositional analysis of the produced copolymer by NMR, it was determined that the copolymer included 78 mass % of MMA units, 7 mass % of St units, 4 mass % of MAA units, and 11 mass % of 6-membered ring acid anhydride units.

An autoclave having an internal capacity of 5 L was charged with 0.5 kg of copolymer pellets obtained in this manner. Thereafter, 3.0 kg of N,N-dimethylformamide was added and stirring was performed to dissolve the copolymer pellets. Next, 28% ammonia water containing two equivalents of ammonia relative to the amount of 6-membered ring acid anhydride units was added, and a reaction was carried out for 2 hours at 150° C.

The reaction liquid was removed and added into n-hexane to precipitate polymer. This polymer was then treated for 2 hours at 250° C. in a 10 Torr volatilization furnace.

The finally obtained copolymer was slightly yellow and transparent, and the chemical composition thereof according to nitrogen content quantification by elemental analysis, NMR, and IR was 78 mass % of MMA units, 7 mass % of St units, 4 mass % of MAA units, and 11 mass % of glutarimide-based structural units. The operation described above was repeated to prepare the pellets required for evaluation.

The resultant pellets had a glass transition temperature of 127° C.

Note that the production method of Production Example 13 did not satisfy the previously described production method condition (i).

Production Example 14

A raw material solution was prepared by charging 467.0 kg of methyl methacrylate (MMA), 55.0 kg of N-phenyl-maleimide (PMI), 27.0 kg of styrene (St), 450.0 kg of meta-xylene, and 1,000 mass ppm (relative to 100 parts by mass, in total, of all monomers) of n-octyl mercaptan into a 1.25 m$^3$ reaction tank equipped with a stirring device having an attached paddle impeller, a temperature sensor, a cooling tube, and a nitrogen introduction tube, and then dissolving these materials. The raw material solution was heated to 125° C. under stirring while passing nitrogen therethrough.

An initiator feed liquid was separately prepared by mixing 0.23 kg of PERHEXA C-75 and 1.82 kg of meta-xylene.

Once the raw material solution reached 127° C., feeding (addition) of the initiator feed liquid (polymerization initiator mixed liquid) as in (1) to (6) of the following profile was started.

(1) 0.0 hr to 0.5 hr: Feed rate of 1.00 kg/hr
(2) 0.5 hr to 1.0 hr: Feed rate of 0.50 kg/hr
(3) 1.0 hr to 2.0 hr: Feed rate of 0.42 kg/hr
(4) 2.0 hr to 3.0 hr: Feed rate of 0.35 kg/hr
(5) 3.0 hr to 4.0 hr: Feed rate of 0.14 kg/hr
(6) 4.0 hr to 7.0 hr: Feed rate of 0.13 kg/hr After the initiator had been fed over a total of 7 hours (B hr=7 hr), the reaction was continued for a further 1 hour, and thus the polymerization reaction was performed for 8 hours from starting addition of the initiator.

The internal temperature in the polymerization reaction was controlled to 127±2° C.

A Ø42 mm devolatilization extruder having four fore vents and one back vent was used to perform devolatilization treatment of the resultant polymerization liquid at 140 rpm and 10 kg/hr, in terms of amount of resin, and to obtain resin pellets.

The chemical composition of the pellets as determined by NMR was 85 mass % of MMA units, 10 mass % of N-PMI units, and 5 mass % of styrene units.

Note that the production method of Production Example 14 satisfied the previously described production method conditions (i) to (v).

The methacrylic resins produced in the preceding production examples were used to produce methacrylic resin compositions and films.

Example 1

A hand blender was used to blend 0.15 parts by mass of PEP-36 and 0.05 parts by mass of Irganox 1010 relative to 100 parts by mass of the resin obtained in Production Example 1. Melt-kneading was then performed using a vented (three locations) Ø26 mm twin screw extruder TEM-26SS (L/D=48, four hole die used; die set temperature: 280° C.; barrel set temperature: 280° C.; outlet side, hopper-adjacent barrel set temperature: 230° C.) produced by Toshiba Machine Co., Ltd. with a discharge rate of 10 kg/hr and a rotation speed of 150 rpm to produce a methacrylic resin composition in the form of pellets.

The obtained pellets were used to produce a film of approximately 100 μm in thickness in an extruder (Ø32 mm single screw extruder produced by Research Laboratory of Plastics Technology Co., Ltd.; L/D=32; number of vents: 1)

at a set temperature of 270° C. and a roller temperature of "glass transition temperature−10° C.".

The obtained resin composition pellets and film were used to evaluate physical properties as previously described.

Details of the conditions, such as the amounts of the methacrylic resin and additives, and the results of evaluation are shown in Table 1.

In particular, the Charpy impact strength (unnotched) measured in accordance with ISO 179/1eU regulations with respect to a specimen of 4 mm in thickness that was prepared using the pellets obtained in Example 1 was 15 kJ/m².

Moreover, in measurement of thermal stability of the film obtained in Example 1 by the methods described in sections (3-a) and (3-b), the temperature at the time of 1% weight loss was 330° C. and the weight loss ratio upon holding at 290° C. for 30 minutes was 1.9%.

Examples 2 to 16 and Comparative Examples 1 to 3

Granulation was implemented by the same method as in Example 1 using resins and additives indicated in Table 1, and evaluations were also performed. The results of evaluation are shown in Table 1. Note that in cases in which additives were not added, granulation was implemented without additive addition.

Example 17

A hand blender was used to blend 5 parts by mass of an additive STYLAC AS T7807 relative to 95 parts by mass of the resin obtained in Production Example 9. Melt-kneading was then performed using a vented (three locations) Ø26 mm twin screw extruder TEM-26SS (L/D=48, four hole die used; die set temperature: 270° C.; barrel set temperature: 270° C.; outlet side, feed hopper-adjacent barrel set temperature: 230° C.) produced by Toshiba Machine Co., Ltd. with a discharge rate of 10 kg/hr and a rotation speed of 150 rpm to produce a methacrylic resin composition in the form of pellets.

The obtained pellets were used to produce a film of approximately 100 μm thickness in an extruder (Ø32 mm single screw extruder produced by Research Laboratory of Plastics Technology Co., Ltd.; L/D=32; number of vents: 1) at a set temperature of 270° C. and a roller temperature of "glass transition temperature−10° C.".

The obtained resin composition pellets and film were used to evaluate physical properties as previously described.

Details of the conditions, such as the amounts of the methacrylic resin and additive, and the results of evaluation are shown in Table 1.

Examples 18 to 22

Methacrylic resin compositions were each produced by the same method as in Example 17 with the exception that the chemical composition was changed to that indicated in Table 1.

Details of the conditions, such as the amounts of methacrylic resin and additives, and the results of evaluation are shown in Table 1.

TABLE 1

| | | | | Example 1 | Example 2 | Example 3 | Example 4 | Example 5 | Example 6 | Example 7 |
|---|---|---|---|---|---|---|---|---|---|---|
| Methacrylic resin composition | Methacrylic resin production method | | — | Production Example 1 | Production Example 2 | Production Example 3 | Production Example 1 | Production Example 1 | Production Example 1 | Production Example 4 |
| | Methacrylic resin | | Parts by mass | 100 | 100 | 100 | 100 | 100 | 100 | 100 |
| | Other resins | (R-1) | Parts by mass | | | | | | | |
| | | (R-2) | Parts by mass | | | | | | | |
| | Additives (a-1) | PEP-36A | Parts by mass | 0.15 | | 0.05 | | 0.1 | | |
| | (a-2) | HP-10 | Parts by mass | | 0.05 | | | | | |
| | (a-3) | AO-412S | Parts by mass | | | 0.05 | 0.05 | | 0.1 | 0.1 |
| | (a-4) | AO-80 | Parts by mass | | | 0.1 | | | 0.1 | |
| | (a-5) | Irganox 1010 | Parts by mass | 0.05 | | 0.1 | 0.1 | | | |
| | (a-6) | LA-F70 | Parts by mass | | | | | | | |
| | (a-7) | LA-46 | Parts by mass | | | | | | | |
| | (a-8) | TINUVIN 460 | Parts by mass | | | | | 1.2 | | |
| | (a-9) | RIKEMAL H-100 | Parts by mass | | | | | | | |
| | (a-10) | RIKESTER EW-400 | Parts by mass | | | | | | 0.05 | |
| Properties | (I) | Weight average molecular weight (Mw) | — | 17 | 16 | 14 | 17 | 17 | 17 | 17 |
| | (III) | Total content of specific components | Mass % | 0.17 | 0.09 | 0.21 | 0.26 | 0.13 | 0.16 | 0.15 |
| | (IV) | Content of components for which Mw ≤ 10,000 | Mass % | 1.4 | 1.1 | 3.1 | 1.6 | 1.3 | 1.4 | 1.5 |
| | | Content of components for which 10,000 < Mw ≤ 50,000 | Mass % | 18.5 | 21.2 | 24.2 | 15.6 | 17.1 | 17 | 14.1 |

TABLE 1-continued

|   |   |   |   |   |   |   |   |   |   |
|---|---|---|---|---|---|---|---|---|---|
| | | Content of components for which Mw > 50,000/Content of components for which 10,000 < Mw ≤ 50,000 | — | 4.3 | 3.7 | 3.0 | 5.3 | 4.8 | 4.8 | 6.0 |
| 1 | | Glass transition temperature | ° C. | 135 | 120 | 142 | 135 | 135 | 135 | 132 |
| 2 | | Shaping processabiliy (prevention of roller adhesion) | — | Excellent | Excellent | Good | Excellent | Excellent | Excellent | Excellent |
| 3-a | | Thermal stability evaluation (temperature at time of 1% weight loss) | ° C. | 332 | 322 | 305 | 304 | 341 | 339 | 305 |
| 3-b | | Thermal stability evaluation (weight loss ratio upon holding at 290° C. for 30 minutes) | % | 1.4 | 1.9 | 2.4 | 2.1 | 1.4 | 1.6 | 2.3 |
| 4-a | | In-plane retardation (Re) | nm | −0.9 | 0.5 | — | −0.9 | — | −0.8 | −0.9 |
| 4-b | | Thickness direction retardation (Rth) | nm | 0.2 | −7.8 | — | 0.3 | — | 0.2 | 0.5 |
| 4-c | | Photoelastic coefficient | ×10$^{-12}$ Pa$^{-1}$ | −0.3 | — | — | −0.3 | — | −0.2 | 0.4 |
| 4-d-1 | | Total luminous transmittance | % | 93 | 93 | 91 | 93 | 93 | 93 | 93 |
| 4-d-2 | | Transmittance at 380 nm | % | 91 | 92 | 9 | 91 | 91 | 91 | 92 |
| 4-d-3 | | Transmittance at 280 nm | % | 73 | 77 | 2 | 73 | 73 | 73 | 74 |
| 5-a | | External appearance (number of bubbles) | — | 0 | 0 | 0.8 | 1.4 | 0 | 0.2 | 1.5 |
| 5-b | | External appearance (presence of streaks) | — | Good | Good | Good | Good | Good | Good | Good |
| 6 | | Overall evaluation | — | Excellent | Excellent | Good | Excellent | Excellent | Excellent | Excellent |

|   |   |   |   |   | Example 8 | Example 9 | Example 10 | Example 11 | Example 12 | Example 13 |
|---|---|---|---|---|---|---|---|---|---|---|
| Methacrylic resin composition | Methacrylic resin | Methacrylic resin production method | | | Production Example 4 | Production Example 4 | Production Example 5 | Production Example 6 | Production Example 1 | Production Example 7 |
| | | Methacrylic resin | | | 100 | 100 | 100 | 100 | 100 | 100 |
| | Other resins | | (R-1) | | | | | | | |
| | | | (R-2) | | | | | | | |
| | Additives | (a-1) | PEP-36A | | | 0.1 | | | 0.1 | |
| | | (a-2) | HP-10 | | | | 0.04 | | | |
| | | (a-3) | AO-412S | | | 0.1 | 0.08 | 0.1 | | |
| | | (a-4) | AO-80 | | 0.3 | 0.1 | 0.08 | 0.1 | | |
| | | (a-5) | Irganox 1010 | | | | | | 0.1 | |
| | | (a-6) | LA-F70 | | | | | | 0.4 | |
| | | (a-7) | LA-46 | | | | | | 0.8 | |
| | | (a-8) | TINUVIN 460 | | | | | | | |
| | | (a-9) | RIKEMAL H-100 | | | | | | 0.1 | |
| | | (a-10) | RIKESTER EW-400 | | | | | | | |
| Properties | (I) | | Weight average molecular weight (Mw) | | 17 | 17 | 14 | 16 | 17 | 13 |
| | (III) | | Total content of specific components | | 0.19 | 0.13 | 0.12 | 0.07 | 0.17 | 0.27 |
| | (IV) | | Content of components for which Mw ≤ 10,000 | | 1.2 | 0.9 | 2.9 | 1.1 | 1.6 | 3.1 |
| | | | Content of components for which 10,000 < Mw ≤ 50,000 | | 14.5 | 13.9 | 23.9 | 14.9 | 17.7 | 24.3 |
| | | | Content of components for which Mw > 50,000/Content of components for which 10,000 < Mw ≤ 50,000 | | 5.8 | 6.1 | 3.1 | 5.6 | 4.6 | 3.0 |
| | 1 | | Glass transition temperature | | 132 | 132 | 132 | 130 | 131 | 130 |
| | 2 | | Shaping processabiliy (prevention of roller adhesion) | | Excellent | Excellent | Excellent | Excellent | Excellent | Good |
| | 3-a | | Thermal stability evaluation (temperature at time of 1% weight loss) | | 317 | 340 | 341 | 325 | 310 | 293 |
| | 3-b | | Thermal stability evaluation (weight loss ratio upon holding at 290° C. for 30 minutes) | | 1.8 | 1.4 | 1.5 | 1.7 | 1.9 | 2.3 |
| | 4-a | | In-plane retardation (Re) | | −0.7 | −0.8 | −0.7 | — | — | — |
| | 4-b | | Thickness direction retardation (Rth) | | 0.6 | 0.5 | 0.5 | — | — | — |
| | 4-c | | Photoelastic coefficient | | 0.4 | 0.4 | −0.3 | — | — | — |
| | 4-d-1 | | Total luminous transmittance | | 93 | 93 | 93 | 93 | 91 | 93 |
| | 4-d-2 | | Transmittance at 380 nm | | 92 | 92 | 92 | 92 | 6 | 91 |
| | 4-d-3 | | Transmittance at 280 nm | | 74 | 74 | 74 | 74 | 4 | 73 |
| | 5-a | | External appearance (number of bubbles) | | 0.2 | 0 | 0.2 | 0.5 | 0.3 | 1.9 |

TABLE 1-continued

|   |   |   |   | Comparative Example 1 | Example 14 | Comparative Example 2 | Example 15 | Example 16 | Comparative Example 3 |
|---|---|---|---|---|---|---|---|---|---|
| | | 5-b | External appearance (presence of streaks) | Good | Good | Good | Good | Good | Good |
| | | 6 | Overall evaluation | Excellent | Excellent | Excellent | Excellent | Excellent | Good |

| | | | | Comparative Example 1 | Example 14 | Comparative Example 2 | Example 15 | Example 16 | Comparative Example 3 |
|---|---|---|---|---|---|---|---|---|---|
| Methacrylic resin composition | Methacrylic resin production method | | — | Production Example 8 | Production Example 9 | Production Example 10 | Production Example 11 | Production Example 12 | Production Example 13 |
| | Methacrylic resin | | Parts by mass | 100 | 100 | 100 | 100 | 100 | 100 |
| | Other resins | (R-1) | Parts by mass | | | | | | |
| | | (R-2) | Parts by mass | | | | | | |
| | Additives | (a-1) PEP-36A | Parts by mass | | | | | | |
| | | (a-2) HP-10 | Parts by mass | | | | | | |
| | | (a-3) AO-412S | Parts by mass | | | | | | |
| | | (a-4) AO-80 | Parts by mass | | | | | | |
| | | (a-5) Irgarox 1010 | Parts by mass | 0.1 | | | | | |
| | | (a-6) LA-F70 | Parts by mass | | | | | | |
| | | (a-7) LA-46 | Parts by mass | | | | | | |
| | | (a-8) TINUVIN 460 | Parts by mass | | | | | | |
| | | (a-9) RIKEMAL H-100 | Parts by mass | | | | | | |
| | | (a-10) RIKESTER EW-400 | Parts by mass | | | | | | |
| Properties | (I) | Weight average molecular weight (Mw) | — | 13 | 13 | 13 | 13 | 13 | 13 |
| | (III) | Total content of specific components | Mass % | 0.42 | 0.28 | 0.48 | 0.27 | 0.09 | 0.41 |
| | (IV) | Content of components for which Mw ≤ 10,000 | Mass % | 5.2 | 2.1 | 2.1 | 2.1 | 1.5 | 2.1 |
| | | Content of components for which 10,000 < Mw ≤ 50,000 | Mass % | 27.9 | 20.9 | 28.3 | 17.2 | 14.5 | 26.5 |
| | | Content of components for which Mw > 50,000/Content of components for which 10,000 < Mw ≤ 50,000 | — | 2.4 | 3.7 | 2.5 | 4.7 | 5.8 | 2.7 |
| | 1 | Glass transition temperature | °C. | 130 | 129 | 129 | 127 | 122 | 127 |
| | 2 | Shaping processability (prevention of roller adhesion) | — | Poor | Good | Poor | Good | Excellent | Poor |
| | 3-a | Thermal stability evaluation (temperature at time of 1% weight loss) | °C. | 310 | 296 | 288 | 296 | 287 | 285 |
| | 3-b | Thermal stability evaluation (weight loss ratio upon holding at 290° C. for 30 minutes) | % | 4.1 | 2.3 | 4.3 | 2.4 | 2.2 | 4.2 |
| | 4-a | In-plane retardation (Re) | nm | — | — | — | — | — | — |
| | 4-b | Thickness direction retardation (Rth) | nm | — | — | — | — | — | — |
| | 4-c | Photoelastic coefficient | ×10$^{-12}$ Pa$^{-1}$ | — | — | — | — | — | — |
| | 4-d-1 | Total luminous transmittance | % | 93 | 92 | 91 | 92 | 93 | 91 |
| | 4-d-2 | Transmittance at 380 nm | % | 91 | 90 | 89 | 91 | 91 | 90 |
| | 4-d-3 | Transmittance at 280 nm | % | 72 | 71 | 71 | 70 | 75 | 70 |
| | 5-a | External appearance (number of bubbles) | — | 3.5 | 3.1 | 5.1 | 2.6 | 2.1 | 4.6 |
| | 5-b | External appearance (presence of streaks) | — | Good | Good | Good | Good | Good | Good |
| | 6 | Overall evaluation | — | Poor | Good | Poor | Good | Good | Poor |

TABLE 1-continued

| | | | Example 17 | Example 18 | Example 19 | Example 20 | Example 21 | Example 22 |
|---|---|---|---|---|---|---|---|---|
| Methacrylic resin composition | Methacrylic resin production method | | Production Example 9 | Production Example 1 | Production Example 4 | Production Example 4 | Production Example 4 | Production Example 5 | Production Example 14 |
| | Methacrylic resin | | 95 | 95 | 95 | 90 | 85 | 95 | 5 |
| | Other resins | (R-1) | 5 | | | | | | |
| | | (R-2) | | 5 | 5 | 10 | 15 | | |
| | Additives | (a-1) PEP-36A | | 0.1 | | | | | |
| | | (a-2) HP-10 | | | | | | | 0.04 |
| | | (a-3) AO-412S | | 0.1 | 0.1 | 0.1 | 0.1 | | 0.08 |
| | | (a-4) AO-80 | | | 0.1 | 0.1 | 0.1 | | 0.08 |
| | | (a-5) Irgarox 1010 | | 0.1 | | | | | |
| | | (a-6) LA-F70 | | | | | | | 0.4 |
| | | (a-7) LA-46 | | | | | | | |
| | | (a-8) TINUVIN 460 | | | | | | | |
| | | (a-9) RIKEMAL H-100 | | | | | | | |
| | | (a-10) RIKESTER EW-400 | | | | | | | |
| Properties | (I) | Weight average molecular weight (Mw) | 13 | 17 | 17 | 16 | 16 | 14 |
| | (III) | Total content of specific components | 0.35 | 0.11 | 0.13 | 0.12 | 0.11 | 0.12 |
| | (IV) | Content of components for which Mw ≤ 10,000 | 2.1 | 1.4 | 0.9 | 1.1 | 1.4 | 1.0 |
| | | Content of components for which 10,000 < Mw ≤ 50,000 | 20.4 | 17.8 | 14.1 | 14.4 | 14.9 | 14.3 |
| | | Content of components for which Mw > 50,000/Content of components for which 10,000 < Mw ≤ 50,000 | 3.8 | 4.5 | 6.0 | 5.9 | 5.6 | 5.9 |
| | 1 | Glass transition temperature | 127 | 134 | 132 | 131 | 131 | 130 |
| | 2 | Shaping processability (prevention of roller adhesion) | Good | Excellent | Excellent | Excellent | Excellent | Excellent |
| | 3-a | Thermal stability evaluation (temperature at time of 1% weight loss) | 304 | 339 | 340 | 339 | 339 | 342 |
| | 3-b | Thermal stability evaluation (weight loss ratio upon holding at 290° C. for 30 minutes) | 2.5 | 1.6 | 1.9 | 2.3 | 2.9 | 1.5 |
| | 4-a | In-plane retardation (Re) | — | — | −0.8 | — | — | 0.7 |
| | 4-b | Thickness direction retardation (Rth) | — | — | −0.6 | — | — | 1.1 |
| | 4-c | Photoelastic coefficient | — | — | 0.1 | −0.2 | −0.5 | 0.4 |
| | 4-d-1 | Total luminous transmittance | 91 | 93 | 93 | 93 | 93 | 92 |
| | 4-d-2 | Transmittance at 380 nm | 90 | 91 | 92 | 92 | 92 | 8 |
| | 4-d-3 | Transmittance at 280 nm | 72 | 73 | 74 | 74 | 74 | 38 |
| | 5-a | External appearance (number of bubbles) | 3.4 | 0 | 0 | 0 | 0.1 | 0.3 |
| | 5-b | External appearance (presence of streaks) | Good | Good | Good | Good | Good | Good |
| | 6 | Overall evaluation | Poor | Excellent | Excellent | Excellent | Excellent | Excellent |

"—": Not measured

As shown in Table 1, roller adhesion in film production and so forth were good in cases in which the weight average molecular weight was within the prescribed range, the content of the structural unit (B) was within the prescribed range, and the content of components was within the prescribed range.

INDUSTRIAL APPLICABILITY

This disclosure enables the provision of a methacrylic resin that has adequate optical properties for practical use and excellent heat resistance, thermal stability, and shaping processability, a methacrylic resin composition containing the methacrylic resin, a film containing the methacrylic resin composition, and a production method thereof.

This disclosure is industrially applicable for household goods, OA equipment, AV equipment, battery fittings, lighting equipment, automotive component applications for tail lamps, meter covers, head lamps, light guide rods, lenses, and so forth, housing applications, sanitary applications as a sanitary ware alternative or the like, light guide plates, diffuser plates, polarizing plate protective films, quarter-wave plates, half-wave plates, viewing angle control films, liquid-crystal optical compensation films and other retardation films, display front plates, display base plates, lenses, transparent base plates of touch panels and the like, decorative films, and so forth used in displays such as liquid-crystal displays, plasma displays, organic EL displays, field emission displays, rear projection televisions, and head-up displays, transparent base plates used in solar cells, and also in the fields of optical communication systems, optical switching systems, and optical measurement systems for waveguides, lenses, optical fibers, optical fiber coating materials, LED lenses, lens covers, and so forth.

The invention claimed is:

1. A methacrylic resin composition comprising:
a methacrylic resin, the methacrylic resin including,
- 50 mass % to 97 mass % of a methacrylic acid ester monomer unit (A);
- 3 mass % to 30 mass % of a structural unit (B) having a cyclic structure-containing main chain, the structural unit (B) including at least one structural unit selected from the group consisting of a maleimide-based structural unit (B-1), a glutaric anhydride-based structural unit (B-2), a glutarimide-based structural unit (B-3), and a lactone ring structural unit (B-4); and
- 0 mass % to 20 mass % of another vinyl monomer unit (C) that is copolymerizable with a methacrylic acid ester monomer, the vinyl monomer unit (C) including a structural unit of at least one selected from the group consisting of an acrylic acid ester monomer, an aromatic vinyl monomer, and a vinyl cyanide monomer, wherein the methacrylic resin satisfies conditions (1), (2) and (3), shown below:
- (1) the methacrylic resin has a weight average molecular weight of 65,000 to 300,000 as measured by gel permeation chromatography (GPC);
- (2) total content of components detected at a retention time of 22 minutes to 32 minutes in measurement by GC/MS is 0.01 mass % to 0.40 mass % when the methacrylic resin is taken to be 100 mass %; and
- (3) content of components having a weight average molecular weight of 10,000 or less as measured by gel permeation chromatography (GPC) is 0.1 mass % to 5.0 mass % when the methacrylic resin is taken to be 100 mass %;

the methacrylic resin has a glass transition temperature of 120° C. or higher, and 0.01 parts by mass to 5 parts by mass of a thermal stabilizer relative to 100 parts by mass of the methacrylic resin.

2. The methacrylic resin according to claim 1, wherein the vinyl monomer unit (C) includes a structural unit of at least one selected from the group consisting of methyl acrylate, ethyl acrylate, styrene, and acrylonitrile.

3. A film comprising the methacrylic resin composition according to claim 1.

4. The film according to claim 3, having a film thickness of 0.01 mm to 1 mm.

5. The film according to claim 3, wherein the film is an optical film.

6. A method of producing a methacrylic resin including 50 mass % to 97 mass % of a methacrylic acid ester monomer unit (A), 3 mass % to 30 mass % of a structural unit (B) having a cyclic structure-containing main chain, and 0 mass % to 20 mass % of another vinyl monomer unit (C) that is copolymerizable with a methacrylic acid ester monomer, the method comprising:
- (1) a compounding step of adding monomer into a reactor; and
- (2) a polymerization step of adding a polymerization initiator into the reactor and carrying out a monomer polymerization reaction, wherein in (2) the polymerization step, when total time from starting addition of the polymerization initiator to ending addition of the polymerization initiator is taken to be B hours, in a period from starting addition of the polymerization initiator to 0.5×B hours thereafter, there is at least one instance in which an additive amount of the polymerization initiator per unit time is less than an additive amount of the polymerization initiator per unit time when starting addition of the polymerization initiator.

7. The method of producing a methacrylic resin according to claim 6, wherein
in (2) the polymerization step, an additive amount of the polymerization initiator per unit time during a period from 0.01×B hours after starting addition of the polymerization initiator to 0.3×B hours after starting addition of the polymerization initiator is 70% or less of the additive amount of the polymerization initiator per unit time when starting addition of the polymerization initiator.

8. The method of producing a methacrylic resin according to claim 6, wherein
in (2) the polymerization step, an additive amount of the polymerization initiator per unit time during a period from 0.7×B hours after starting addition of the polymerization initiator to 1.0×B hours after starting addition of the polymerization initiator is 25% or less of the additive amount of the polymerization initiator per unit time when starting addition of the polymerization initiator.

9. The method of producing a methacrylic resin according to claim 6, wherein
in (2) the polymerization step, an additive amount of the polymerization initiator during a period from 0.5×B hours after starting addition of the polymerization initiator to 1.0×B hours after starting addition of the polymerization initiator is 20 mass % to 80 mass % when a total additive amount of the polymerization initiator is taken to be 100 mass %.

10. The method of producing a methacrylic resin according to claim 6, wherein
the monomer polymerization reaction is carried out for a polymerization reaction time of 1.0×B hours to 5.0×B hours.

11. The method of producing a methacrylic resin according to claim 6, wherein
the additive amount of the polymerization initiator per unit time is gradually reduced.

12. A methacrylic resin composition comprising:
a methacrylic resin including,
- 50 mass % to 97 mass % of a methacrylic acid ester monomer unit (A);
- 3 mass % to 30 mass % of a structural unit (B) having a cyclic structure-containing main chain, the structural unit (B) including at least one structural unit selected from the group consisting of a maleimide-based structural unit (B-1), a glutaric anhydride-based structural unit (B-2), a glutarimide-based structural unit (B-3), and a lactone ring structural unit (B-4); and
- 0 mass % to 20 mass % of another vinyl monomer unit (C) that is copolymerizable with a methacrylic acid ester monomer, the vinyl monomer unit (C) including a structural unit of at least one selected from the group consisting of an acrylic acid ester monomer, an aromatic vinyl monomer, and a vinyl cyanide monomer, wherein the methacrylic resin satisfies conditions (1), (2) and (3), shown below:
- (1) the methacrylic resin has a weight average molecular weight of 65,000 to 300,000 as measured by gel permeation chromatography (GPC);

(2) total content of components detected at a retention time of 22 minutes to 32 minutes in measurement by GC/MS is 0.01 mass % to 0.40 mass % when the methacrylic resin is taken to be 100 mass %; and (3) content of components having a weight average molecular weight of 10,000 or less as measured by gel permeation chromatography (GPC) is 0.1 mass % to 5.0 mass % when the methacrylic resin is taken to be 100 mass %;

the methacrylic resin has a glass transition temperature of 120° C. or higher, and 0.01 parts by mass to 5 parts by mass of an ultraviolet absorber relative to 100 parts by mass of the methacrylic resin.

13. The methacrylic resin according to claim 12, wherein the vinyl monomer unit (C) includes a structural unit of at least one selected from the group consisting of methyl acrylate, ethyl acrylate, styrene, and acrylonitrile.

14. A film comprising the methacrylic resin composition according to claim 12.

15. The film according to claim 14, having a film thickness of 0.01 mm to 1 mm.

16. The film according to claim 14, wherein the film is an optical film.

* * * * *